US012793923B2

(12) United States Patent
Wada et al.

(10) Patent No.: US 12,793,923 B2
(45) Date of Patent: Nov. 10, 2026

(54) PROTECTIVE ELEMENT

(71) Applicant: DEXERIALS CORPORATION, Shimotsuke (JP)

(72) Inventors: Yutaka Wada, Shimotsuke (JP); Yoshihiro Yoneda, Shimotsuke (JP)

(73) Assignee: Dexerials Corporation, Shimotsuke (JP)

( * ) Notice: Subject to any disclaimer, the term of this patent is extended or adjusted under 35 U.S.C. 154(b) by 297 days.

(21) Appl. No.: 18/687,979

(22) PCT Filed: Aug. 26, 2022

(86) PCT No.: PCT/JP2022/032152
§ 371 (c)(1),
(2) Date: Feb. 29, 2024

(87) PCT Pub. No.: WO2023/032829
PCT Pub. Date: Mar. 9, 2023

(65) Prior Publication Data

US 2025/0118520 A1 Apr. 10, 2025

(30) Foreign Application Priority Data

Sep. 3, 2021 (JP) ................................. 2021-144287
Aug. 1, 2022 (JP) ................................. 2022-122938

(51) Int. Cl.
*H01H 85/17* (2006.01)
*H01H 85/055* (2006.01)
*H01H 85/143* (2006.01)

(52) U.S. Cl.
CPC .......... *H01H 85/17* (2013.01); *H01H 85/055* (2013.01); *H01H 85/143* (2013.01)

(58) Field of Classification Search
CPC .... H01H 85/17; H01H 85/055; H01H 85/143; H01H 37/76; H01H 85/08; H01H 85/10; H01H 85/12; H01H 85/175; H01H 85/147
See application file for complete search history.

(56) References Cited

U.S. PATENT DOCUMENTS 11,183,353 B2 * 11/2021 Fan ...................... H01H 85/203
11,482,393 B2 * 10/2022 Chen ...................... H01H 85/17
(Continued)

FOREIGN PATENT DOCUMENTS

JP 2016143597 A 8/2016
JP 2017004634 A 1/2017
(Continued)

OTHER PUBLICATIONS

Office Action issued Mar. 24, 2025, in corresponding Korean Patent Application No. 10-2024-7005873 (with machine English translation), 21 pages.
(Continued)

*Primary Examiner* — Stephen S Sul
(74) *Attorney, Agent, or Firm* — Element IP, PLC

(57) ABSTRACT

A protective element includes: a fuse element including a first end portion and a second end portion; first and second insulating members each having an opening or a separation part, the first and second insulating members being disposed in a state proximal to or in contact with the fuse element; a shielding member movable in a moving direction that allows the shielding member to insert into the opening or the separation part so as to divide the fuse element; a locking member that suppresses movement of the shielding member; a pressing member that press the shielding member; and a heat-generating body configured to heat the locking member or a fixing member of the locking member. The fuse element
(Continued)

further includes a cutoff portion for cutting off a current path between the first end portion and the second end portion.

28 Claims, 23 Drawing Sheets

(56) References Cited

U.S. PATENT DOCUMENTS

| | | | | |
|---|---|---|---|---|
| 2002/0064999 | A1 * | 5/2002 | Kobayashi | H01H 85/0417 439/620.34 |
| 2013/0328658 | A1 * | 12/2013 | Takahashi | H01H 85/175 337/198 |
| 2015/0294828 | A1 * | 10/2015 | Burge | H01H 85/38 337/274 |
| 2016/0013001 | A1 * | 1/2016 | Yoneda | H01H 85/06 337/290 |
| 2016/0240342 | A1 * | 8/2016 | Yoneda | H01H 85/08 |
| 2020/0066473 | A1 * | 2/2020 | Samuels | H01H 85/10 |
| 2022/0084773 | A1 | 3/2022 | Yoneda et al. | |
| 2022/0319792 | A1 | 10/2022 | Yoneda | |
| 2022/0359144 | A1 * | 11/2022 | Burns | H01H 85/003 |
| 2025/0118520 | A1 * | 4/2025 | Wada | H01H 85/12 |

FOREIGN PATENT DOCUMENTS

| | | | |
|---|---|---|---|
| JP | 2020145051 | A | 9/2020 |
| JP | 2021022431 | A | 2/2021 |
| WO | WO-2021014909 | A1 | 1/2021 |

OTHER PUBLICATIONS

Written Opinion of the International Searching Authority issued Nov. 1, 2022, in PCT/JP2022/032152 (with English translation), 11 pages.

Notice of Reasons for Refusal issued Nov. 27, 2025, in corresponding Korean Patent Application No. 10-2024-7005873 (with machine English translation), 8 pages.

International Search Report issued Nov. 1, 2022 in PCT/JP2022/032152 (with English translation), 4 pages.

Combined Taiwanese Office Action and Search Report issued Apr. 13, 2026, in corresponding Taiwanese Patent Application No. 111133386 (with machine English translation), 9 pages.

Office Action issued Jun. 30, 2026, in corresponding Japanese Patent Application No. 2022-122938 (with machine English translation), 13 pages.

* cited by examiner

PROTECTIVE ELEMENT

TECHNICAL FIELD

The present invention relates to a protective element.

The present invention claims priority to JP 2021-144287 filed in Japan on Sep. 3, 2021 and JP 2022-122938 filed in Japan on Aug. 1, 2022. The contents of these application are hereby incorporated.

BACKGROUND ART

Conventionally, there are fuse elements wherein heat is generated and fusion occurs when a current exceeding a rated value flows in a current path, thereby cutting off the current path. A protective element provided with a fuse element (fuse element) is used in a wide variety of fields such as home electric appliances and electric automobiles.

For example, Patent Literature 1 teaches a fuse element provided with two elements connected between terminal portions positioned at both end portions and a fusion portion provided in a substantially central portion of the elements as a fuse element used mainly in electric circuits for an automobile or the like. Patent Literature 1 teaches a fuse wherein two fuse elements are stored in a casing and an arc extinguishing material is sealed between the fuse elements and the casing.

PRIOR ART LITERATURE

Patent Literature

Patent Literature 1: Japanese Unexamined Patent Application Publication No. 2017-004634

SUMMARY OF INVENTION

Problem to be Solved by Invention

In a protective element installed in a current path having high voltage and high current, arc discharge is likely to occur when a fuse element fuses. When large-scale arc discharge occurs, the insulating case having the fuse element housed therein may undergo breakdown. Therefore, the generation of arc discharge is suppressed using a low-resistance and high-melting-point metal such as copper as a material of the fuse element. Furthermore, a strong and highly heat-resistant material such as ceramic is used as a material of the insulating case, and the size of the insulating case is also increased.

Furthermore, up until now, the only current fuses having high voltage and high current (100 V/100 A or greater) have had overcurrent cutoff, and there has been no way to also achieve a cutoff function using a cutoff signal.

In light of the above, an object of the present invention is to provide a protective element wherein large-scale arc discharge does not readily occur when a fuse element fuses, the size of an insulating case can be made smaller and lighter, and both overcurrent cutoff in response to a high voltage/high current and a cutoff function via a cutoff signal are accomplished.

Means for Solving Problem

The present invention provides the following means for solving the problem described above.

[1] A protective element comprising a fuse element, an insulating case that houses the fuse element, a first terminal, and a second terminal, further comprising:

a first insulating member having a first opening or a first separation part and arranged, and a second insulating member having a second opening or a second separation part, in a state proximal to or in contact with the fuse element;

a shielding member which can move through the first opening or the first separation part of the first insulating member and the second opening or the second separation part of the second insulating member in a direction that allows the shielding member to insert into the first opening or the first separation part; so as to divide the fuse element;

pressing means that press the shielding member in a direction that the shielding member is able to move;

a locking member that suppresses movement of the shielding member;

a heat-generating body that heats and softens the locking member or a fixing member fixing the locking member; and a power supply member that carries current to the heat-generating body, wherein the fuse element comprises a first end portion and a second end portion that face each other, in which the first terminal has one end connected to the first end portion and the other end portion exposed to the outside by the insulating case and the second terminal has one end connected to the second end portion and the other end portion exposed to the outside by the insulating case, the insulating case further houses the first insulating member, the second insulating member, the shielding member, the pressing means, the locking member, the heat-generating body, and one part of the power supply member, and the fuse element has a cutoff portion for cutting off the current path between the first end portion and the second end portion.

[2] The protective element of [1], wherein the heat-generating body generates heat and the locking member or the fixing member softens, by which stress of the pressing means causes the shielding member to cut the locking member or separate the fixing member, and furthermore, the shielding member moves through the second opening or the second separation part of the second insulating member and the first opening or the first separation part of the first insulating member to disconnect the cutoff portion of the fuse element, which cuts off energization of the fuse element.

[3] The protective element of [1] or [2], wherein the shielding member cuts the cutoff portion of the fuse element, shielding the fuse element in the current carrying direction of the fuse element.

[4] The protective element of any of [1] to [3], wherein the pressing means is a spring.

[5] The protective element of any of [1] to [4], wherein at least one among the first insulating member, the second insulating member, the shielding member, and the insulating case is formed of a material having a tracking resistance index CTI of 500 V or more.

[6] The protective element of any of [1] to [5], wherein one among the first insulating member, the second insulating member, the shielding member, and the insulating case is formed of a resinous material of a type selected from a group consisting of polyamide-based resins and fluorine-based resins.

[7] The protective element according to any one of [1] through [6], wherein the fuse element has a stacked body containing a low melting point metal layer and a high melting point metal layer at least on a part thereof, the low melting point metal layer contains tin, and the high melting point metal layer contains silver or copper.

[8] The protective element according to [7], wherein the fuse element has two or more layers of the high melting point metal layer, one or more layers of the low melting point metal layer, and a stacked body where the low melting point metal layer is arranged between the high melting point metal layers is at least partially included.

[9] The protective element according to any one of [1] through [8], wherein the fuse element has a single layer containing silver or copper in at least a portion thereof.

[10] The protective element of any of [1] to [9], wherein the fuse element includes a fusion portion between the first end portion and the second end portion, in which the cross-sectional area of the fusion portion in the current carrying direction is less than the cross-sectional area of the first end portion and the second end portion in the current carrying direction from the first end portion to the second end portion.

[11] The protective element of any of [1] to [10], wherein one part of the locking member is in proximity to or in contact with the fuse element.

[12] The protective element according to any one of [1] through [11], wherein the fuse element has a low melting point metal layer or a stacked body containing a low melting point metal layer and a high melting point metal layer on the cutoff portion and has the high melting point metal layer on both the first end portion and the second end portion, the low melting point metal layer contains tin, and the high melting point metal layer contains silver or copper.

[13] The protective element according to any one of [1] through [12], wherein at least the thickness of the cutoff portion in the fuse element is thinner than the thickness of a portion other than the cutoff portion.

[14] The protective element according to any one of [1] through [13], wherein the insulating case contains a first holding member and a second holding member, and the first insulating member is integrated with the first holding member.

[15] The protective element according to any one of [1] through [14], wherein the insulating case includes a first holding member and a second holding member, and the second insulating member is integrated with the second holding member.

[16] The protective element according to any one of [1] through [15], having a plurality of the fuse elements and the first insulating members, wherein the plurality of fuse elements are arranged in proximity to or in contact between the first insulating members or the second insulating member.

[17] The protective element according to [16], wherein the insulating case includes a first holding member and a second holding member, and one of the first insulating members is integrated with the first holding member.

[18]A protective element comprising a fuse element, an insulating case that houses the fuse element, a first terminal, and a second terminal, the fuse element further comprising:

a first insulating member having a first opening or a first separation part disposed in a state proximal to or in contact with the fuse element;

a shielding member which can move through the first opening or the first separation part of the first insulating member in a direction that allows the shielding member to insert into the first opening or the first separation part so as to divide the fuse element;

pressing means that press the shielding member in a direction that the shielding member is able to move;

and a locking member that suppresses movement of the shielding member;

wherein the fuse element comprises a first end portion and a second end portion that face each other, in which the first terminal has one end connected to the first end portion and the other end portion exposed to the outside by the insulating case and the second terminal has one end connected to the second end portion and the other end portion exposed to the outside by the insulating case, the insulating case further houses the first insulating member, the shielding member, the pressing means, and the locking member, and the fuse element has a cutoff portion for cutting off the current path between the first end portion and the second end portion.

[19] The protective element according to [18] having a fixing member that fixes the locking member, wherein the shielding member cuts the cutoff portion of the fuse element or separates the fixing member and shields the fuse element in the current carrying direction of the fuse element.

[20] The protective element of [18] or [19], wherein the pressing means is a spring.

[21] The protective element of any of [18] to [20], wherein at least one among the first insulating member, the shielding member, and the insulating case is formed of a material having a tracking resistance index CTI of 500 V or more.

[22] The protective element of any of [18] to [21], wherein one among the first insulating member, the shielding member, and the insulating case is formed of a resinous material of a type selected from a group consisting of polyamide-based resins and fluorine-based resins.

[23] The protective element according to any one of [18] through [22], wherein the fuse element has a stacked body containing a low melting point metal layer and a high melting point metal layer at least on a part thereof, the low melting point metal layer contains tin, and the high melting point metal layer contains silver or copper.

[24] The protective element according to [23], wherein the fuse element has two or more layers of the high melting point metal layer, one or more layers of the low melting point metal layer, and a stacked body where the low melting point metal layer is arranged between the high melting point metal layers is at least partially included.

[25] The protective element according to any one of [18] through [24], wherein the fuse element has a single layer containing silver or copper in at least a portion thereof.

[26] The protective element of any of [18] to [25], wherein the fuse element includes a fusion portion between the first end portion and the second end portion, in which the cross-sectional area of the fusion portion in the current carrying direction is less than the cross-sectional area of the first end portion and the second end portion in the current carrying direction from the first end portion to the second end portion.

[27] The protective element of any of [18] to [26], wherein one part of the locking member is in proximity to or in contact with the fuse element.

[28] The protective element of any of [18] to [27], wherein the first insulating member, which is arranged in a state proximal to or in contact with an outer side of the fuse element, includes a locking member holding portion that holds the locking member.

[29] The protective element according to any one of [18] through [28], wherein the fuse element has a low melting point metal layer or a stacked body containing a low melting point metal layer and a high melting point metal layer on the cutoff portion and has the high melting point metal layer on both the first end portion and the second end portion, the low melting point metal layer contains tin, and the high melting point metal layer contains silver or copper.

[30] The protective element according to any one of [18] through [29], wherein at least the thickness of the cutoff portion in the fuse element is thinner than the thickness of a portion other than the cutoff portion.

[31] The protective element of any of [18] through [30], further including a heat-generating body that heats and softens the locking member or a fixing member fixing the locking member, and a power supply member that carries current to the heat-generating body, wherein the heat-generating body generates heat and the locking member or the fixing member softens, by which stress of the pressing means causes the shielding member to cut the locking member or separate the fixing member, and furthermore, the shielding member moves through the first opening or the first separation part of the first insulating member to cut the cutoff portion of the fuse element, which cuts off energization of the fuse element.

[32] The protective element according to any one of [18] through [31], wherein the insulating case includes a first holding member and a second holding member, and the first insulating member is integrated with the first holding member.

[33] The protective element according to any one of [18] through [32], wherein the insulating case includes a first holding member and a second holding member, and the second insulating member is integrated with the second holding member.

[34] The protective element according to any one of [18] through [33], having a plurality of the fuse elements and the first insulating members, wherein the plurality of fuse elements are arranged in proximity to or in contact between the first insulating members or the second insulating member.

[35] The protective element according to [34], wherein the insulating case includes a first holding member and a second holding member, and one of the first insulating members is integrated with the first holding member.

Effect of the Invention

According to the present invention, it is possible to provide a protective element wherein large-scale arc discharge does not readily occur when a fuse element fuses, the size of an insulating case can be made smaller and lighter, and both overcurrent cutoff in response to a high voltage/high current and a cutoff function via a cutoff signal are accomplished.

MODES FOR CARRYING OUT INVENTION

Figure 1:
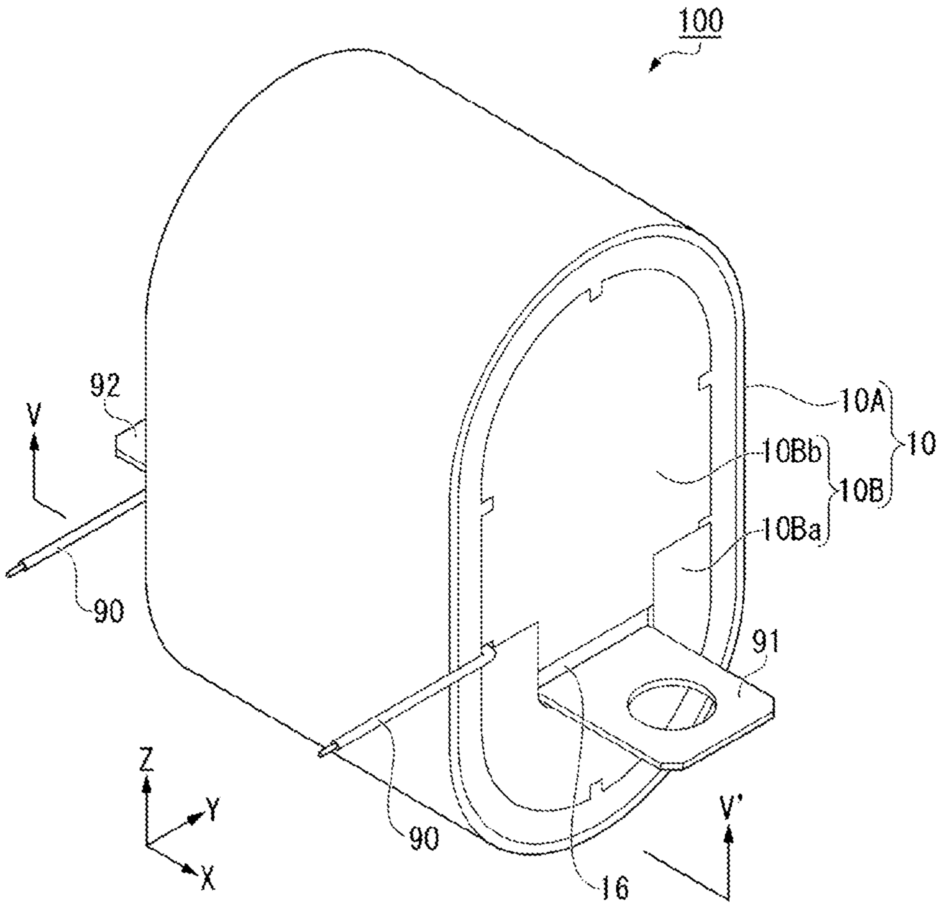
FIG. 1 is a perspective view of the protective element according to the first embodiment of the present invention.

The present embodiment will be described in detail below with reference to drawings as appropriate. In the drawings used in the description below, characteristic portions may be enlarged for convenience to more easily understand the characteristics thereof, and the dimensional ratios of the components and the like may be different from the actual ratios. The materials, dimensions, and the like exemplified in the following description are mere examples, and the present invention is not limited thereby. The present invention can be implemented by making appropriate modifications as long as the effect of the present invention is demonstrated.

Protective Element (First Embodiment)

FIGS. 1 to 5 are perspective views illustrating the protective element according to the first embodiment of the present invention. In the drawings used in the description below, the direction shown by X is the current carrying direction of the fuse element. The direction indicated by Y is a direction orthogonal to the X direction, and is also referred to as the width direction. The direction indicated by Z is a direction orthogonal to the X direction and the Y direction, and is also referred to as the thickness direction.

Figure 2:
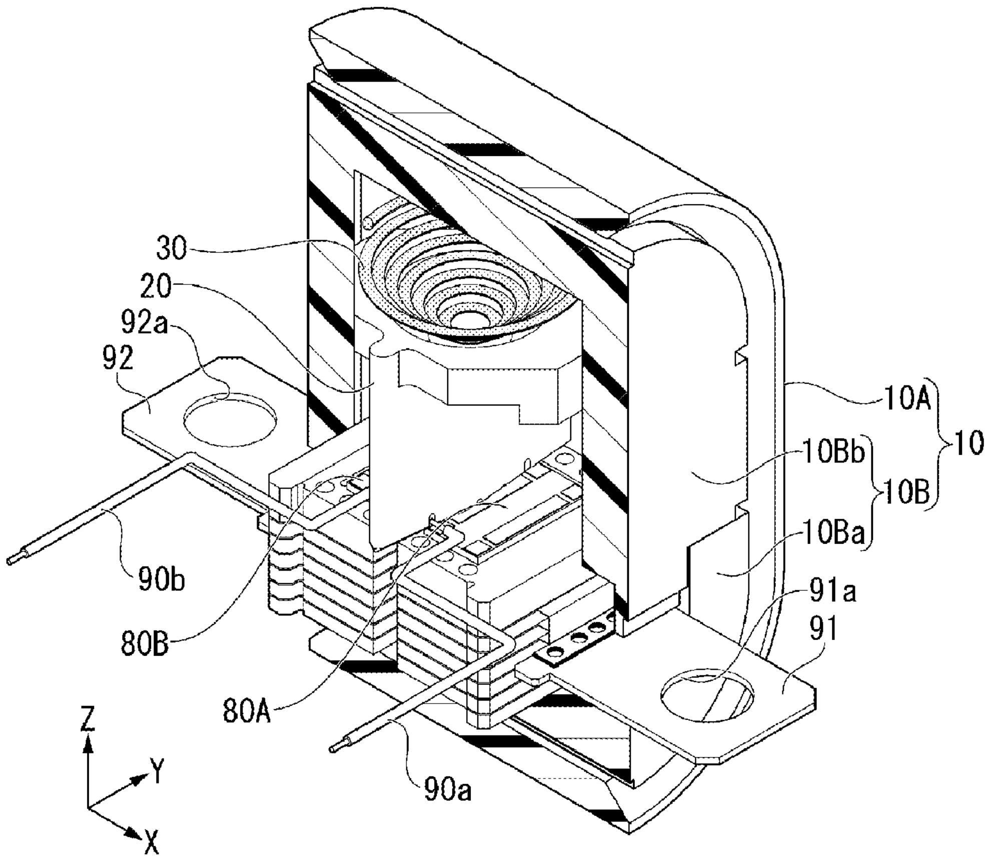
FIG. 2 is a partial perspective view for viewing the interior of the protective element illustrated in FIG. 1.

FIG. 1 is a perspective view schematically illustrating the protective element according to the first embodiment of the present invention. FIG. 2 is a partial perspective view schematically illustrated for viewing the interior of the protective element illustrated in FIG. 1.

Figure 3:
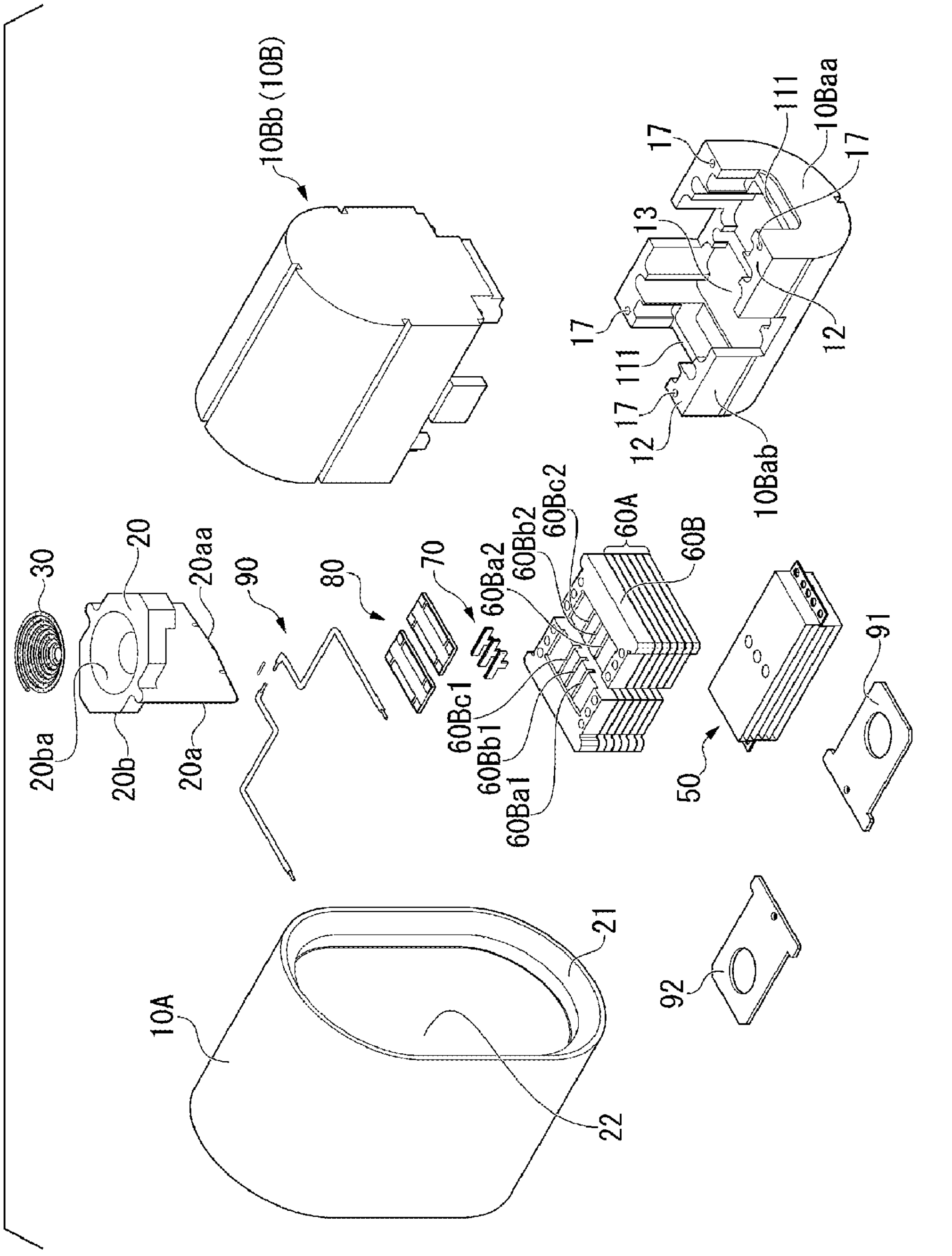
FIG. 3 is an exploded perspective view of the protective element illustrated in FIG. 1.
Figure 4:
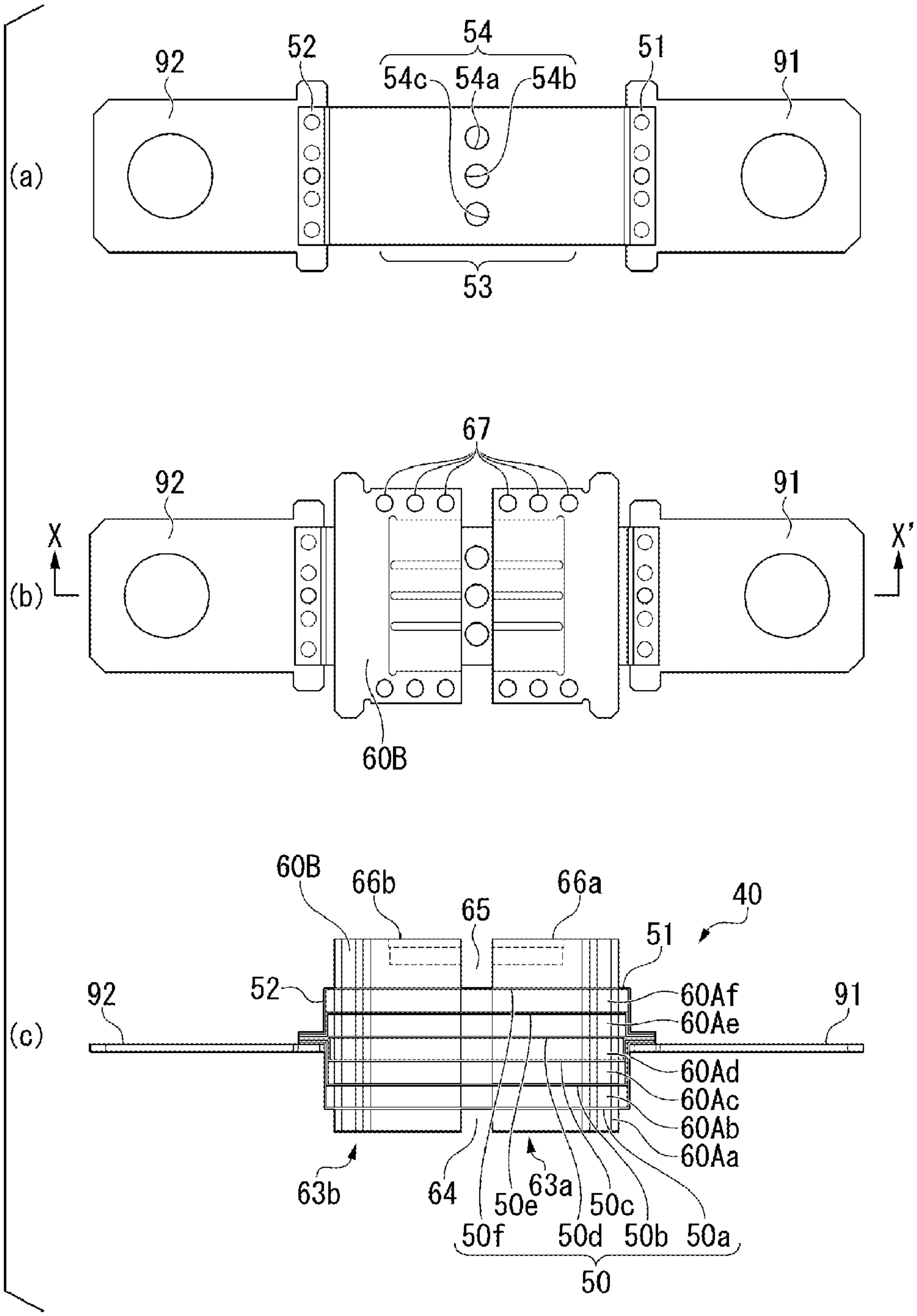
FIG. 4 (a) is a plan view schematically illustrating a first terminal, a second terminal, and one fusible conductor sheet configuring a fuse element stacked body, (b) is a plan view schematically illustrating the fuse element stacked body, a second insulating member, the first terminal, and the second terminal, and (c) is a cross-sectional view along the X-X' line in the plan view illustrated in (b).
Figure 5:
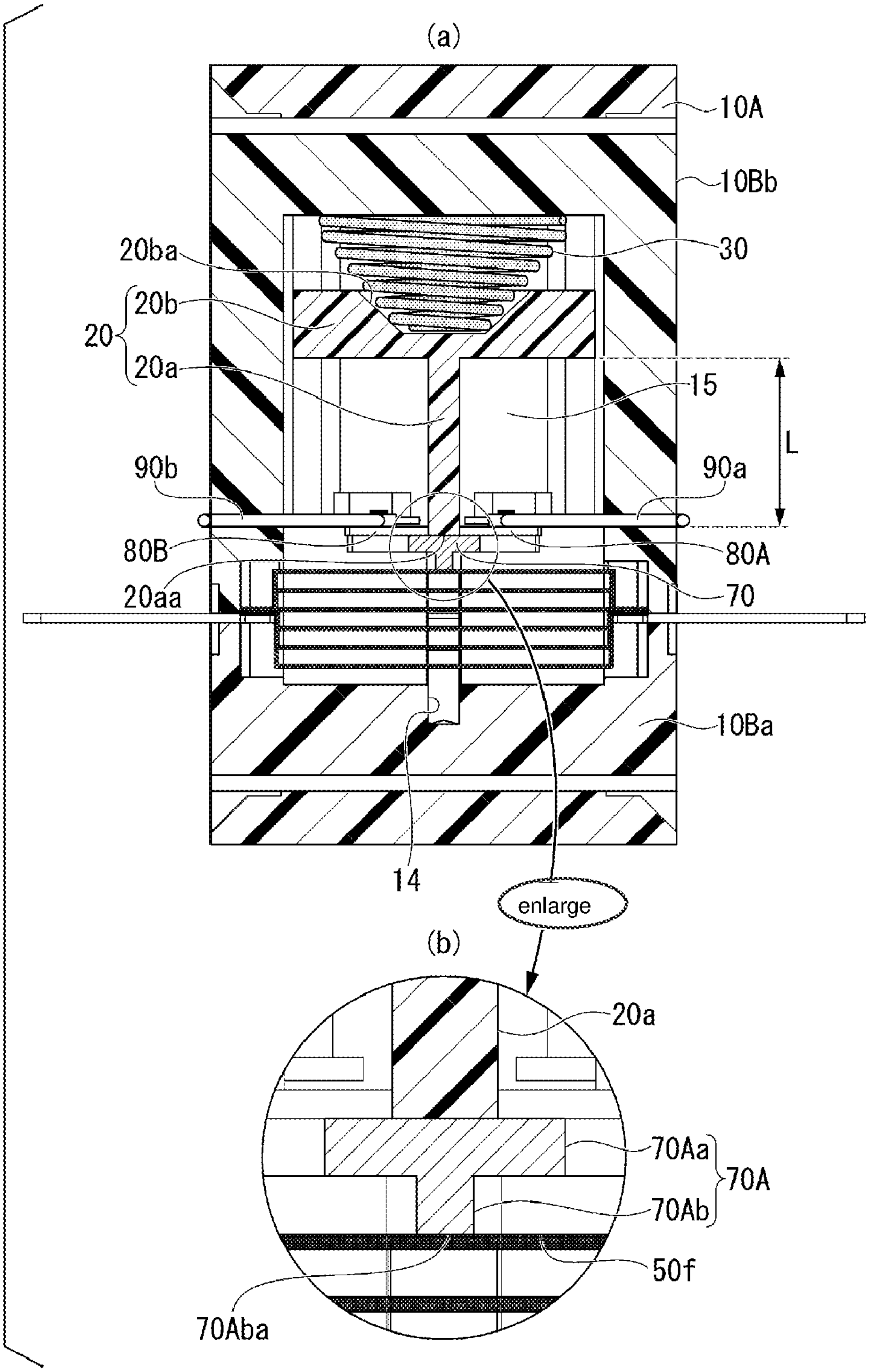
FIG. 5 (a) is a cross-sectional view along the V-V' line in FIG. 1, and (b) is an enlarged view of the vicinity of a locking member.

FIG. 3 is an exploded perspective view schematically illustrating the protective element illustrated in FIG. 1. FIG. 4 (a) is a plan view schematically illustrating a first terminal, a second terminal, and one fusible conductor sheet configuring a fuse element stacked body, (b) is a plan view schematically illustrating the fuse element stacked body, a second insulating member, the first terminal, and the second terminal, and (c) is a cross-sectional view along the X-X' line in the plan view illustrated in (b). FIG. 5 (a) is a cross-sectional view along the V-V' line in FIG. 1, and (b) is an enlarged view of the vicinity of a locking member.

The protective element 100 illustrated in FIG. 1 to FIG. 5 has an insulating case 10, a fuse element stacked body 40, a first insulating member 60A, a second insulating member 60B, a shielding member 20, a pressing means 30, a locking member 70, a heat-generating body 80, power supply members 90*a* and 90*b*, a first terminal 91, and a second terminal 92. Note that in the protective element 100 of the present embodiment, the current carrying direction means the direction in which electricity flows during use (X direction), and the cross-sectional area of the current carrying direction means the area of the surface (Y-Z surface) in the direction orthogonal to the current carrying direction.

In the protective element 100 illustrated in FIG. 1 to FIG. 5, an example is illustrated wherein the first insulating member 60A and the second insulating member 60B are members having different configurations, but these first insulating member 60A and second insulating member 60B may be members having the same configuration.

The protective element 100 of the present embodiment has, as a mechanism for cutting off the current path, an overcurrent cutoff that cuts off the current path by a fusible conductor sheet 50 fusing when an overcurrent exceeding a rated current flows through the fusible conductor sheet 50 (see FIG. 4(*c*)), and an active cutoff that cuts off the current path by melting the locking member 70 that suppresses the movement of a shielding member 20 by passing an electric current through a heat-generating body 80 when an abnormality other than overcurrent occurs, moving the shielding member 20 to which a pressing force is applied downward by the pressing means 30, and cutting the fuse element 50.

(Insulating Case)

The insulating case 10 is a substantial elongated cylindrical shape (an ellipse at any position where a cross section on the Y-Z surface is in the X direction). The insulating case 10 is made up of a cover 10A and a holding member 10B.

The cover 10A has an elongated cylindrical shape having both ends opened. The inside edges of the openings of the cover 10A are chamfered inclined surfaces 21. A central portion of the cover 10A is a housing portion 22 for housing the holding member 10B.

The holding member 10B is made up of a first holding member 10Ba arranged on the lower side in the Z direction and a second holding member 10Bb arranged on the upper side in the Z direction.

As illustrated in FIG. 3, a terminal mounting surface 111 is provided on both end portions (first end portion 10Baa and second end portion 10Bab) of the first holding member 10Ba in the current carrying direction (X direction).

Furthermore, as illustrated in FIG. 3, a power supply member mounting surface 12 is provided on both end portions (the first end portion 10Baa and the second end portion 10Bab) of the first holding member 10Ba. The routing distance of the power supply member 90 is shortened by the position (height) in the Z direction of the power supply member mounting surface 12 being substantially the same height as the position (height) of the heat-generating body 80.

Figure 6:
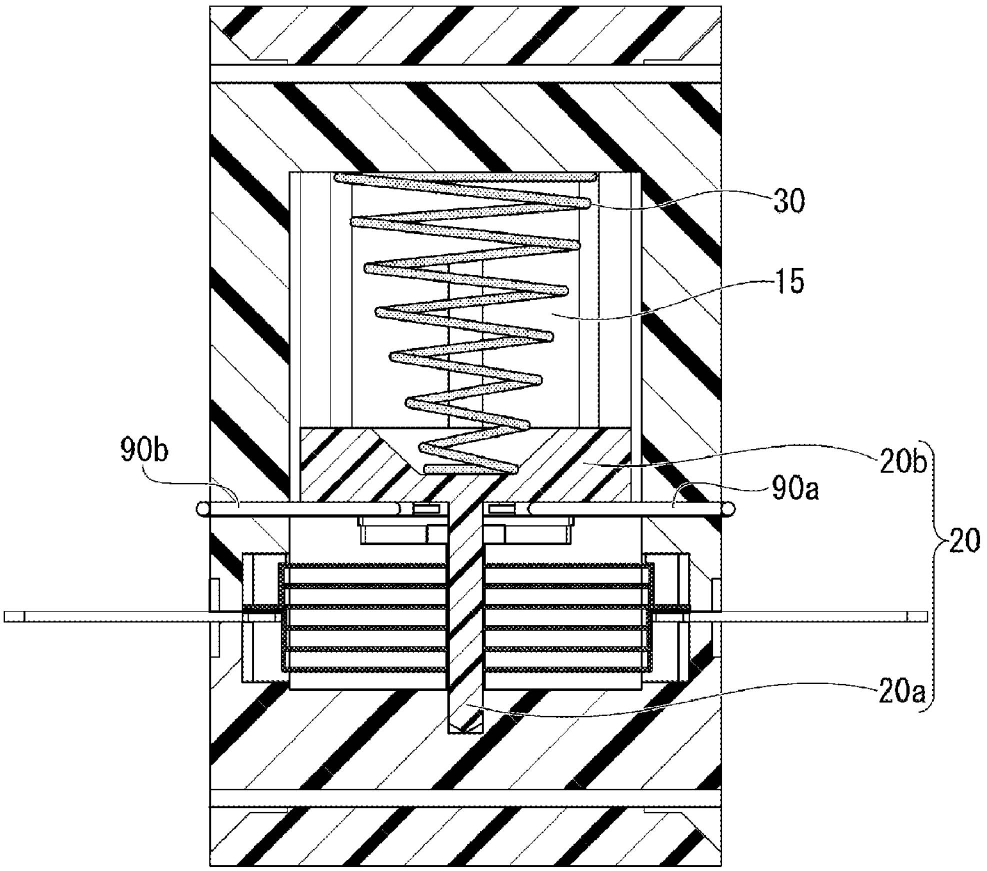
FIG. 6 is a cross-sectional view of a protective element in a state wherein a shielding member has cut the fuse element and is all the way down.

An internal pressure buffer space 15 (see FIG. 5(*a*) and FIG. 6) is formed inside the holding member 10B. The internal pressure buffer space 15 acts to suppress rapid rises in internal pressure in the protective element 100 by gas generated by arc discharge caused when the fuse element stacked body 40 is fused.

The cover 10A and the holding member 10B are preferably formed of a material having a tracking resistance index CTI (resistance to tracking (carbonized conduction path) breakdown) of 500 V or greater.

The tracking resistance index CTI can be found by testing based on IEC60112.

A resin material can be used as the material for the cover 10A and the holding member 10B. Resin materials have a lower heat capacity and a lower melting point than ceramic materials. Therefore, it is preferable to use a resin material as the material of the holding member 10B, due to the characteristic wherein an arc discharge is weakened due to gasification cooling (ablation), and the characteristic wherein melted and scattered metal particles, when adhering to the holding member 10B, are sparse and an electrically conductive path does not readily form from the surface of the holding member 10B being deformed and adherents being coagulated.

For example, a polyamide-based resin or a fluorine-based resin can be used as the resin material. The polyamide-based resin may be an aliphatic polyamide or a semi-aromatic polyamide. Examples of an aliphatic polyamide include nylon 4, nylon 6, nylon 46, and nylon 66. Examples of a semi-aromatic polyamide include nylon 6T, nylon 9T, and polyphthalamide (PPA) resin. An example of a fluorine-based resin includes polytetrafluoroethylene. Furthermore, polyamide-based resins and fluorine-based resins have high heat resistance and are difficult to burn. In particular, aliphatic polyamides do not easily generate graphite even when burned. Therefore, forming the cover 10A and the holding member 10B using a aliphatic polyamide makes it possible to reliably prevent a new current path from being formed by graphite generated during arc discharge when the fuse element stacked body 40 melts.

(Fuse Element Stacked Body)

The fuse element stacked body includes a plurality of fusible conductor sheets (a plurality of fusible conductor sheets may be referred to as a fuse element) arranged in parallel in the thickness direction, and a plurality of the first insulating members, which is arranged between each of the plurality of fusible conductor sheets and arranged on the lowermost of the plurality of fusible conductor sheets, in a state proximal to or in contact with an outer side of the fusible conductor sheets, and in which a first opening or a first separation part is formed. The fuse element stacked body is made up of a fuse element and a first insulating member.

The fuse element stacked body 40 has six fusible conductor sheets 50*a*, 50*b*, 50*c*, 50*d*, 50*e*, and 50*f* arranged in parallel in the thickness direction (Z direction). First insulating members 60Ab, 60Ac, 60Ad, 60Ae, and 60Af are arranged between each of the fusible conductor sheets 50*a* to 50*f*. The first insulating members 60Aa to 60Af are arranged in proximity to or in contact with each of the fusible conductor sheets 50*a* to 50*f*. When arranged in proximity, the distance between the first insulating members 60Ab to 60Af and the fusible conductor sheets 50*a* to 50*f* is preferably 0.5 mm or less, and more preferably 0.2 mm or less. Moreover, the first insulating member 60Aa is arranged on an outer side of the fusible conductor sheet 50*a* arranged on the lowermost of the fusible conductor sheets 50*a* to 50*f*. Additionally, the second insulating member 60B is arranged on an outer side of the fusible conductor sheet 50*f* arranged on the uppermost of the fusible conductor sheets 50*a* to 50*f*. The width (length in the Y direction) of the fusible conductor sheets 50*a* to 50*f* is narrower than the width of the first insulating members 60Aa to 60Af and the second insulating members 60B.

The fuse element stacked body 40 is an example wherein there are six fusible conductor sheets, but the present invention is not limited to six, and it is sufficient as long as there are a plurality.

Each of the fusible conductor sheets 50*a* to 50*f* has a first end portion 51 and a second end portion 52 that face each other, and a fusion portion 53 positioned between the first end portion 51 and the second end portion 52. The first end portions 51 of the three fusible conductor sheets 50*a* to 50*c* from the bottom among the fusible conductor sheets 50*a* to 50*f* arranged in parallel in the thickness direction are connected to the lower surface of the first terminal 91, and the first end portions 51 of the three fusible conductor sheets 50*d* to 50*f* from the top are connected to the upper surface of the first terminal 91. Moreover, the second end portions 52 of the three fusible conductor sheets 50*a* to 50*c* from the bottom among the fusible conductor sheets 50*a* to 50*f* are connected to the lower surface of the second terminal 92, and the second end portions 52 of the three fusible conductor sheets 50*d* to 50*f* from the top are connected to the upper surface of the second terminal 92. Note that the connecting positions of the fusible conductor sheets 50*a* to 50*f* and the first terminal 91 and the second terminal 92 are not limited to this. For example, all of the first end portions 51 of the fusible conductor sheets 50*a* to 50*f* may be connected to the upper surface of the first terminal 91 or may be connected to the lower surface of the first terminal 91. Moreover, all of the second end portions 52 of the fusible conductor sheets 50*a* to 50*f* may be connected to the upper surface of the second terminal 92, and may be connected to the lower surface of the second terminal 92.

Each of the fusible conductor sheets 50*a* to 50*f* may be a stacked body containing a low melting point metal layer and a high melting point metal layer, and may be a single layer. A stacked body containing a low melting point metal layer and a high melting point metal layer may have a structure wherein the periphery of the low melting point metal layer is covered by a high melting point metal layer.

The low melting point metal layer of the stacked body contains Sn. The low melting point metal layer may be an Sn simple substance or an Sn alloy. The Sn alloy is an alloy having Sn as a principal component thereof. An Sn alloy is an alloy wherein the content of Sn is highest among the metals contained in the alloy. Examples of an Sn alloy include Sn—Bi alloys, In—Sn alloys, and Sn—Ag—Cu alloys. The high melting point metal layer contains Ag or Cu. The high melting point metal layer may be solely Ag, may be solely Cu, may be an Ag alloy, and may be a Cu alloy. An Ag alloy is an alloy wherein the content of Ag is highest among the metals contained in the alloy, and a Cu alloy is an alloy wherein the content of Cu is highest among the metals contained in the alloy. A stacked body may have a two-layer structure of a low melting point metal layer/high melting point metal layer, and may have a multilayer structure of three layers or more containing two or more layers of a high melting point metal layer and one or more layers of a low melting point metal layer, wherein the low melting point metal layer is arranged between the high melting point metal layers.

In the case of a single layer, the layer contains Ag or Cu. A single layer may be solely Ag, may be solely Cu, may be an Ag alloy, and may be a Cu alloy.

Each of the fusible conductor sheets 50*a* to 50*f* may include a through hole 54 (54*a*, 54*b*, and 54*c*) in the fusion portion 53. In the examples illustrated in the figures, there are three through holes, however, the number is not limited. Having the through hole 54 makes the cross-sectional area of the fusion portion 53 smaller than the cross-sectional area of the first end portion 51 and the second end portion 52. In the case that a large current that exceeds a rated value flows to each of the fusible conductor sheets 50*a* to 50*f* by having the cross-sectional area of the fusion portion 53 be smaller, the amount of heat generated in the fusion portion 53 increases, by which the fusion portion 53 forms a fusion portion and readily fuses. The configuration by which the fusion portion 53 fuses more readily than the first end portion 51 and second end portion 52 sides is not limited to a through hole, and configurations such that narrow a width and partially thin a thickness are also possible. A notch shape such as a perforation is also acceptable.

Moreover, in each of the fusible conductor sheets 50*a* to 50*f*, the fusion portion 53, which is configured to readily be fused, is readily cut by a protruding portion 20*a* of the shielding member 20.

The thickness of the fusible conductor sheets 50*a* to 50*f* is a thickness that is fused by an overcurrent and that is physically cut by the shielding member 20. The specific thickness depends on the material or number (number of sheets) of the fusible conductor sheets 50*a* to 50*f* and a pressing force (stress) of the pressing means 30, however, for example, in the case that the fusible conductor sheets 50*a* to 50*f* are a copper foil, a range can be set to 0.01 mm to 0.1 mm as a standard. Moreover, in the case that the fusible conductor sheets 50*a* to 50*f* are an alloy, whose principal component is Sn, plated in Ag, a range can be set to 0.1 mm to 1.0 mm as a standard.

Each of the first insulating members 60Aa to 60Af are made up of a first insulating piece 63*a* and a second insulating piece 63*b* that face each other through a gap (first separation part) 64. The second insulating member 60B is similarly made up of a third insulating piece 66*a* and a fourth insulating piece 66*b* that face each other through a gap (second separation part) 65. In the examples illustrated in the drawings, the gaps 64 and 65 of the first insulating member 60Aa to 60Af and the second insulating member 60B are separation parts (first separation part and second separation part) that separate into two members (first insulating piece 63*a*, second insulating piece 63*b*, third insulating piece 66*a*, and fourth insulating piece 66*b*), but may be an opening (first opening and second opening) that permits movement (passage) of the protruding portion 20*a* of the shielding member 20.

The first insulating piece 63*a* and the second insulating piece 63*b* respectively have, on both end sides in the Y direction, and a ventilation hole 67 for efficiently releasing an increase in pressure, which accompanies arc discharge generated during cutoff of the fuse element, to a pressing means housing space of the insulating case. In the examples illustrated in the drawings, three each of the first insulating piece 63*a* and the second insulating piece 63*b* are respectively included on both end sides in the Y direction, however, the number is not limited.

The increase in pressure generated by arch discharge passes through the ventilation holes 67, and is efficiently released to the space housing the pressing means 30 of the insulating case 10 through gaps in four corners (not illustrated) provided between a pressing means support portion 20*b* and the second holding member 10Bb. Furthermore, as a result, shielding action of the shielding member 20 is carried out smoothly and breakdown of the first insulating members 60Aa to 60Af and the second insulating member 60B is prevented.

The gaps 64 and 65 are positioned facing the fusion portion 53 arranged between the first end portion 51 and the second end portion 52 of the fusible conductor sheets 50*a* to 50*f*. That is, the first insulating members 60Aa to 60Af and the second insulating member 60B are separated at positions facing the fusion portion 53 of the fusible conductor sheets 50*a* to 50*f*.

It is preferable that the first insulating members 60Aa to 60Af and the second insulating member 60B be formed of a material having a tracking resistance index CTI of 500 V or more.

A resin material can be used as the material for the first insulating members 60Aa to 60Af and the second insulating member 60B. Examples of the resin material are the same as the case for the cover 10A and the holding member 10B.

The fuse element stacked body 40 can be manufactured, for example, in the following manner.

Using a jig having positioning recesses corresponding to protrusions provided on the first insulating members 60Aa to 60Af and the second insulating member 60B and positioning-fixing recessed portions for the first terminal 91 and the second terminal 92, the fusible conductor sheets 50*a* to 50*f* and the first insulating members 60Ab to 60Af are each alternately stacked on the first insulating member 60Aa in the thickness direction, and the second insulating member 60B is arranged on the upper surface of the fusible conductor sheet 50*f*, which is arranged uppermost, to obtain a stacked body.

(Shielding Member)

The shielding member 20 has the protruding portion 20*a*, which faces the fuse element stacked body 40 side, and the pressing means support portion 20*b*, which has a recessed portion 20*ba* that houses and supports a lower portion of the pressing means 30.

Downward movement of the shielding member 20 is suppressed by the locking member 70 in a state wherein the pressing force of the pressing means 30 is applied downward. Therefore, when the locking member 70 is heated by heat generated by the heat-generating body 80 and softened at a temperature at or above a softening temperature thereof, the shielding member 20 becomes able to move downward. At this time, the softened locking member 70 is physically cut by the shielding member 20, or is thermally fused, or receives an action combining physical cutting and thermal fusion by the shielding member 20, depending on the type of material, heating conditions, and the like.

When the downward movement suppression by the locking member 70 is released, the shielding member 20 moves downward and physically cuts the fusible conductor sheets 50*a* to 50*f*.

The shielding member 20 has a leading edge 20*aa* of the protruding portion 20*a* that is pointed, formed to readily cut through the fusible conductor sheets 50*a* to 50*f*.

FIG. 6 illustrates a cross-sectional view of the protective element in a state wherein the shielding member 20 moves through the gaps 64 and 65 in the fuse element stacked body 40, cuts through the fusible conductor sheets 50*a*, 50*b*, 50*c*, 50*d*, 50*e*, and 50*f* using the protruding portion 20*a*, and the shielding member 20 is all the way down.

When the shielding member 20 moves down through the gaps 65 and 64 of the fuse element stacked body 40 and cuts the fusible conductor sheets 50*f*, 50*e*, 50*d*, 50*c*, 50*b*, and 50*a* in order, the cut surfaces are shielded and insulated from each other by the protruding portion 20*a* of the shielding member 20, and the current carrying path through each of the fusible conductor sheets is physically cut off in a reliable manner. Thus, arc discharge is rapidly eliminated (extinguished).

Moreover, when the shielding member 20 moves through the gaps 65 and 64 of the fuse element stacked body 40 and is all the way down, the pressing means support portion 20*b* of the shielding member 20 presses the fuse element stacked body 40 from the second insulating member 60B, and the fusible conductor sheets and the first insulating members 60Aa to 60Af as well as the second insulating member 60 adhere to each other, and a space where arc discharge can continue is therefore eliminated therebetween, and arc discharge reliably disappears.

The thickness (length in the X direction) of the protruding portion 20*a* is smaller than the width of the gaps 64 and 65 of the first insulating members 60Aa to 60Af and the second insulating member 60B in the X direction. According to this configuration, the protruding portion 20*a* can move in the gaps 64 and 65 downward in the Z direction.

For example, when the fusible conductor sheets 50*a* to 50*f* are a copper foil, the difference between the thickness of the protruding portion 20*a* and the width of the gaps 64 and 65 in the X direction can be set to 0.05 to 1.0 mm, for example, and is preferably set to 0.2 to 0.4 mm. If 0.05 mm or greater, when the cut minimum thickness is 0.01 mm, the movement of the protruding portion 20*a* becomes smooth even if the end portion of the fusible conductor sheets 50*a* to 50*f* enters the gap between the first insulating members 60Aa to 60Af and the second insulating member 60B and the protruding portion 20*a*, and arc discharge is eliminated more quickly and reliably. This is because the protruding portion 20*a* does not easily catch when the difference described above is 0.05 mm or more. Moreover, when the difference is 1.0 mm or less, the gaps 64 and 65 function as guides for moving the protruding portion 20*a*. Therefore, a positional shift of the protruding portion 20*a* while moving during fusion of the fusible conductor sheets 50*a* to 50*f* is prevented, and arc discharge is more quickly and reliably eliminated. When the fusible conductor sheets 50*a* to 50*f* are a foil having an alloy, whose principal component is Sn, plated on a periphery thereof in Ag, the difference between the thickness of the protruding portion 20*a* and the width of the gaps 64 and 65 in the X direction can be set to 0.2 to 2.5 mm, for example, and is preferably set to 0.22 to 2.2 mm.

The width (length in the Y direction) of the protruding portion 20*a* is wider than the width of the fusible conductor sheets 50*a* to 50*f* of the fuse element stacked body 40. According to this configuration, the protruding portion 20*a* can cut each of the fusible conductor sheets 50*a* to 50*f*.

The length L of the protruding portion 20*a* in the Z direction has a length such that the leading edge 20*aa* of the protruding portion 20*a* can reach below the first insulating member 60Aa arranged lowermost of the first insulating members 60Aa to 60Af in the Z direction when the protruding portion is all the way down in the Z direction. When below the first insulating member 60Aa arranged lowermost, the protruding portion 20*a* is inserted into an insertion hole 14 formed on an inner bottom surface 13 of the holding member 10Ba.

According to this configuration, the protruding portion 20*a* can cut each of the fusible conductor sheets 50*a* to 50*f*.

(Pressing Means)

The pressing means 30 is housed in the recessed portion 20*ba* of the shielding member 20 while the shielding member 20 is pressed downward in the Z direction.

For example, known means capable of imparting an elastic force such as a spring, rubber, and the like can be used as the pressing means 30.

A spring is used as the pressing means 30 in the protective element 100. The spring (pressing means) 30 is held in a compressed state in the recessed portion 20*ba* of the shielding member 20.

A known material can be used for the material of the spring used as the pressing means 30.

A cylindrical or conical spring can be used as the spring used as the pressing means 30. Contraction length can be shortened when using a conical spring, which allows for the suppression of a pressing height and miniaturization of the protective element. Moreover, conical springs can be stacked in a plurality to increase stress.

In the case of using a conical spring as the pressing means 30, the side having a smaller outer diameter may be arranged facing the fusion portion (cut portion) 53 side of the fusible conductor sheets 50*a* to 50*f*, respectively, and the side having the larger outer diameter may be arranged facing the fusion portions 53 of the fusible conductor sheets 50*a* to 50*f*, respectively.

In the case of using a conical spring as the pressing means 30, by arranging the side having the smaller diameter facing the fusion portion (cut portion) 53 side of the fusible conductor sheets 50*a* to 50*f*, respectively, for example, in the case that the spring is formed of a conductive material such as a metal, continued arc discharge generated during cutting of the fusion portions 53 respective to the fusible conductor sheets 50*a* to 50*f* can be more effectively suppressed. This is because a distance between the location of arc discharge generation and the conductive material forming the spring is easily secured.

Moreover, in the case of using a conical spring as the pressing means 30 wherein the side having the larger outer diameter is arranged facing the fusion portion 53 side of the fusible conductor sheets 50*a* to 50*f*, respectively, an elastic force can be uniformly imparted from the pressing means 30 by the shielding member 20, and is preferable.

(Locking Member)

The locking member 70 bridges the gap 65 of the second insulating member 60B and suppresses movement of the shielding member 20.

The protective element 100 is provided with three locking members 70 (70A, 70B, 70C), but the present invention is not limited to three locking members.

The locking member 70A is mounted in a groove 60Ba1 and a groove 60Ba2 of the second insulating member 60B, the locking member 70B is mounted in a groove 60Bb1 and a groove 60Bb2 of the second insulating member 60B, and the locking member 70C is mounted in a groove 60Bc1 and a groove 60Bc2 of the second insulating member 60B.

Figure 12:
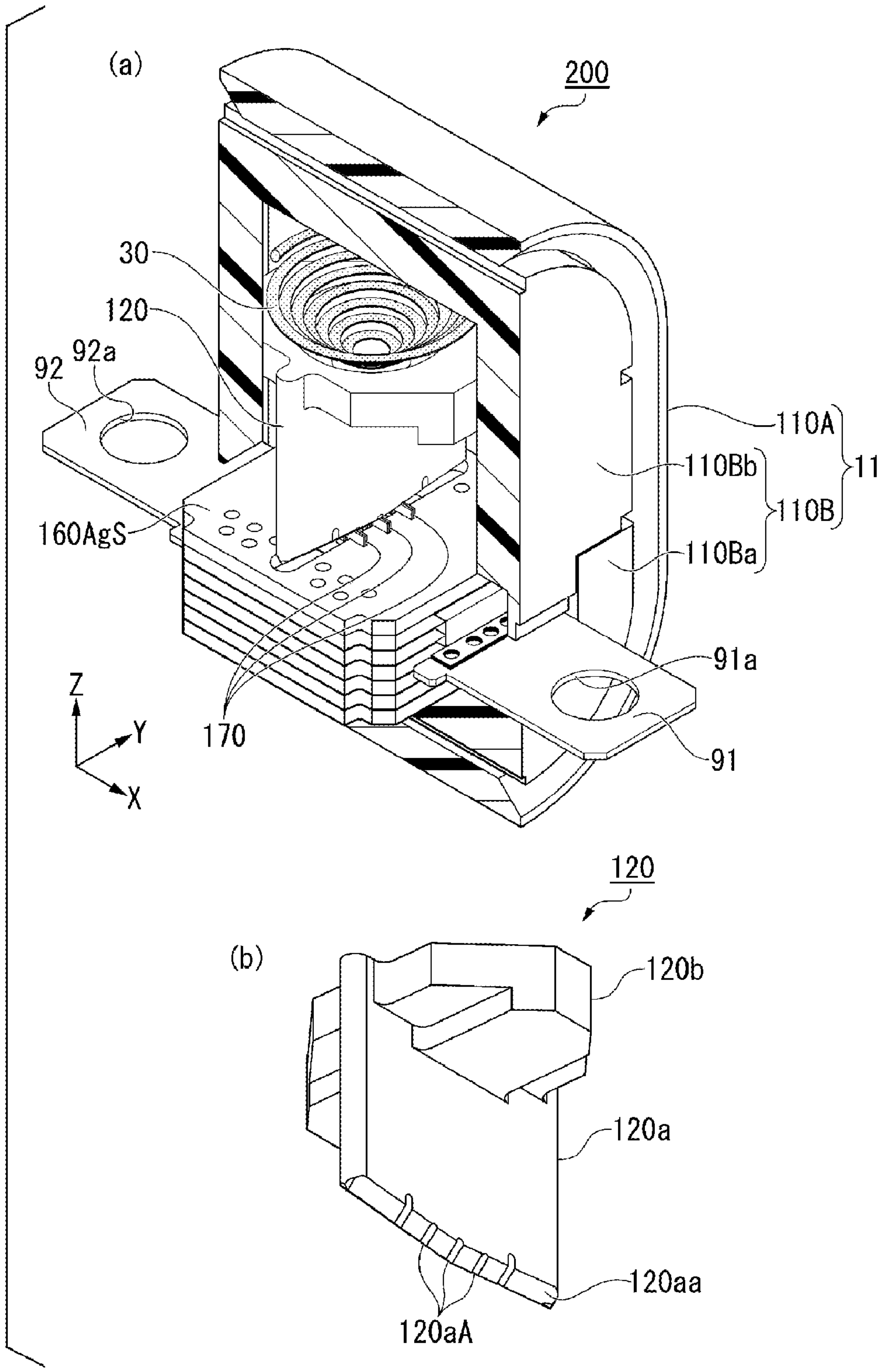
FIG. 12 is a partial perspective view schematically illustrated for viewing the interior of the protective element according to the second embodiment, wherein (b) is a lower side perspective view of the shielding member.

Moreover, there is a groove corresponding to the shape and position of the locking member in the leading edge 20*aa* of the protruding portion 20*a* of the shielding member 20 (see FIG. 12(*b*)), and this groove stably holds so as to interpose the locking member.

The three locking members 70A, 70B, and 70C have the same shape. A description of the shape of the locking member 70A is given using the drawings. The locking member 70A has a support portion 70Aa mounted and supported by a groove formed in the second insulating member 60B, and a projecting portion 70Ab that extends downward from the support portion and has a leading edge 70Aba that is proximal to or in contact with the uppermost fusible conductor sheet 50*f*. Among the locking members 70, all of the locking members have the same shape, but different shapes may be included.

Heat-generating bodies 80A and 80B are mounted on the locking members 70A, 70B, and 70C. When a current is supplied to the heat-generating bodies 80A and 80B, the heat-generating bodies 80A and 80B generate heat, transmit heat to the locking member 70, and the locking member 70 is heated and softened at a temperature at or above the softening temperature. Here, the softening temperature means a temperature or temperature range where a solid phase and a liquid phase mix or coexist. When the temperature of the locking member 70 is at or above the softening temperature, the locking member softens enough to deform due to external forces.

The softened locking member 70 is easily physically cut by the protruding portion 20*a* of the shielding member 20 pressed by the pressing force of the pressing means 30. When the locking member 70 is cut, the protruding portion 20*a* of the shielding member 20 is inserted downward in the Z direction into the gaps 65 and 64.

When the protruding portion 20*a* is inserted downward into in the Z direction into the gaps 65 and 64, the protruding portion 20*a* protrudes on and reaches the lowest position while cutting the fusible conductor sheets. Thus, the protruding portion 20*a* shields the fusible conductor sheets 50*a* to 50*f* into the first terminal 91 side and the second terminal 92 side by the fusion portions 53 thereof. Consequently, arc discharge generated when the fusible conductor sheets 50*a* to 50*f* are cut can be quickly and reliably eliminated.

The fusible conductor sheet 50*f* is heated via the locking member 70 by the heat generation of the heat-generating bodies 80A and 80B, and the other fusible conductor sheets are also heated, so that the fusible conductor sheets 50*a* to 50*f* are easily physically cut. Moreover, the fusible conductor sheet 50*f* can be thermally fused depending on the magnitude of heat generation of the heat-generating bodies 80A and 80B. In this case, the protruding portion 20*a* protrudes on as-is and reaches the lowest position.

In the locking member 70, the projecting portion 70Ab is in contact with the fusible conductor sheet 50*f*. Thus, when an overcurrent that exceeds the rated current flows through the fusible conductor sheet, the locking member 70 in contact with the fusible conductor sheet 50*f* transfers heat, the temperature thereof rises, and softening occurs at a temperature at or above the softening temperature.

Moreover, when a large overcurrent flows and the fusible conductor sheet 50*f* is fused instantly, the generated arc discharge also flows to the locking member 70, and the locking member 70 softens at a temperature at or above the softening temperature.

The softened locking member 70 is easily physically cut by the protruding portion 20*a* of the shielding member 20 pressed by the pressing force of the pressing means 30. When the locking member 70 is cut, the protruding portion 20*a* of the shielding member 20 is inserted downward in the Z direction into the gaps 65 and 64.

In this case, an overcurrent that exceeds the rated current flows, the fusible conductor sheet is thermally fused, and the protruding portion 20*a* is inserted as-is downward in the Z direction in the gaps 65 and 64. At this time, the protruding portion 20*a* shields the fusible conductor sheets 50*a* to 50*f* into the first terminal 91 side and the second terminal 92 side by the fusion portions thereof. Consequently, arc discharge generated when the fusible conductor sheets 50*a* to 50*f* are cut can be quickly and reliably eliminated.

Even if the fusible conductor sheets are not yet thermally fused, when the protruding portion 20*a* is inserted downward into in the Z direction into the gaps 65 and 64, the protruding portion 20*a* protrudes on and reaches the lowest position while cutting the fusible conductor sheets. Thus, the protruding portion 20*a* shields the fusible conductor sheets 50*a* to 50*f* into the first terminal 91 side and the second terminal 92 side by the fusion portions thereof. Consequently, arc discharge generated when the fusible conductor sheets 50*a* to 50*f* are cut off can be quickly and reliably eliminated.

Figure 7:
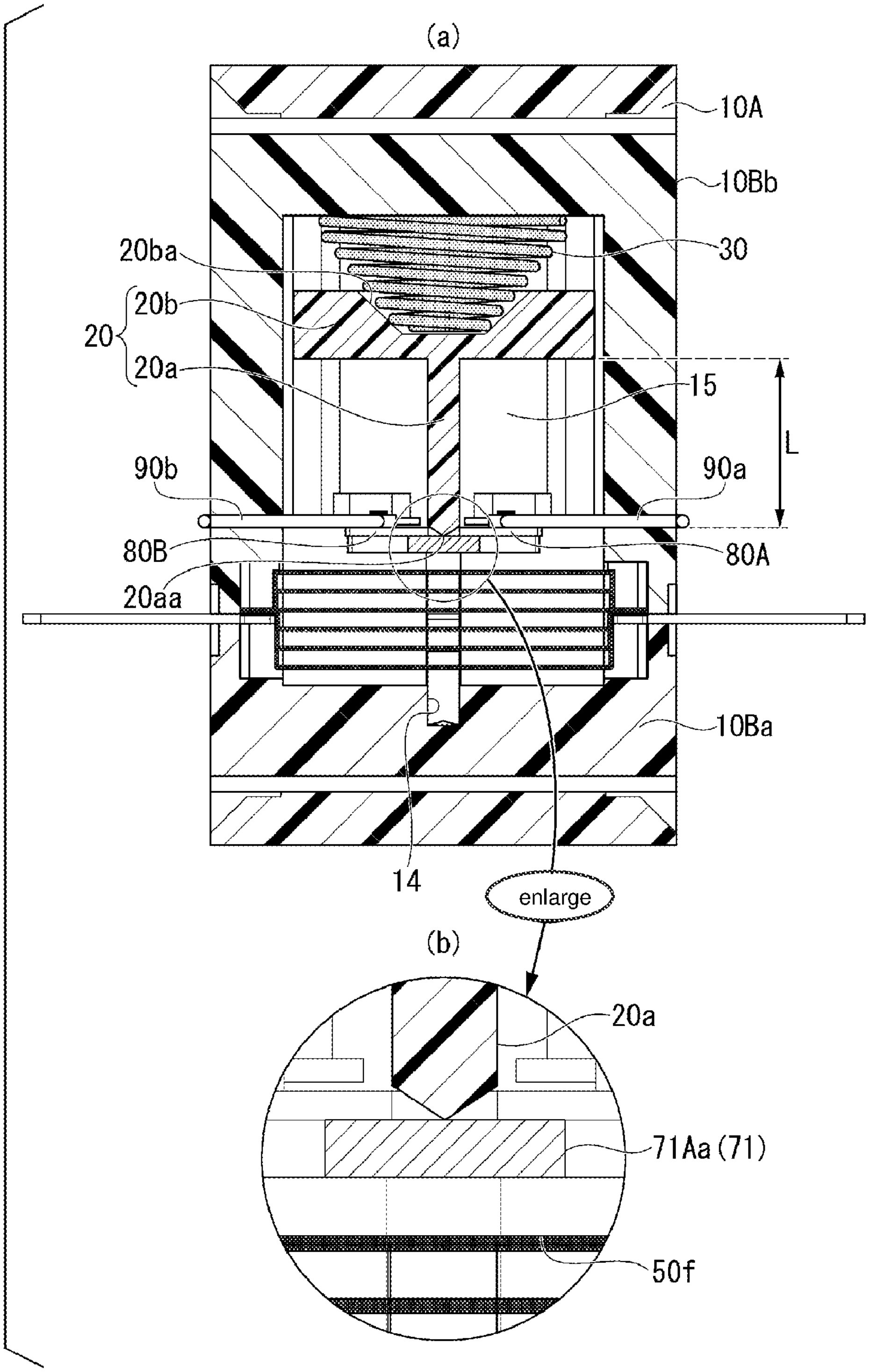
FIG. 7 (a) is a cross-sectional view of a protective element having a modified example of the locking member, and (b) is an enlarged view of the vicinity of the locking member.

FIG. 7(*a*) illustrates a protective element having a locking member 71, which is a modified example of the locking member 70. FIG. 7(*b*) is an enlarged view of the vicinity of the locking member 71.

The locking member 71 has only a support portion 71Aa that is mounted and supported by a groove formed in the second insulating member 60B, and is configured not having a projecting portion that contacts the fusible conductor sheet 50*f*.

Because the locking member 71 does not have a portion contacting the fusible conductor sheet 50*f*, it is not softened even if an overcurrent exceeding the rated current flows through the fusible conductor sheet, and is softened only by the heat-generating body 80. However, in a case where arc discharge is generated due to high voltage, the arc discharge reaches the locking member 71 and melts the locking member 71, and the protruding portion 20*a* shields the fusible conductor sheets 50*a* to 50*f* into the first terminal 91 side and the second terminal 92 side by the fusion portions thereof.

The material of the locking members 70 and 71 can be the same as that of the fusible conductor sheet, but in order to quickly soften due to energization of the heat-generating body 80, it is preferable that the stacked body contains a low melting point metal layer and a high melting point metal layer. For example, a material having an alloy, whose principal component is Sn having a melting point of 217° C., plated on a periphery thereof in Ag, having a melting point of 962° C., can be used.

(Heat-Generating Body)

The heat-generating body 80 is mounted so as to contact the upper surface of the locking member 70. Heat is generated by passing a current to the heat-generating body 80, and the locking member 70 is heated by the heat, softened, and melted.

A shielding member 20 to which a pressing force is applied in the Z direction downward by a pressing means 30 by melting the locking member 70 is inserted into a gap of the fuse element stacked body 40, and cuts the fusible conductor sheet 50, and the fuse element stacked body 40 is shielded to the first terminal 91 side and the second terminal 92 side.

The protective element 100 is provided with two heat-generating bodies 80 (80A, 80B), but the present invention is not limited to two heat-generating bodies.

Figure 8:
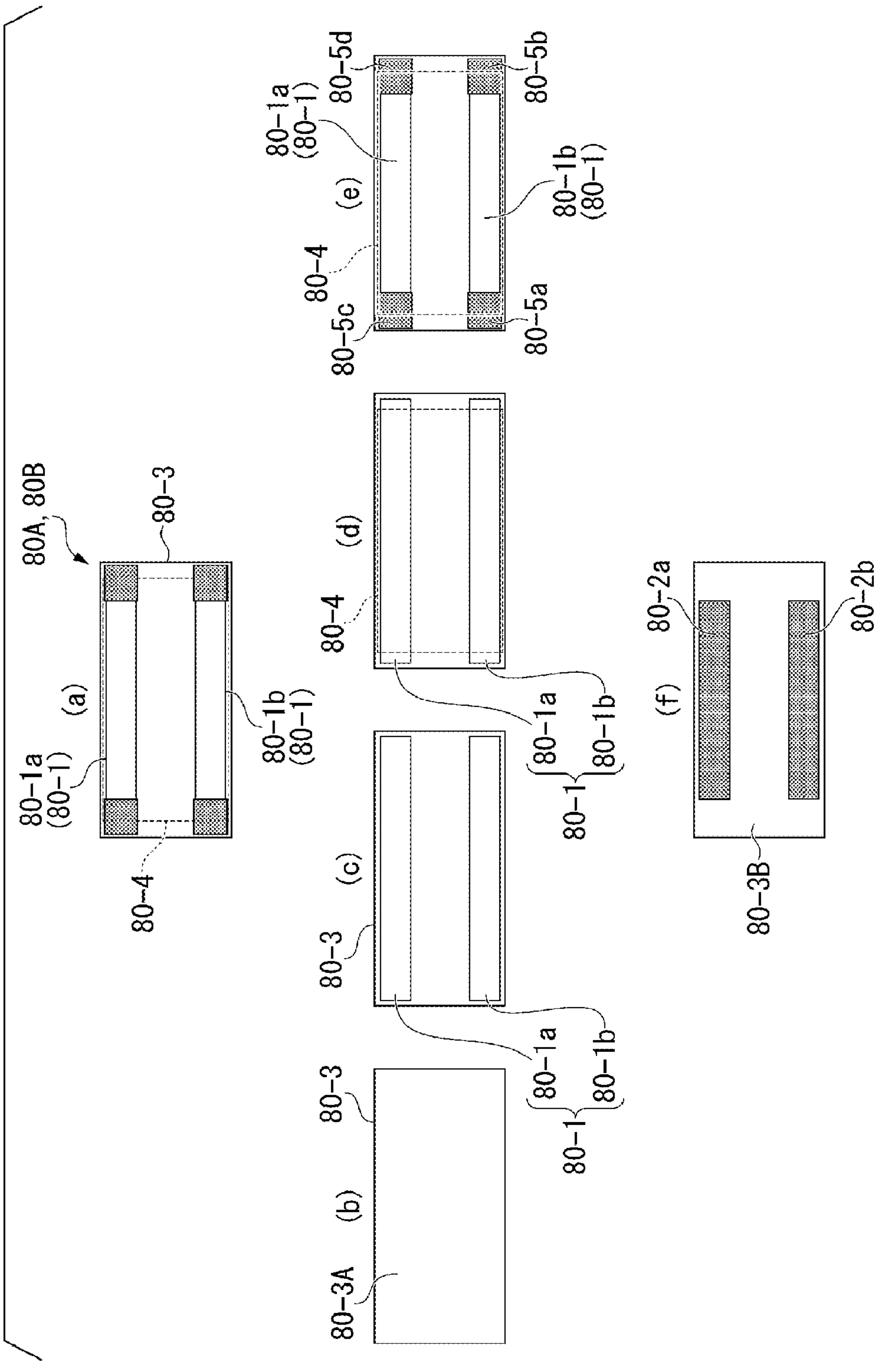
FIG. 8 illustrates one example of a structure of a heat-generating body, wherein (a) is a upper surface plan view, (b) is a upper surface plan view of an insulating substrate before printing, (c) is a upper surface plan view after resistance layer printing, (d) is a upper surface plan view after insulating layer printing, (e) is a upper surface plan view after electrode layer printing, and (f) is a lower surface plan view.

A schematic diagram of the heat-generating body 80 is illustrated in FIG. 8. FIG. 8(*a*) is a plan view of the front surface (surface on the pressing means 30 side) of the heat-generating body 80, FIG. 8(*b*) is a plan view of an insulating substrate, and FIGS. 8(*c*) to (*e*) are each transparent plan views illustrated such that the three layers on the front side of the insulating substrate are stacked in order, with the bottom layer also being visible. Being plan views, FIG. 8(*c*) is in a state wherein a resistance layer is stacked on the insulating substrate, (d) is in a state wherein an insulating layer is further stacked on that in (c), and (e) is in a state wherein an electrode layer is further stacked on that in (d). FIG. 8(*f*) is a plan view of a rear surface (surface on the fuse element stacked body 40 side) of the heat-generating body 80.

Each of the heat-generating bodies 80A and 80B has: two resistance layers 80-1 (80-1*a*, 80-1*b*) arranged in parallel and separated from each other on a front surface 80-3A (surface on the pressing means 30 side) of an insulating substrate 80-3; an insulating layer 80-4 covering the resistance layer 80-1; a heat-generating body electrode 80-5*a* and heat-generating body electrode 80-5*b* formed on the insulating substrate 80-3 and electrically connected to both ends of the resistance layer 80-1*a*; a heat-generating body electrode 80-5*c* and heat-generating body electrode 80-5*d* electrically connected to both ends of the resistance layer 80-1*b*; and an electrode layer 80-2 (80-2*a*, 80-2*b*) formed on a rear surface 80-3B (surface on the fuse element stacked body 40 side) of the insulating substrate 80-3. Two resistance layers are provided for each of the heat-generating bodies 80A and 80B, and these are fail-safe designs that take into account the possibility of being mounted rotated 180 degrees, and two are not essential.

The resistance layer 80-1 is made up of a conductive material which generates heat when energized, for example, Nichrome, W, Mo, Ru, or a material containing these. The resistance layer 80-1 is formed by mixing an alloy of these, a composition, or compound powders with a resin binder or the like, forming a paste, the pattern forming this paste on the insulating substrate 80-3 using a screen printing technique, and firing, or the like. The insulating substrate 80-3 is, for example, an insulating substrate having such as alumina, glass ceramic, mullite, zirconia, or the like. The insulating layer 80-4 is provided to protect the resistance layer 80-1. For example, an insulating material such as a ceramic or glass can be used as the material of the insulating layer 80-4. The insulating layer 80-4 can be formed by a method of coating and firing a paste of an insulating material.

The heat-generating body electrodes 80-5*a* to *d* on the front surface of each of the heat-generating bodies 80A and 80B and the electrode layers 80-2*a* and *b* on the rear surface are electrically insulated by the insulating substrate 80-3.

The heat-generating bodies 80A and 80B are not limited to those illustrated in FIG. 8, and a known heat-generating body may be used.

When a need arises to cut off a current carrying path due to, for example, an abnormality occurring in an external circuit serving as the current carrying path of the protective element 100, the heat-generating bodies 80A and 80B are energized and heated by a current control element provided on the external circuit.

(Power Supply Member)

Figure 9:
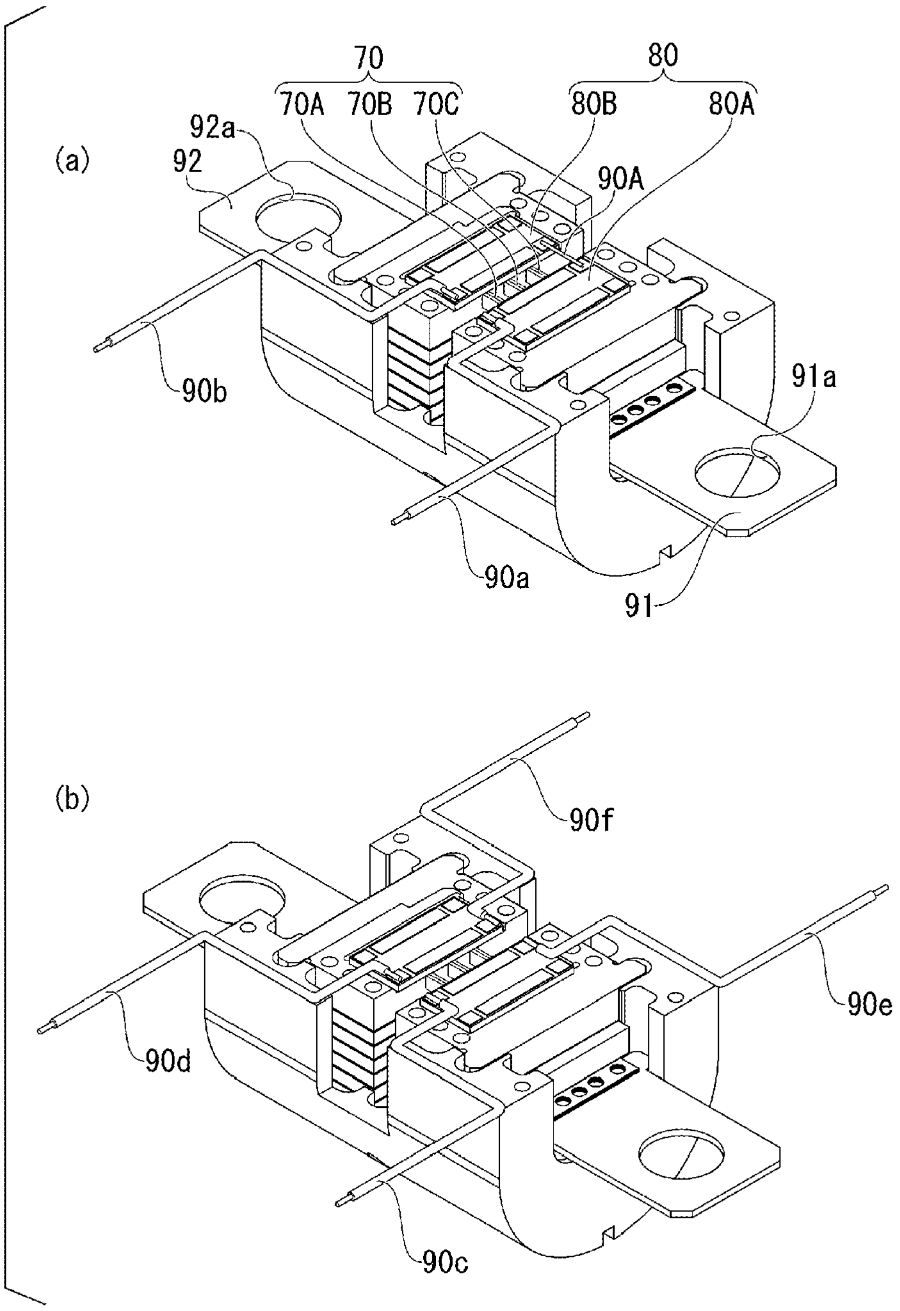
FIG. 9 is a perspective view of a protective element for describing a method for extracting a power supply member that supplies power to a heat-generating body, wherein (a) is a case wherein two heat-generating bodies are connected in series, and (b) is a case wherein two heat-generating bodies are connected in parallel.

FIG. 9 is a perspective view of a protective element for describing a method for extracting a power supply member that supplies power to the heat-generating bodies 80A and 80B, wherein (a) is a case wherein the heat-generating bodies 80A and 80B are connected in series, and (b) is a case wherein the heat-generating bodies 80A and 80B are connected in parallel.

In FIG. 9(*a*), the power supply member 90*a* is connected to the heat-generating body electrode 80-5*c* (see FIG. 8) of the heat-generating body 80A, the power supply member 90*b* is connected to the heat-generating body electrode 80-5*a* of the heat-generating body 80B (see FIG. 8), and a power supply member 90A is connected to the heat-generating body electrode 80-5*d* of the heat-generating body 80A (see FIG. 8) and the heat-generating body electrode 80-5*b* of the heat-generating body 80B (see FIG. 8). Moreover, the electrode layer 80-2 of the heat-generating body 80A is connected to the electrode layer 80-2 of the heat-generating body 80B through the locking members 70 (70A, 70B, 70C). In this configuration, power is supplied by the path: "the power supply member 90*a*—the heat-generating body electrode 80-5*c* of the heat-generating body 80A—the resistance layer 80-1*a* of the heat-generating body 80A—the heat-generating body electrode 80-5*d* of the heat-generating body 80A—the power supply member 90A—the heat-generating body electrode 80-5*b* of the heat-generating body 80B—the resistance layer 80-1*b* of the heat-generating body 80B—the heat-generating body electrode 80-5*a* of the heat-generating body 80B—the power supply member 90*b*" to heat the heat-generating bodies 80A and 80B. The locking members 70 (70A, 70B, 70C) are melted by this generation of heat, and the shielding member 20 is inserted into the gaps 64 and 65 of the fuse element stacked body 40. The shielding member 20 is inserted into the gaps 64 and 65 of the fuse element stacked body 40, whereby the power supply member 90A is cut, the power supply to the heat-generating bodies 80A and 80B is cut off, and the heat generation of the heat-generating bodies 80A and 80B stops.

In FIG. 9(*b*), a power supply member 90*c* is connected to the heat-generating body electrode 80-5*c* of the heat-generating body 80A, and a power supply member 90*e* is connected to the heat-generating body electrode 80-5*d* of the heat-generating body 80A. Moreover, a power supply member 90*d* is connected to the heat-generating body electrode 80-5*a* of the heat-generating body 80B, and a power supply member 90*f* is connected to the heat-generating body electrode 80-5*b* (see FIG. 8). In this configuration, a first path: "the power supply member 90*c*—the heat-generating body 80-5*c* of the heat-generating body 80A—the resistance layer 80-1*a* of the heat-generating body 80A—the heat-generating body electrode 80-5*d* of the heat-generating body 80A—the power supply member 90*e*", and a second path: "the power supply member 90*d*—the heat-generating body electrode 80-5*a* of the heat-generating body 80B—the resistance layer 80-1*b* of the heat-generating body 80B—the heat-generating body electrode 80-5*b* of the heat-generating body 80B—the power supply member 90*f*" are configured in parallel. Power is supplied by the first path and the second path, heating the heat-generating bodies 80A and 80B. The locking members 70 (70A, 70B, 70C) are melted by this generation of heat, and the shielding member 20 is inserted into the gaps 64 and 65 of the fuse element stacked body 40. In this configuration, the shielding member 20 is inserted into the gaps 64 and 65 of the fuse element stacked body 40, whereby the power supply to the heat-generating bodies 80A and 80B is not cut off and the heat generation of the heat-generating bodies 80A and 80B continues. Therefore, the heat generation of the heat-generating bodies 80A and 80B of the protective element 100 after cutting off can be stopped by appropriately stopping energization of current control elements by separate system control (a timer or the like).

(First Terminal and Second Terminal)

One end portion of the first terminal 91 is connected to the first end portion 51 of the fusible conductor sheets 50*a* to 50*f*, and the other end portion is exposed to the outside of the insulating case 10. Moreover, one end portion of the second terminal 92 is connected to the second end portion 52 of the fusible conductor sheets 50*a* to 50*f*, and the other end portion is exposed to the outside of the insulating case 10.

The first terminal 91 and the second terminal 92 may be substantially the same shape or may have different shapes. The thickness of the first terminal 91 and the second terminal 92 are not particularly limited, but may be within a range of, for example, 0.3 mm or more and 1.0 mm or less. The thickness of the first terminal 91 and the thickness of the second terminal 92 may be the same or may be different.

The first terminal 91 is provided with an external terminal hole 91*a*. Moreover, the second terminal 92 is provided with an external terminal hole 92*a*. One of the external terminal hole 91*a* or the external terminal hole 92*a* is used for connecting to the power source side, and the other is used for connecting to the load side. Alternatively, the external terminal hole 91*a* and the external terminal hole 92*a* may be used to be connected to the internal current carrying path of the load. The external terminal hole 91*a* and the external terminal hole 92*a* can be formed into a through-hole that is substantially circular in plan view.

For example, a terminal made up of copper, brass, nickel, or the like can be used as the first terminal 91 and the second terminal 92. As materials for the first terminal 91 and the second terminal 92, it is preferable to use brass from the perspective of strengthening rigidity, and it is preferable to use copper from the perspective of reducing electrical resistance. The first terminal 91 and the second terminal 92 may be made up of the same material or may be made up of different materials.

(Manufacturing Method of Protective Element)

The protective element 100 of the present embodiment can be manufactured in the following manner.

First, the fuse element stacked body 40, first terminal 91, the second terminal 92 positioned by a jig are prepared. Then, the first end portion 51 of each of the fusible conductor sheets 50*a* to 50*f* of the fuse element stacked body 40 and the first terminal 91 are connected by soldering.

Moreover, the second end portions 52 and the second terminal 92 are connected by soldering. Known solder materials can be used for soldering, and in terms of having low resistivity, melting point, and being lead-free for the environment, it is preferable to use solder materials having Sn as the principal component thereof. The connection between the first end portion 51 of the fusible conductor sheets 50*a* to 50*f* and the first terminal 91 and the connection between the second end portion 52 of the fusible conductor sheets 50*a* to 50*f* and the second terminal 92 are not limited to soldering and may use a known joining method such as joining by welding.

Next, the locking members 70A, 70B, and 70C are prepared. The locking members 70A, 70B, and 70C are respectively arranged in the groove 60Ba1 and the groove 60Ba2, the groove 60Bb1 and the groove 60Bb2, and the groove 60Bc1 and the groove 60Bc2 of the second insulating member 60B illustrated in FIG. 3.

Furthermore, a jig of the same shape as the second insulating member 60B may be used.

Next, solder paste and the heat-generating bodies 80A and 80B illustrated in FIG. 8(*a*) and FIG. 8(*b*) are prepared. Then, after applying an appropriate amount of solder paste to the connecting sites of the locking members 70A, 70B, and 70C and the heat-generating bodies 80A and 80B, the heat-generating bodies 80A and 80B are arranged in predetermined positions of the second insulating member 60B as illustrated in FIG. 9(*a*). The rear sides of the heat-generating bodies 80A and 80B are mounted on the locking members 70A, 70B, and 70C. The locking members 70A, 70B, and 70C and the heat-generating bodies 80A and 80B are connected by soldering by heating in an oven, a reflow furnace, or the like.

Next, the power supply members 90*a*, 90*b*, and 90A are prepared. The power supply member 90*a* is arranged on the power supply member mounting surface 12, and the power supply member 90*a* is connected by soldering to the heat-generating body electrode 80-5*c* of the heat-generating body 80A. Moreover, the power supply member 90*b* is arranged on the power supply member mounting surface 12, and the power supply member 90*b* is connected by soldering to the heat-generating body electrode 80-5*a* of the heat-generating body 80B. Moreover, the power supply member 90A is connected by soldering to the heat-generating body electrode 80-5*d* of the heat-generating body 80A and the heat-generating body electrode 80-5*b* of the heat-generating body 80B. The power supply members 90*a*, 90*b*, and 90A and the heat-generating bodies 80A and 80B may be connected by joining by welding, and a known joining method can be used.

Next, the second holding member 10Bb, the shielding member 20, and the pressing means 30 are prepared. Then, the pressing means 30 are arranged in the recessed portion 20*ba* of the shielding member 20 and housed in the second holding member 10Bb.

Next, while fitting the locking members 70A, 70B, and 70C into the grooves provided in the leading edge 20*aa* of the shielding member 20 and compressing the pressing means 30, the holding member 10B is formed by engaging the four protrusions (not illustrated) formed in corresponding locations of the second holding member 10Bb with recessed portions 17, two formed in each of the first end portion 10Baa and the second end portion 10Bab of the first holding member 10Ba.

Next, the cover 10A is prepared. Then, the holding member 10B is inserted into the housing portion 22 of the cover 10A. Next, an adhesive is injected into a terminal adhesive injection port 16 of the holding member 10B to fill in the gap between the terminal mounting surface 111 and the first terminal 91 and the second terminal 92. Moreover, an adhesive is injected into the inclined surface 21 on the elliptical side surface of the cover 10A which is a case adhesive injection port to adhere the cover 10A and the holding member 10B. For example, an adhesive containing a thermosetting resin can be used as the adhesive. Thus, the insulating case 10 is formed in which the inside of the cover 10A is sealed.

The protective element 100 of the present embodiment is obtained by the above steps.

In the protective element 100 of the present embodiment, in the case that an overcurrent exceeding the rated current flows to the fuse element 50 (the plurality of fusible conductor sheets 50*a* to 50*f*), the fuse element 50 is thermally fused and the current path is cut off, in addition to which, current is carried to the heat-generating bodies 80, the locking member 70 suppressing the movement of the shielding member 20 melts, and the shielding member 20 is moved by the pressing means 30, which makes it possible to physically cut the fuse element 50 and cut off the current path.

In the protective element 100 of the present embodiment, because the movement of the shielding member 20 to which a pressing force is applied by the pressing means 30 is suppressed by the locking members 70, a cutting pressing force is not applied by the pressing means 30 and the shielding member 20 to the fuse element 50 (the plurality of fusible conductor sheets 50*a* to 50*f*) other than when the current path is cut off. Therefore, deterioration over time of the fuse element 50 is suppressed, and disconnection caused by a state in which a pressing force is applied when the temperature of the fuse element 50 has risen can be prevented when there is no need to cut off the current path.

In the protective element 100 of the present embodiment, the fuse element stacked body 40 includes a plurality of the fusible conductor sheets 50*a* to 50*f* arranged in parallel in the thickness direction, and each of the fusible conductor sheets 50*a* to 50*f* is insulated by being proximal to or in contact with (adhered to) the first insulating members 60Aa to 60Af and the second insulating member 60B arranged therebetween. Therefore, the current value flowing through each of the fusible conductor sheets 50*a* to 50*f* becomes small and the space surrounding the fusible conductor sheets 50*a* to 50*f* becomes extremely narrow, making the scale of arc discharge generated by fusion more likely to be small. That is, when the fusion space is narrow, the gas in the space is reduced, the amount of "plasma generated by ionization of the gas in the space", which is the path through which the current flows during arc discharge, is also reduced, and arc discharge is more easily extinguished early. Therefore, according to the protective element 100 of the present embodiment, the size of the insulating case 10 can be made smaller and lighter.

In the protective element 100 of the present embodiment, when the first insulating member 60Aa is arranged between the fusible conductor sheet 50*a* arranged on the lowermost of the fusible conductor sheets 50*a* to 50*f* and the first holding member 10Ba of the insulating case 10, and the second insulating member 60B is arranged between the fusible conductor sheet 50*f* arranged on the uppermost of the fusible conductor sheets 50*a* to 50*f* and the second holding member 10Bb of the insulating case 10, the fusible conductor sheets 50*a* and 50*f* do not directly contact with the first holding member 10Ba and the second holding member 10Bb, a carbide that will be the conduction path is less likely to be formed on the inner surfaces of the insulating case 10 due to arc discharge, and thus leak current is less likely to occur even if the size of the insulating case 10 is reduced.

In the protective element 100 of the present embodiment, when the first insulating members 60Aa to 60Af and the second insulating member 60B are separated at a position opposing the fusion portion 53 of the first end portion 51 and the second end portion 52 of the fusible conductor sheets 50*a* to 50*f*, continuous adhesion of melted scattered material on the surfaces of the first insulating members 60Aa to 60Af and the second insulating member 60B can be suppressed when the fusible conductor sheets 50*a* to 50*f* are fused at the fusion portion 53. Therefore, arc discharge caused by fusion of the fusible conductor sheets 50*a* to 50*f* can be extinguished early.

In the protective element 100 of the present embodiment, when at least one of the first insulating members 60Aa to 60AF, the second insulating member 60B, the shielding member 20, the cover 10A of the insulating case 10, and the holding member 10B is formed by a material having a tracking resistance index CTI of 500 V or greater, a carbide that will be the conduction path is less likely to be formed on the interior thereof due to arc discharge, and thus leak current is less likely to occur even if the size of the insulating case 10 is reduced.

In the protective element 100 of the present embodiment, when at least one of the first insulating members 60Aa to 60Af, the second insulating member 60B, the shielding member 20, the cover 10A of the insulating case 10, and the holding member 10B is formed of a polyamide-based resin or a fluorine-based resin, the polyamide-based resin or the fluorine-based resin has excellent insulating properties and tracking resistance, making it easier to reduce both size and weight.

In the protective element 100 of the present embodiment, each of the fusible conductor sheets 50*a* to 50*f* is a stacked body containing a low melting point metal layer and a high melting point metal layer and when the low melting point metal layer contains Sn and the high melting point metal layer contains Ag or Cu, the high melting point metal is dissolved by Sn as the low melting point metal layer melts, and therefore, the fusing temperature of the fusible conductor sheets 50*a* to 50*f* is reduced. Furthermore, because Ag and Cu have higher physical strength than Sn, the physical strength of the fusible conductor sheets 50*a* to 50*f*, which is obtained by laminating a high melting point metal layer on a low melting point metal layer, becomes higher than the physical strength of the low melting point metal layer alone. Additionally, Ag and Cu have lower electrical resistivity than Sn, and the electrical resistance value of the fusible conductor sheets 50*a* to 50*f*, which is obtained by laminating a high melting point metal layer on a low melting point metal layer, becomes lower than the electrical resistance value of the low melting point metal layer alone. That is, the fuse element can handle a larger current.

In the protective element 100 of the present embodiment, when each of the fusible conductor sheets 50*a* to 50*f* is a stacked body having two or more high melting point metal layers and one or more low-melting-point metal layers, wherein the low melting point metal layers are arranged between the high melting point metal layers, the strength of the fusible conductor sheets 50*a* to 50*f* increases due to the high melting point metal layers on the outer side. In particular, when connecting the first end portion 51 of the fusible conductor sheets 50*a* to 50*f* and the first terminal 91, and the second end portion 52 and the second terminal 92 by soldering, deformation of the fusible conductor sheets 50*a* to 50*f* due to heating during soldering is less likely to occur.

In the protective element 100 of the present embodiment, when each of the fusible conductor sheets 50*a* to 50*f* is a single layer body containing silver or copper, the electrical resistivity is likely to be lower than when these are a stacked body having a high melting point metal layer and a low melting point metal layer. Therefore, the thickness of the fusible conductor sheets 50*a* to 50*f* formed from a single layer body containing silver or copper can be reduced even when having the same area and the same electrical resistance as the fusible conductor sheets 50*a* to 50*f* made up of a stacked body having a high melting point metal layer and a low melting point metal layer. When the thickness of the fusible conductor sheets 50*a* to 50*f* is thin, the amount of melted and scattered material when the fusible conductor sheets 50*a* to 50*f* is melted and broken decreases in proportion to the thickness, and the insulation resistance after cutting off increases.

In the protective element 100 of the present embodiment, each of the fusible conductor sheets 50*a* to 50*f* has the through hole 54 provided on the fusion portion 53 and has a fusion portion configured so a cross-sectional area of the fusion portion 53 in the current carrying direction is smaller than a cross-sectional area of the first end portion 51 and the second end portion 52 in the current carrying direction, so the region where fusion cutting occurs when a current exceeding a rating flows in a current path is stabilized. Note that although the through hole 54 is provided in the fusion portion 53 in the protective element 100 of the present embodiment, the method for reducing the cross-sectional area of the fusion portion 53 is not particularly limited. For example, the cross-sectional area of the fusion portion 53 may be reduced by cutting off both end portions of the fusion portion 53 in a concave shape or by partially decreasing the thickness.

Modified Examples

Figure 10:
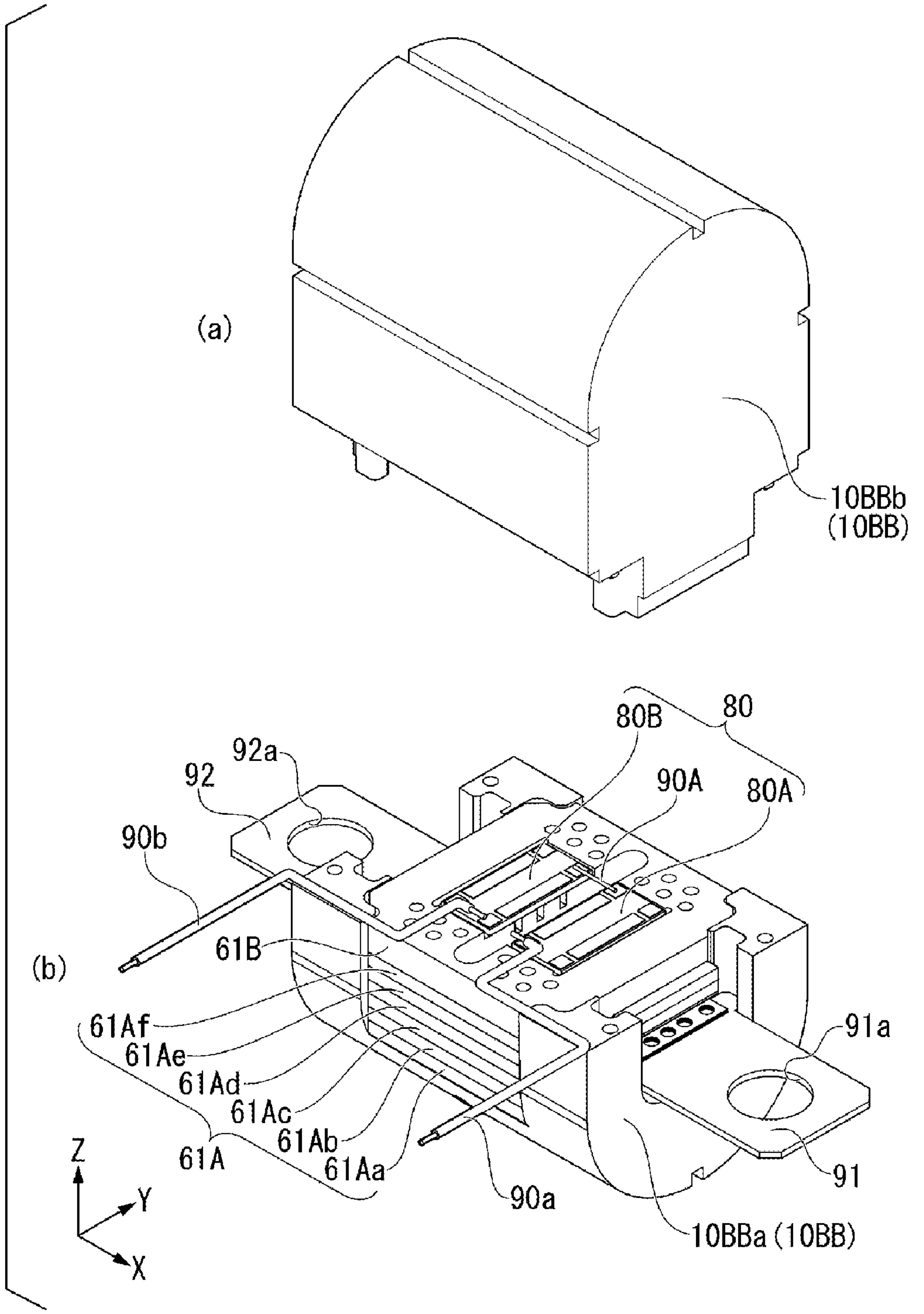
FIG. 10 is a schematic diagram of a modified example of the first embodiment, wherein (a) is a perspective view of a holding member 10BB that is a modified example of a holding member 10B, and (b) is a perspective view of the holding member 10BB that is a modified example of the holding member 10B, and a first insulating member 61A and a second insulating member 61B that are modified examples of a first insulating member 60A and a second insulating member 60B.
Figure 11:
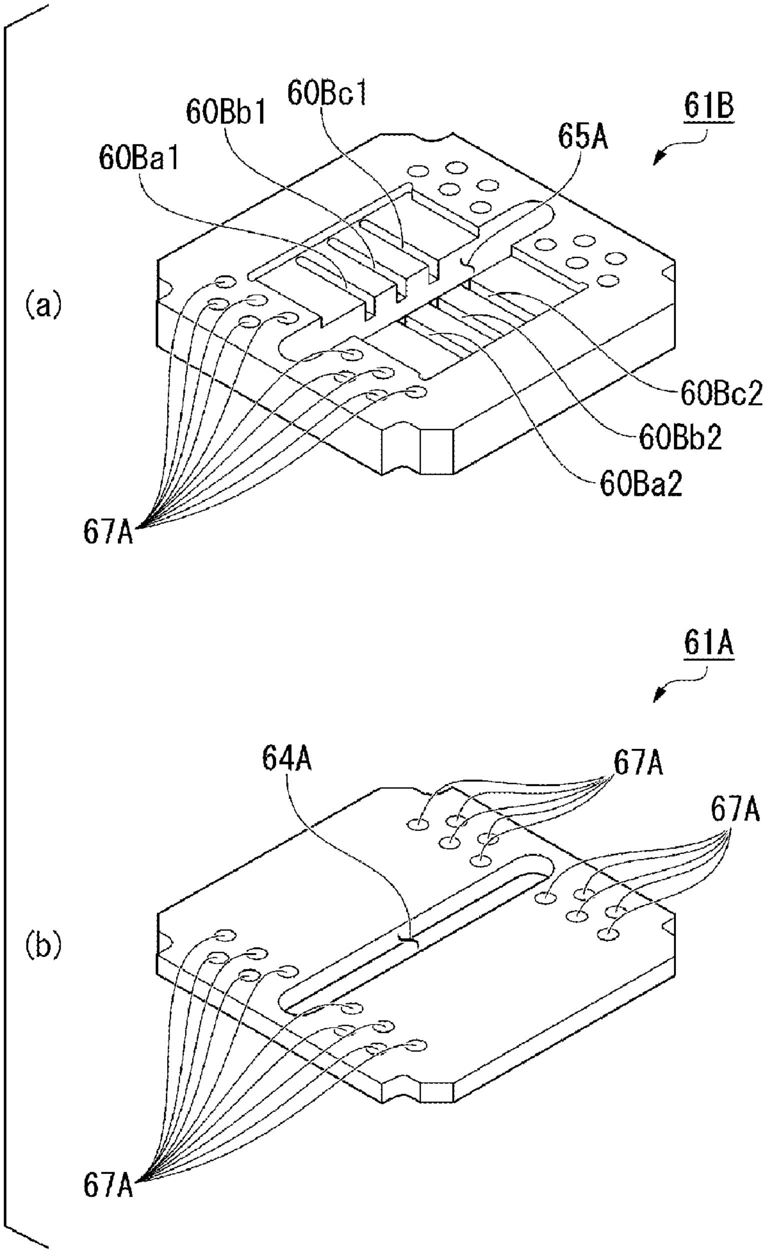
FIG. 11 (a) is a perspective view of the second insulating member 61B as a modified example, and (b) is a perspective view of the first insulating member 61A.

FIG. 10 is a schematic diagram of a modified example of the first embodiment, wherein (a) is a perspective view of a holding member 10BB that is a modified example of the holding member 10B, and (b) is a perspective view of a configuration wherein the first insulating member 61A and the second insulating member 61B, which are modified examples of the first insulating member 60A and the second insulating member 60B, have an opening so that a protruding portion 20*a* of the shielding member 20 can move (pass through). FIG. 11 (a) illustrates a schematic perspective view of the second insulating member, and (b) illustrates a schematic perspective view of the first insulating member. Note that because the six first insulating members have the same shape, the first insulating member illustrated in FIG. 11 (b) illustrates the common configuration thereof.

Note that the fuse element stacked body in this modified example has a similar configuration as that illustrated in FIG. 4 other than the first insulating member. Therefore, in the description below, members that are the same as the members illustrated in FIG. 4 are described using the same reference numerals.

Each of the first insulating members 61Aa to 61Af illustrated in FIG. 10 and FIG. 11 has a first opening 64A, and the second insulating member 61B has a second opening 65A. Furthermore, the length of the first opening 64A and the second opening 65A in the Y direction is greater than the length of the fusible conductor sheets 50*a* to 50*f* and the protruding portion 20*a* of the shielding member 20 in the Y direction. Thus, after the fusible conductor sheets 50*a* to 50*f* are cut off, the protruding portion 20*a* is inserted into the first opening 64A and the second opening 65A and the fusion portion of the fusible conductor sheets 50*a* to 50*f* are reliably shielded.

Each of the first insulating members 61Aa to 61Af and the second insulating member 61B respectively include, on both end sides in the Y direction, a ventilation hole 67A for efficiently releasing an increase in pressure, which accompanies arc discharge generated during cutoff of the fuse element, to a pressing means housing space of the insulating case. In the examples illustrated in the figures, each of the first insulating members 61Aa to 61Af and the second insulating member 61B have five respective ventilation holes 67A, respectively on both end sides in the Y direction, and interposing the first opening 64A or the second opening 65A on the left and right, but the number thereof is not limited.

The increasing pressure generated by the arc discharge passes through the ventilation hole 67A and is efficiently released to a space that houses the pressing means 30 of the insulating case 10 via the gaps (not illustrated) of the four corners provided between the pressing means support portion 20*b* and the second holding member 10BBb. Furthermore, as a result, the shielding action of the shielding member 20 is carried out smoothly and breakdown of the first insulating members 61Aa to 61Af and the second insulating member 61B is prevented.

The first opening 64A and the second opening 65A are positioned facing the fusion portion 53 arranged between the first end portion 51 and the second end portion 52 of the fusible conductor sheets 50*a* to 50*f*.

The materials of the first insulating member 61Aa to 61Af and the second insulating member 61B are preferably the same as the materials of the first insulating members 60Aa to 60Af and the second insulating member 60B, and a similar type of material can be used.

The holding members 10BB (second holding member 10BBb arranged on the upper side in the Z direction and first holding member 10BBa arranged on the lower side in the Z direction) illustrated in FIG. 10 (a) and FIG. 10 (b) are shaped to correspond to the modified examples of the first insulating member and the second insulating member.

Protective Element (Second Embodiment)

FIG. 12 to FIG. 15 are schematic diagrams illustrating the protective element according to the second embodiment of the present invention. In relation to the protective element according to the second embodiment, the main difference from the protective element according to the first embodiment is that as a mechanism for cutoff the current path, there is no an active cutoff mechanism using a heat-generating body, and there is only an overcurrent cutoff mechanism to cut off the current path by melting the fusible conductor sheet when an overcurrent that exceeds the rated current flows through the fusible conductor sheet. Specifically, in relation to the protective element according to the second embodiment, the main difference from the protective element according to the first embodiment is that there is no heat-generating body and no power supply member.

In the drawings below, components that are the same as or similar to those in the protective element according to the first embodiment will be given the same reference numerals and descriptions thereof will be omitted.

Figure 13:
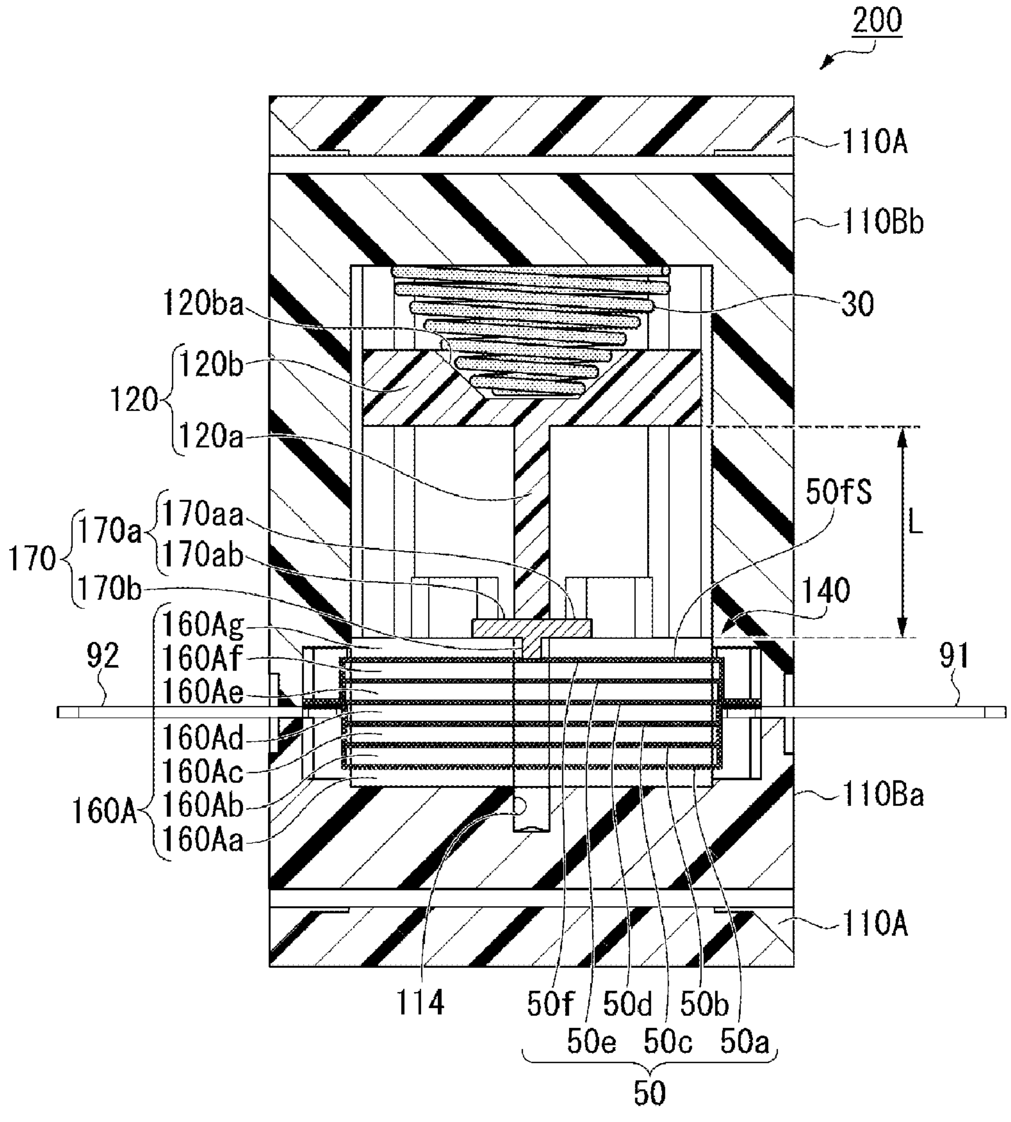
FIG. 13 is a cross-sectional view of the protective element according to the second embodiment, corresponding to FIG. 5(*a*).
Figure 14:
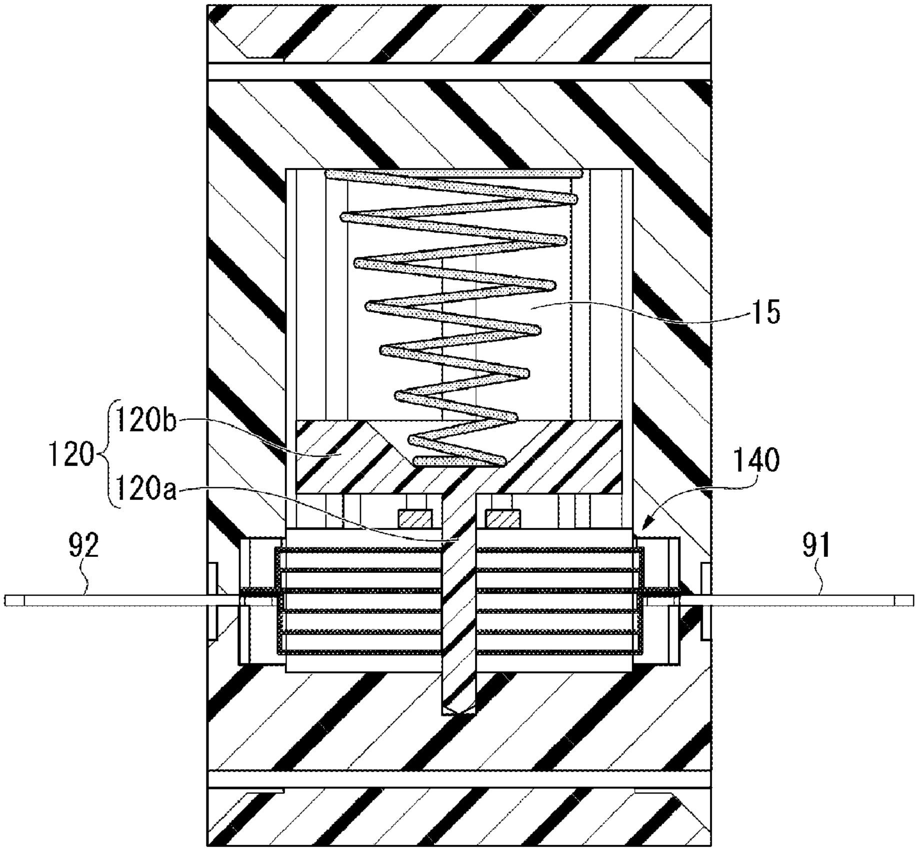
FIG. 14 is a cross-sectional view of the protective element in a state wherein a shielding member divides the fuse element and is all the way down.
Figure 15:
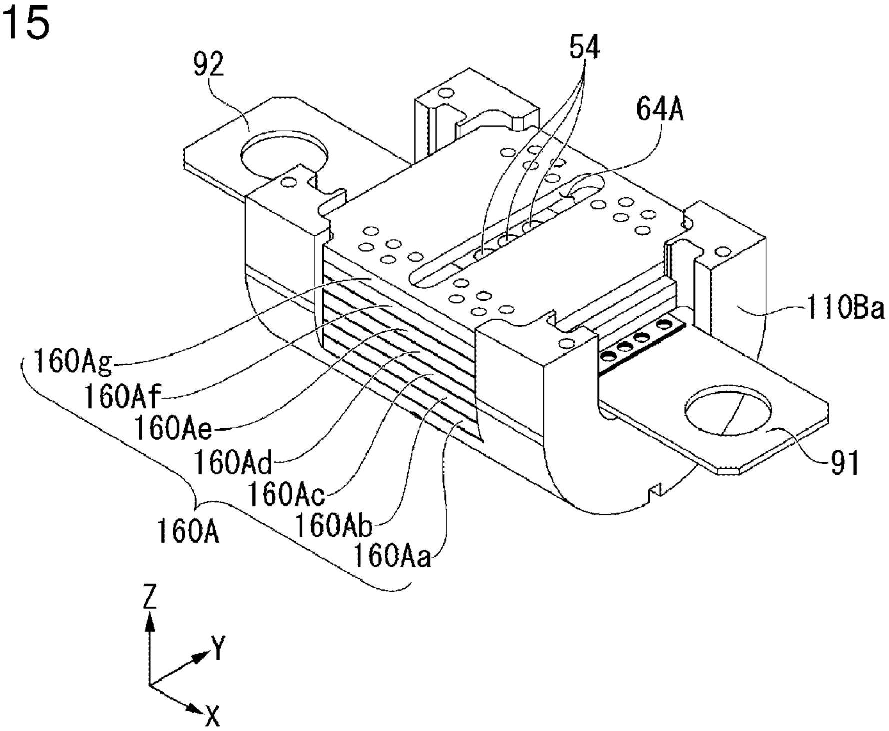
FIG. 15 is a perspective view schematically illustrating a state wherein a fuse element stacked body, a first terminal, and a second terminal are disposed on a first holding member.

FIG. 12 (a) is a diagram corresponding to FIG. 2, and is a partial perspective view schematically illustrated for viewing the interior of the protective element, wherein (b) is a perspective view of the shielding member. FIG. 13 is a cross-sectional view of the protective element according to the second embodiment, corresponding to FIG. 5(*a*). FIG. 14 is a cross-sectional view corresponding to FIG. 6, and is a cross-sectional view of a protective element in a state wherein a shielding member has cut the fuse element and dropped. FIG. 15 is a perspective view schematically illustrating a state wherein the fuse element stacked body, the first terminal, and the second terminal are disposed on a first holding member.

The protective element 200 illustrated in FIG. 12 to FIG. 15 has an insulating case 11, a fuse element stacked body 140, a first insulating member 160A, a shielding member 120, a pressing means 30, and a locking member 70. Note that in the protective element 200 of the present embodiment, the current carrying direction means the direction in which electricity flows during use (X direction), and the cross-sectional area of the current carrying direction means the area of the surface (Y-Z surface) in the direction orthogonal to the current carrying direction.

(Insulating Case)

The insulating case 11 is a substantial elongated cylindrical shape (an ellipse at any position where a cross section on the Y-Z surface is in the X direction). The insulating case 11 is made up of a cover 110A and a holding member 110B.

Because the protective element 200 does not have a heat-generating body and a power supply member, accordingly, the fact that the cover 110A and the holding member 110B do not have a portion for a heat-generating body or a portion for the power supply member is a difference compared to the cover 10A and the holding member 10B.

The holding member 110B is made up of a first holding member 110Ba arranged on the lower side in the Z direction and a second holding member 110Bb arranged on the upper side in the Z direction.

The external shape of the cover 110A and the holding member 110B is small and has a substantially oblong cylindrical shape so as to withstand internal rises in pressure due to arc discharge and suppresses the amount of material used, but the exterior shape is not limited to a substantially oblong cylindrical shape and can take any shape such as a rectangular parallelepiped as long as no breakdown occurs due to arc discharge according to the rated voltage, rated current, and cutoff capacity of the protective element.

An internal pressure buffer space 15 (see FIG. 14) is formed inside the holding member 110B. The internal pressure buffer space 15 acts to suppress rapid rises in internal pressure in the protective element 200 by gas generated by arc discharge caused when the fuse element stacked body 140 is fused.

Materials similar to those of the cover 10A and the holding member 10B can be used as materials for the cover 110A and the holding member 110B.

(Fuse Element Stacked Body)

The fuse element stacked body 140 includes a plurality of fusible conductor sheets 50 (a plurality of fusible conductor sheets may be referred to as a fuse element 50) arranged in parallel in the thickness direction, and a plurality of the first insulating members 160A (160Aa to 160Ag), which is arranged between each of the plurality of fusible conductor sheets 50 and in a state proximal to or in contact with an outer side of the fusible conductor sheets 50 arranged on the lowermost and uppermost of the plurality of fusible conductor sheets 50, and in which a first opening is formed. The fuse element stacked body 140 is made up of a fuse element and a first insulating member.

The plurality of fusible conductor sheets 50 have the same configuration as that illustrated in FIG. 4, and a description of the characteristics described above will therefore be omitted. Furthermore, the plurality of first insulating members 160A (160Aa to 160Ag) are all members having the same configuration, have the same configuration as the first insulating member 61A illustrated in FIG. 10(*b*), and a description of the characteristics described above will therefore be omitted.

The protective element 200 illustrated in FIG. 12 to FIG. 15 differs in that a first insulating member is provided in a location corresponding to the second insulating member 60B provided by the protection element 100. The protective element 200 may also be provided with an insulating member having a configuration different from that of the first insulating member, instead of the first insulating member arranged on the uppermost part.

Here, in the protective element 100, the second insulating member 60B is different from the first insulating member 60A in that a location is provided where the heat-generating body 80 is arranged, and the like. However, the first insulating member 60A can be replaced by a similar configuration, and in this case, there is no difference in configuration between the second insulating member 60B and the first insulating member 60A. In such a case, the protective element 100 and the fuse element stacked body 40 are made up of a fuse element and the first insulating member.

The fuse element stacked body 140 has six fusible conductor sheets 50*a*, 50*b*, 50*c*, 50*d*, 50*e*, and 50*f* arranged in parallel in the thickness direction (Z direction). First insulating members 160Ab, 160Ac, 160Ad, 160Ae, and 160Af are arranged between each of the fusible conductor sheets 50*a* to 50*f*. The first insulating members 160Ab to 160Af are arranged in proximity to or in contact with each of the fusible conductor sheets 50*a* to 50*f*. When arranged in proximity, the distance between the first insulating members 160Ab to 160Af and the fusible conductor sheets 50*a* to 50*f* is preferably 0.5 mm or less, and more preferably 0.2 mm or less.

Moreover, the first insulating member 160Aa is arranged on an outer side of the fusible conductor sheet 50*a* arranged on the lowermost of the fusible conductor sheets 50*a* to 50*f*. Additionally, the first insulating member 160Ag is arranged on an outer side of the fusible conductor sheet 50*f* arranged on the uppermost of the fusible conductor sheets 50*a* to 50*f*. The width (length in the Y direction) of the fusible conductor sheets 50*a* to 50*f* is narrower than the width of the first insulating members 160Aa to 160Ag.

The fuse element stacked body 140 is an example wherein there are six fusible conductor sheets, but the present invention is not limited to six, and it is sufficient as long as there is a plurality.

Moreover, in each of the fusible conductor sheets 50*a* to 50*f*, the fusion portion 53, which is configured to readily be fused, is readily cut by a protruding portion 120*a* of the shielding member 120.

The thickness of the fusible conductor sheets 50*a* to 50*f* is a thickness that is fused by an overcurrent. The specific thickness depends on the material or number (number of sheets) of the fusible conductor sheets 50*a* to 50*f* and a pressing force (stress) of the pressing means 30, however, for example, in the case that the fusible conductor sheets 50*a* to 50*f* are a copper foil, a range can be set to 0.01 mm to 0.1 mm as a standard.

Moreover, in the case that the fusible conductor sheets 50*a* to 50*f* are a foil, which is an alloy whose principal component is Sn, plated in Ag, a range can be set to 0.1 mm to 1.0 mm as a standard.

Each of the first insulating members 160Aa to 160Ag has a first opening 64A through which the protruding portion 120*a* of the shielding member 120 can move (pass) to the central portion in the X direction.

Each of the first insulating members 160Aa to 160Ag include a ventilation hole 67A for efficiently releasing an increase in pressure, which accompanies arc discharge generated during cutoff of the fuse element, to a pressing means housing space of the insulating case. In the examples illustrated in the figures, the first insulating members 160Aa to 160Ag have five respective ventilation holes 67A interposing the first opening 64A on both end sides in the Y direction on the left and right, but the number thereof is not limited.

The increasing pressure generated by the arc discharge passes through the ventilation hole 67A and is efficiently released to a space that houses the pressing means 30 of the insulating case 11 via the gaps (not illustrated) of the four corners provided between the pressing means support portion 120*b* and the second holding member 110Bb. Furthermore, as a result, the shielding action of the shielding member 120 is carried out smoothly and breakdown of the first insulating members 160Aa to 160Ag is prevented.

The first opening 64A is positioned facing the fusion portion 53 arranged between the first end portion 51 and the second end portion 52 of the fusible conductor sheets 50*a* to 50*f*.

(Shielding Member)

The shielding member 120 includes the protruding portion 120*a*, which faces the fuse element stacked body 140 side, and the pressing means support portion 120*b*, which includes a recessed portion 120*ba* that houses and supports a lower portion of the pressing means 30. A gripping groove 120*a*A for gripping the locking member 70 is provided on the leading edge of the protruding portion 120*a*. The shielding member 120 has three gripping grooves 120*a*A, but the present invention is not limited to this number.

Downward movement of the shielding member 120 is suppressed by the locking member 70 in a state wherein the pressing force of the pressing means 30 is applied downward. Because the projecting portion 70Ab of the locking member 70 is in contact with the fusible conductor sheet 50*f*, when an overcurrent that exceeds the rated current flows through the fusible conductor sheet, the locking member 70 transfers heat, the temperature thereof rises, and soften occurs at a temperature at or above the softening temperature. Moreover, when a large overcurrent flows and the fusible conductor sheet 50*f* is fused instantly, the generated arc discharge also flows to the locking member 70, and the locking member 70 softens at a temperature at or above the softening temperature. The softened locking member 70 is easily physically cut by the protruding portion 120*a* of the shielding member 120 pressed by the pressing force of the pressing means 30.

When the locking member 70 is cut and the suppressing of downward movement by the locking member 70 is released, the shielding member 120 moves downward and physically cuts the fusible conductor sheets 50*a* to 50*f*.

The shielding member 120 has a leading edge 120*aa* of the protruding portion 120*a* that is pointed, formed to readily cut through the fusible conductor sheets 50*a* to 50*f*.

FIG. 14 illustrates a cross-sectional view of the protective element in a state wherein the shielding member 120 has moved through the first opening 64A of the fuse element stacked body 140, cut through the fusible conductor sheets 50*a*, 50*b*, 50*c*, 50*d*, 50*e*, and 50*f* using the protruding portion 120*a*, and the shielding member 120 is all the way down.

When the shielding member 120 moves down through the first opening 64A of the fuse element stacked body 140 and cuts the fusible conductor sheets 50*f*, 50*e*, 50*d*, 50*c*, 50*b*, and 50*a* in order by the protruding portion 120*a* of the shielding member 120, the cut surfaces are shielded and insulated from each other by the protruding portion 120*a*, and the current carrying path through each of the fusible conductor sheets is physically cut off in a reliable manner. Thus, arc discharge is rapidly eliminated (extinguished).

Moreover, when the shielding member 120 moves through the first opening 64A of the fuse element stacked body 140 and is all the way down, the pressing means support portion 120*b* of the shielding member 120 presses the fuse element stacked body 140 from the first insulating member 160Ag and the fusible conductor sheet and the first insulating members 160Aa 160Ag adhere to each other, and a space where arc discharge can continue is therefore eliminated therebetween, and arc discharge reliably disappears.

The thickness (length in the X direction) of the protruding portion 120*a* is smaller than the width of the first opening portion 64A of the first insulating members 160Aa to 160Ag in the X direction. According to this configuration, the protruding portion 120*a* can move the first opening 64A downward in the Z direction.

For example, when the fusible conductor sheets 50*a* to 50*f* are a copper foil, the difference between the thickness of the protruding portion 120*a* and the width of the first opening 64A in the X direction can be made to be, for example, 0.05 to 1.0 mm, and it is preferable to be 0.2 to 0.4 mm. When 0.05 mm or greater, when the cut minimum thickness is 0.01 mm, the movement of the protruding portion 120*a* becomes smooth even if the end portion of the fusible conductor sheets 50*a* to 50*f* enters the gap between the first insulating members 160Aa to 160Ag and the protruding portion 120*a*, and the arc discharge is eliminated more quickly and reliably. This is because the protruding portion 120*a* is difficult to catch when the difference described above is 0.05 mm or more. Moreover, when the difference is 1.0 mm or less, the first opening 64A functions as a guide for moving the protruding portion 120*a*. Therefore, a positional shift of the protruding portion 120*a* wherein movement occurs when the fusible conductor sheets 50*a* to 50*f* are melted is prevented, and arc discharge is more quickly and reliably eliminated. When the fusible conductor sheets 50*a* to 50*f* are foils which are made of an alloy, whose principal component is Sn, plated in Ag, the difference between the thickness of the protruding portion 120*a* and the width of the first opening 64A in the X direction can be made to be, for example, 0.2 to 2.5 mm, and it is preferable to be 0.22 to 2.2 mm.

The width (length in the Y direction) of the protruding portion 120*a* is wider than the width of the fusible conductor sheets 50*a* to 50*f* of the fuse element stacked body 140. According to this configuration, the protruding portion 120*a* can cut each of the fusible conductor sheets 50*a* to 50*f*.

The length L of the convex portion 120*a* in the Z direction has a length such that the leading edge 120*aa* of the protruding portion 120*a* can reach below the first insulating member 160Aa arranged at the lowermost of the first insulating members 160Aa to 160Ag in the Z direction when the convex portion is all the way down in the Z direction. When the protruding portion 120*a* goes below the lowermost arranged first insulating member 160Aa, it is inserted into an insertion hole 114 formed on the inner bottom surface of the holding member 110Ba.

According to this configuration, the protruding portion 120*a* can cut each of the fusible conductor sheets 50*a* to 50*f*.

(Pressing Means)

The pressing means 30 is housed in the recessed portion 120*ba* of the shielding member 120 while the shielding member 120 is pressed downward in the Z direction.

For the pressing means 30, the same means can be used as that provided in the protective element 100.

(Locking Member)

For the configuration (shape and material) of the locking member 170, the same configuration can be used as that of the locking member 70.

The protective element 200 is provided with three locking members 170, but the present invention is not limited to three locking members.

Holding is performed while inserted into the gripping groove 120*a*A provided on the leading edge 120*aa* of the protruding portion 120*a* of the shielding member 120.

The locking members 170 have a T-shape and has a horizontally extending portion (support portion) 170*a*, made up of a first arm portion 170*aa* and a second arm portion 170*ab*, and a vertically extending portion (projecting portion) 170*b* extending downward from the central portion of the laterally extending portion 170*a*.

In the protective element 200, the horizontally extending portion 170*a* is supported on the shielding member-side surface 160AgS, the first arm portion 170*aa* and the second arm portion 170*ab* respectively interposing the first opening 64A of the first insulating member 160Ag, and the lower end of the vertically extending portion 170*b* is supported on the shielding member-side surface 50fS of the fusible conductor sheet 50*f*. In the examples illustrated in the figures, the shielding member-side surface 160AgS of the first insulating member 160Ag does not have a groove where the locking members 170 are mounted, but may have a groove where the locking members 170 are mounted.

When the vertically extending portion 170*b* is supported on the shielding member-side surface 50fS of the fusible conductor sheet 50*f*, when an overcurrent that exceeds the rated current flows through the fusible conductor sheet 50*f*, the locking members 170 contacting the fusible conductor sheet 50*f* transfer heat, the temperature thereof rises, and softening occurs at a temperature at or above the softening temperature.

In the protective element 200, parts on both of the horizontally extending portion 170*a* and the vertically extending portion 170*b* are supported, but it is also possible for either one to be supported. However, it is preferable that the vertically extending portion 170*b* is supported in contact with the shielding member-side surface 50fS of the fusible conductor sheet 50*f* so as to be softened when an overcurrent exceeding the rated current flows through the fusible conductor sheet 50*f*. When the vertically extending portion 170*b* is not in contact with the shielding member-side surface 50fS of the fusible conductor sheet 50*f*, it is preferable to be proximal to the shielding member-side surface 50fS.

All three locking members 170 have the same shape, but different shapes may be included.

When the temperature of the locking member 170 is at or above the softening temperature, the locking member softens enough to deform due to external forces.

The softened locking members 170 are easily physically cut by the protruding portion 120*a* of the shielding member 120 pressed by the pressing force of the pressing means 30. When the locking members 170 are cut, the protruding portion 120*a* of the shielding member 120 is inserted downward in the Z direction into the first opening 64A.

When the protruding portion 120*a* is inserted downward into in the Z direction into the first opening 64A, the protruding portion 120*a* protrudes on and reaches the lowest position while cutting the fusible conductor sheets. Thus, the protruding portion 120*a* shields the fusible conductor sheets 50*a* to 50*f* into the first terminal 91 side and the second terminal 92 side by the fusion portions 53 thereof. Consequently, arc discharge generated when the fusible conductor sheets 50*a* to 50*f* are cut can be quickly and reliably eliminated.

Among the locking members 170, the vertically extending portion 170*b* is in contact with the fusible conductor sheet 50*f*. Thus, when an overcurrent that exceeds the rated current flows through the fusible conductor sheet, the locking members 170 in contact with the fusible conductor sheet 50*f* transfer heat, the temperature thereof rises, and softening occurs at a temperature at or above the softening temperature.

Moreover, when a large overcurrent flows and the fusible conductor sheet 50*f* is fused instantly, the generated arc discharge also flows to the locking member 170, and the locking member 170 softens at a temperature at or above the softening temperature.

The softened locking members 170 are easily physically cut by the protruding portion 120*a* of the shielding member 120 pressed by the pressing force of the pressing means 30. When the locking members 170 are cut, the protruding portion 120*a* of the shielding member 120 is inserted downward in the Z direction into the first opening 64A.

In this case, an overcurrent that exceeds the rated current flows, the fusible conductor sheet is thermally fused, and the protruding portion 120*a* is inserted as-is downward in the Z direction in the first opening 64A. At this time, the protruding portion 120*a* shields the fusible conductor sheets 50*a* to 50*f* into the first terminal 91 side and the second terminal 92 side by the fusion portions thereof. Consequently, arc discharge generated when the fusible conductor sheets 50*a* to 50*f* are cut can be quickly and reliably eliminated.

Even if the fusible conductor sheets are not yet thermally fused, when the protruding portion 120*a* is inserted downward into in the Z direction into the first opening 64A, the protruding portion 120*a* protrudes on and reaches the lowest position while cutting the fusible conductor sheets. Thus, the protruding portion 120*a* shields the fusible conductor sheets 50*a* to 50*f* into the first terminal 91 side and the second terminal 92 side by the fusion portions thereof. Consequently, arc discharge generated when the fusible conductor sheets 50*a* to 50*f* are cut off can be quickly and reliably eliminated.

The protective element 200 according to the second embodiment, other than not having a heat-generating body or power supply member, has many members that are the same or similar to the protective element 100 according to the first embodiment, so description of a manufacturing method thereof is omitted.

In the protective element 200 of the present embodiment, when an overcurrent exceeding the rated current flows through the fuse element 50 (plurality of the fusible conductor sheets 50*a* to 50*f*), the fuse element 50 is thermally fused to cut off the current path.

In the protective element 200 of the present embodiment, because the movement of the shielding member 120 to which a pressing force is applied by the pressing means 30 is suppressed by the locking members 170, a cutting pressing force is not applied by the pressing means 30 and the shielding member 120 to the fuse element 50 (the plurality of fusible conductor sheets 50*a* to 50*f*) other than when the current path is cut off. Therefore, deterioration over time of the fuse element 50 is suppressed, and disconnection caused by a state in which a pressing force is applied when the temperature of the fuse element 50 has risen can be prevented when there is no need to cut off the current path.

In the protective element 200 of the present embodiment, the fuse element stacked body 140 includes a plurality of the fusible conductor sheets 50*a* to 50*f* arranged in parallel in the thickness direction, and each of the fusible conductor sheets 50*a* to 50*f* is insulated by being proximal to or in contact with (adhered to) the first insulating members 160Ab to 160Af arranged therebetween and the first insulating members 160Aa to 160Ag arranged outside of the fusible conductor sheets 50*a* and 50*f*. Therefore, the current value flowing through each of the fusible conductor sheets 50*a* to 50*f* becomes small and the space surrounding the fusible conductor sheets 50*a* to 50*f* becomes extremely narrow, making the scale of arc discharge generated by fusion more likely to be small. Therefore, according to the protective element 200 of the present embodiment, the size of the insulating case 11 can be made smaller and lighter.

In the protective element 200 of the present embodiment, when the first insulating member 160Aa is arranged between the fusible conductor sheet 50*a* arranged on the lowermost of the fusible conductor sheets 50*a* to 50*f* and the first holding member 110Ba of the insulating case 11, and the first insulating member 160Ag is arranged between the fusible conductor sheet 50*f* arranged on the uppermost of the fusible conductor sheets 50*a* to 50*f* and the second holding member 110Bb of the insulating case 11, the fusible conductor sheets 50*a* and 50*f* do not directly contact with the first holding member 110Ba and the second holding member 110Bb, a carbide that will be the conduction path is less likely to be formed on the inner surfaces of the insulating case 11 due to arc discharge, and thus leak current is less likely to occur even if the size of the insulating case 11 is reduced.

In the protective element 200 of the present embodiment, when the first insulating members 160Aa to 160Ag have an opening at a position opposing the fusion portion 53 of the first end portion 51 and the second end portion 52 of the fusible conductor sheets 50*a* to 50*f*, continuous adhesion of melted scattered material on the surfaces of the first insulating members 160Aa to 160Ag can be suppressed when the fusible conductor sheets 50*a* to 50*f* are fused at the fusion portion 53. Therefore, arc discharge caused by fusion of the fusible conductor sheets 50*a* to 50*f* can be extinguished early.

In the protective element 200 of the present embodiment, when at least one of the first insulating members 160Aa to 160Ag, the shielding member 120, the cover 110A of the insulating case 11, and the holding member 110B is formed by a material having a tracking resistance index CTI of 500 V or greater, a carbide that will be the conduction path is less likely to be formed on the interior thereof due to arc discharge, and thus leak current is less likely to occur even if the size of the insulating case 11 is reduced.

In the protective element 200 of the present embodiment, when at least one of the first insulating members 160Aa to 160Ag, the shielding member 120, the cover 110A of the insulating case 11, and the holding member 110B is formed of a polyamide-based resin or a fluorine-based resin, the polyamide-based resin or the fluorine-based resin has excellent insulating properties and tracking resistance, making it easier to reduce both size and weight.

In the protective element 200 of the present embodiment, each of the fusible conductor sheets 50*a* to 50*f* is a stacked body containing a low melting point metal layer and a high melting point metal layer and when the low melting point metal layer contains Sn and the high melting point metal layer contains Ag or Cu, the high melting point metal is dissolved by Sn as the low melting point metal layer melts, and therefore, the fusing temperature of the fusible conductor sheets 50*a* to 50*f* is reduced. Furthermore, because Ag and Cu have higher physical strength than Sn, the physical strength of the fusible conductor sheets 50*a* to 50*f*, which is obtained by laminating a high melting point metal layer on a low melting point metal layer, becomes higher than the physical strength of the low melting point metal layer alone. Additionally, Ag and Cu have lower electrical resistivity than Sn, and the electrical resistance value of the fusible conductor sheets 50*a* to 50*f*, which is obtained by laminating a high melting point metal layer on a low melting point metal layer, becomes lower than the electrical resistance value of the low melting point metal layer alone. That is, the fuse element can handle a larger current.

In the protective element 200 of the present embodiment, when each of the fusible conductor sheets 50*a* to 50*f* is a stacked body having two or more high melting point metal layers and one or more low-melting-point metal layers, wherein the low melting point metal layers are arranged between the high melting point metal layers, the strength of the fusible conductor sheets 50*a* to 50*f* increases due to the high melting point metal layers on the outer side. In particular, when connecting the first end portion 51 of the fusible conductor sheets 50*a* to 50*f* and the first terminal 91, and the second end portion 52 and the second terminal 92 by soldering, deformation of the fusible conductor sheets 50*a* to 50*f* due to heating during soldering is less likely to occur.

In the protective element 200 of the present embodiment, when each of the fusible conductor sheets 50*a* to 50*f* is a single layer body containing silver or copper, the electrical resistivity is likely to be lower than when these are a stacked body having a high melting point metal layer and a low melting point metal layer. Therefore, the thickness of the fusible conductor sheets 50*a* to 50*f* formed from a single layer body containing silver or copper can be reduced even when having the same area and the same electrical resistance as the fusible conductor sheets 50*a* to 50*f* made up of a stacked body having a high melting point metal layer and a low melting point metal layer. When the thickness of the fusible conductor sheets 50*a* to 50*f* is thin, the amount of melted and scattered material when the fusible conductor sheets 50*a* to 50*f* is melted and broken decreases in proportion to the thickness, and the insulation resistance after cutting off increases.

In the protective element 200 of the present embodiment, each of the fusible conductor sheets 50*a* to 50*f* has the through hole 54 provided on the fusion portion 53 and has a fusion portion configured so a cross-sectional area of the fusion portion 53 in the current carrying direction is smaller than a cross-sectional area of the first end portion 51 and the second end portion 52 in the current carrying direction, so the region where fusion cutting occurs when a current exceeding a rating flows in a current path is stabilized. Note that although the through hole 54 is provided in the fusion portion 53 in the protective element 200 of the present embodiment, the method for reducing the cross-sectional area of the fusion portion 53 is not particularly limited. For example, the cross-sectional area of the fusion portion 53 may be reduced by cutting off both end portions of the fusion portion 53 in a concave shape or by partially decreasing the thickness.

Fuse Element (Third Embodiment)

Figure 16:
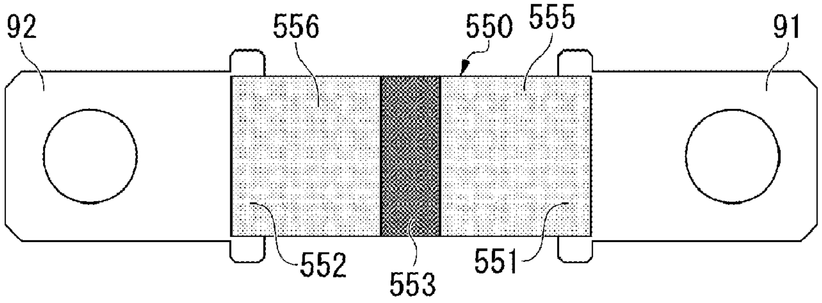
FIG. 16 is a schematic diagram of a fuse element according to the third embodiment, and is a plan view corresponding to FIG. 4(*a*).
Figure 17:
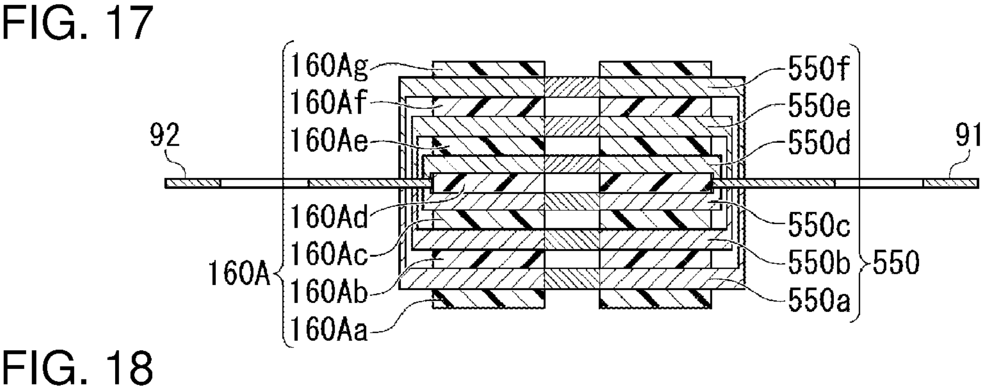
FIG. 17 is a schematic diagram of the fuse element according to the third embodiment and is a cross-sectional view corresponding to FIG. 4(*c*).
Figure 18:
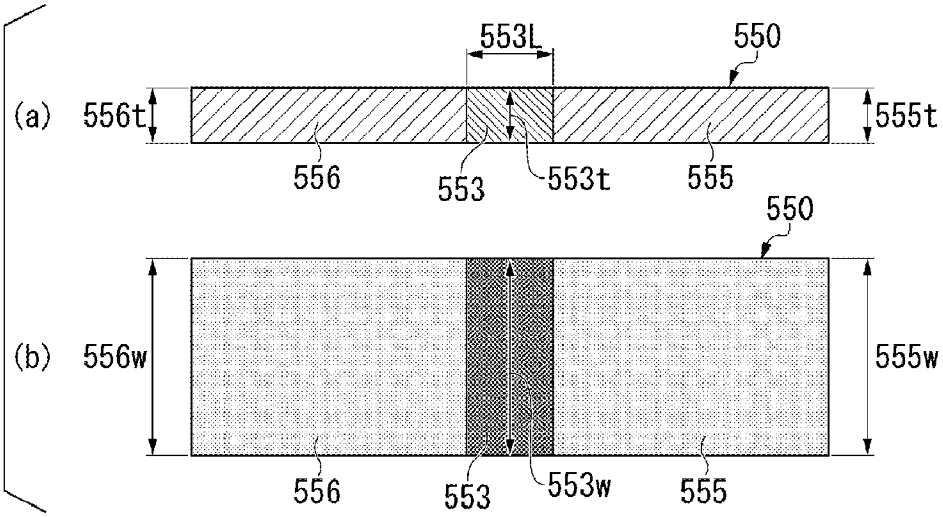
FIG. 18 (a) is a cross-sectional view of the fuse element according to the third embodiment, and (b) is a plan view of the fuse element.

FIG. 16 is a schematic diagram of a fuse element according to the third embodiment, and is a plan view corresponding to FIG. 4(*a*). FIG. 17 is a schematic diagram of the fuse element according to the third embodiment and is a cross-sectional view corresponding to FIG. 4(*c*). FIG. 18(*a*) is a cross-sectional view of the fuse element according to the third embodiment, and (b) is a plan view of the fuse element. In the drawings below, components that are the same as or similar to those in the configurations described above will be given the same reference numerals and descriptions thereof will be omitted.

As illustrated in FIG. 16 to FIG. 18, each of the plurality of fuse elements 550 is different from that illustrated in FIG. 4 in that each has a cutoff portion 553 (fusible conductor) for cutting off the current path between a first end portion 551 and a second end portion 552, has a low melting point metal layer or a stacked body containing a low melting point metal layer and a high melting point metal layer on the cutoff portion 553, has the high melting point metal layer on both the first end portion 551 and the second end portion 552, the low melting point metal layer contains Sn, and the high melting point metal layer contains silver or copper. However, the arrangement of the plurality of fuse elements 550 and the like has the same configuration as that illustrated in FIG. 4, and a description of the characteristics described above will therefore be omitted. Furthermore, the plurality of first insulating members 160A (160Aa to 160Ag) are all members having the same configuration, have the same configuration as that illustrated in FIG. 15, and a description of the characteristics described above will therefore be omitted.

For example, a material of a low melting point metal such as tin, or a stacked body in which high melting point metal such as silver or copper is stacked on a low melting point metal such as tin, can be used for the cutoff portion 553, and high melting point metal foils 555 and 556 (formed of a material having a lower resistance and a higher melting point than the cutoff portion) such as copper or silver can be connected to both ends thereof. As a result, the energization of the fuse element can be cut off without damage to the insulating member and the insulating case from the energization of 1.35 to 2 times the rated current to an explosive cutoff at 10 times or more.

For example, even when the fuse element between the terminals is made of the same material, a heat spot can be formed by reducing the thickness of the cutoff portion, but the cutoff portion may be at a high temperature for a prolonged period of time when energizing 1.35 to 2 times the rated current. In this case, when silver or copper, which are low resistance materials, are used in the metal foil, there is a possibility that the insulating member or insulating case will melt. Furthermore, when a low melting point metal such as tin is used for the fuse element, the resistance is higher than that of copper, and therefore, there is a possibility that the rated current cannot be increased. In contrast, in the present embodiment, a material of a low melting point metal such as tin, or a stacked body in which a high melting point metal such as silver or copper is stacked on a low melting point metal such as tin, is used for the cutoff portion 553, and high melting point metal foils 555 and 556 such as copper or silver are connected to both ends thereof, and therefore, unlike cutting off (exploding) using a large current of approximately 2000 A, the cutoff portion 553 can be slowly warmed and cut even using a low current of approximately 150 A to 250 A, and the probability of the insulating member or the insulating case melting is therefore low. Furthermore, in the present embodiment, laminating a high melting point metal on a low melting point metal of the cutoff portion 553 makes it possible to reduce resistance even when the thickness of the cutoff portion 553 is thin, and the probability that it will not be possible to increase the rated current is low.

For example, when the cutoff portion is only copper, because the cutoff portion is heated to 1000° C. or greater, which is the melting point of the copper, there is a high probability that the insulating case (for example, nylon) will melt during low current cutoff. In contrast to this, in the present embodiment, by using a stacked body of tin and silver in the cutoff portion 553, the melting point becomes approximately 300° C.; therefore, by fusing at about 300° C. during low current cutoff, heating stops before the insulating case melts.

Note that because the current value during low current cutoff depends on the rated current, 1.35 to 2 times the rated current becomes 210 to 300 A at a rated 150 A and 420 to 600 A at a rated 300 A.

For example, the insulating case can be formed of a resin material such as nylon having high tracking resistance. For example, the difference in melting points between the material of the insulating case and the material of the low melting point metal layer is preferably within 200° C. Thus, the energization of the fuse element can be cut off without damage to the insulating case over a large range from low current to high current.

For example, the difference in melting point between the material of the insulating case and the material of the low melting point metal layer is more preferably within 100° C., and even more preferably within 50° C.

For example, when the cutoff portion 553 has a stacked body containing a low melting point metal layer and a high melting point metal layer, the resistance can be reduced even when the cutoff portion 553 is thin. Therefore, it is possible to achieve both cutting using a pressing means such as a spring or rubber (cutting using a cutoff signal) and an increase in rated current. Thus, it is possible to realize a protective element having both overcurrent cutoff and a cutoff function using a cutoff signal.

The thickness of the fuse element 550 is made to be a thickness that is fused by an overcurrent. The specific thickness depends on the material and the number (number of sheets) of the fuse element 550 and the pressing force (stress) of the pressing means 30. For example, when each of the fuse elements 550 has the metal foils 555 and 556 connected to both ends of the fusible conductor 553 (cutoff portion), conditions of the dimensions and shape of the metal foils 555 and 556 and the fusible conductor 553 or the like can be in the following ranges. For example, the thicknesses 555*t* and 556*t* of the metal foils 555 and 556 can be in the range of 0.01 mm to 0.2 mm, and are more preferably 0.1 mm or less. For example, the thickness 553*t* of the fusible conductor 553 can be in the range of 0.01 mm to 0.2 mm, and is more preferably 0.1 mm or less. For example, the length 553L of the fusible conductor 553 can be in the range of 1 mm to 5 mm, is more preferably 4 mm or less, and even further preferably 3 mm or less. Here, the resistance value per 1 cm length with respect to the widths 555*w* and 556*w* of the metal foils 555 and 556 is R1, and the resistance value per 1 cm length with respect to the width 553*w* of the fusible conductor 553 is R2. For example, a resistance ratio R2/R1 can be in the range of 2 to 20, and is more preferably in the range of 2 to 10.

Disposing in parallel is also possible to reduce resistance (increase rated current), and the present invention has no limitations on arrangement. The examples illustrated in the drawings are examples wherein there are six fuse elements, but there is no limit to the number in the present invention.

For example, when the high melting point metal foils 555 and 556 connected to both ends of the fusible conductor 553 are formed of copper, the thickness 555*t* and 556*t* of the metal foils 555 and 556 can be 0.06 mm, the widths 555*w* and 556*w* can be 16 mm, and the resistivity can be $1.7\times10^{-8}$ [Ω·m]. For example, when the fusible conductor 553 is a stacked body (outer peripheral plating) of tin and silver, the fusible conductor 553 can have a thickness 553*t* of 0.077 mm (of which the silver plating thickness is 0.007 mm), a width 553*w* of 9 mm, a length 553L of 3 mm, and a resistivity of $7.0\times10^{-8}$ [Ω·m]. For example, the resistance value R1 per 1 cm length with respect to the widths 555*w* and 556*w* of the metal foils 555 and 556 is 0.18 mΩ, the resistance value R2 per 1 cm length with respect to the width 553*w* of the fusible conductor 553 is 1.11 mΩ, and the resistance ratio R2/R1 can be 6.3. Note that each of the values above is a mere example and the present invention is not limited thereto.

For example, when the fusible conductor 553 has the outer periphery of tin plated with silver, the fusible conductor 553 begins to melt at a temperature of about 230° C., and the fusible conductor 553 melts before the insulating member (for example, a resin material such as nylon) melts. That is, when the fuse element 550 melts, the insulating member does not melt. Consequently, energization of the fuse element 550 can be safely cut off even with a low current. Further, when the fusible conductor 553 is formed by plating the outer periphery of tin with silver, the fusible conductor has a lower melting point and a higher resistance than copper, so a heat spot can be formed even with a large current, and the energization of the fuse element 550 can be cut off. In other words, the fusible conductor portion having high resistance becomes a heat spot regardless of whether there is a low current or high current, and the current carrying to the fuse element 550 can be cut off by forming the heat spot at the fusible conductor portion.

(Method for Manufacturing Fuse Element)

The fuse element of the present embodiment can be manufactured in the following manner.

Figure 19:
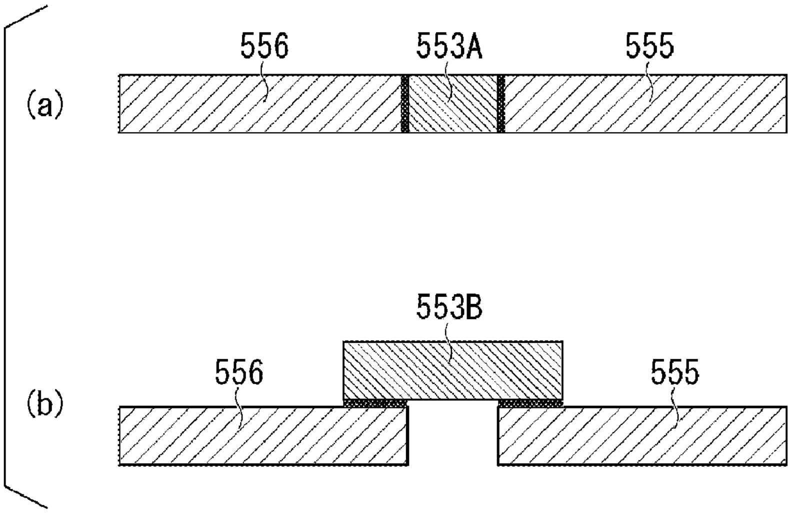
FIG. 19 (a) is a cross-sectional view of the fuse element in a first modified example of the third embodiment, and (b) is a cross-sectional view of the fuse element in a second modified example.

For example, as illustrated in FIG. 19(*a*), first, a fusible conductor 553A and two metal foils 555 and 556 are prepared. The two metal foils 555 and 556 are connected to both ends of the fusible conductor 553A. For example, an end portion of one metal foil 555 is connected to one end of the fusible conductor 553A by soldering, and an end portion of the other metal foil 556 is connected to the other end of the fusible conductor 553A by soldering. Known solder materials can be used for soldering, and in terms of having low resistivity, melting point, and being lead-free for the environment, it is preferable to use solder materials having Sn as the principal component thereof. The connection between the fusible conductor 553A and the metal foils 555 and 556 is not limited to soldering, and a known joining method such as joining by welding may be used.

For example, the connection between the fusible conductor 553 and the metal foils 555 and 556 may be on the same plane or may be overlapped. For example, the upper surface and the lower surface of the fusible conductor 553 in the Z direction may be arranged on the same plane as the upper surface and the lower surface of the two metal foils 555 and 556 in the Z direction, respectively. For example, as illustrated in FIG. 19(*b*), the lower surface of one end of the fusible conductor 553B in the Z direction may be connected to the upper surface of the end portion side of one metal foil 555 in the Z direction, and the lower surface of the other end of the fusible conductor 553B in the Z direction may be connected to the upper surface of the end portion side of the other metal foil 556 in the Z direction. The connection between the fusible conductor 553 and the metal foils 555 and 556 is not limited to the above.

Figure 20:
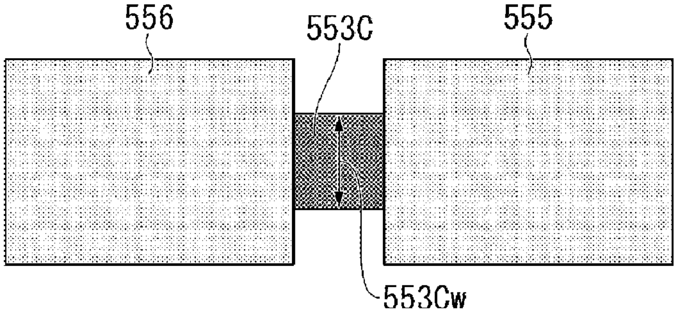
FIG. 20 is a plan view of the fuse element in a third modified example of the third embodiment.

For example, as illustrated in FIG. 20, the width of the metal foils 555 and 556 and a fusible conductor 553C may be different from a top view of the fuse element. For example, the width of the metal foils 555 and 556 is preferably larger than a width 553Cw of the fusible conductor 553C. Thus, a difference in resistance is more likely to occur, and therefore, the fusible conductor 553C is more likely to be cut.

In the illustrated example, the widths of the metal foils 555 and 556 are larger than the width 553Cw of the fusible conductor 553C, but the relationship between the widths is not limited.

For example, various configurations can be adopted for the configuration of the fusible conductor 553 in a cross-sectional view of the fuse element.

Figure 21:
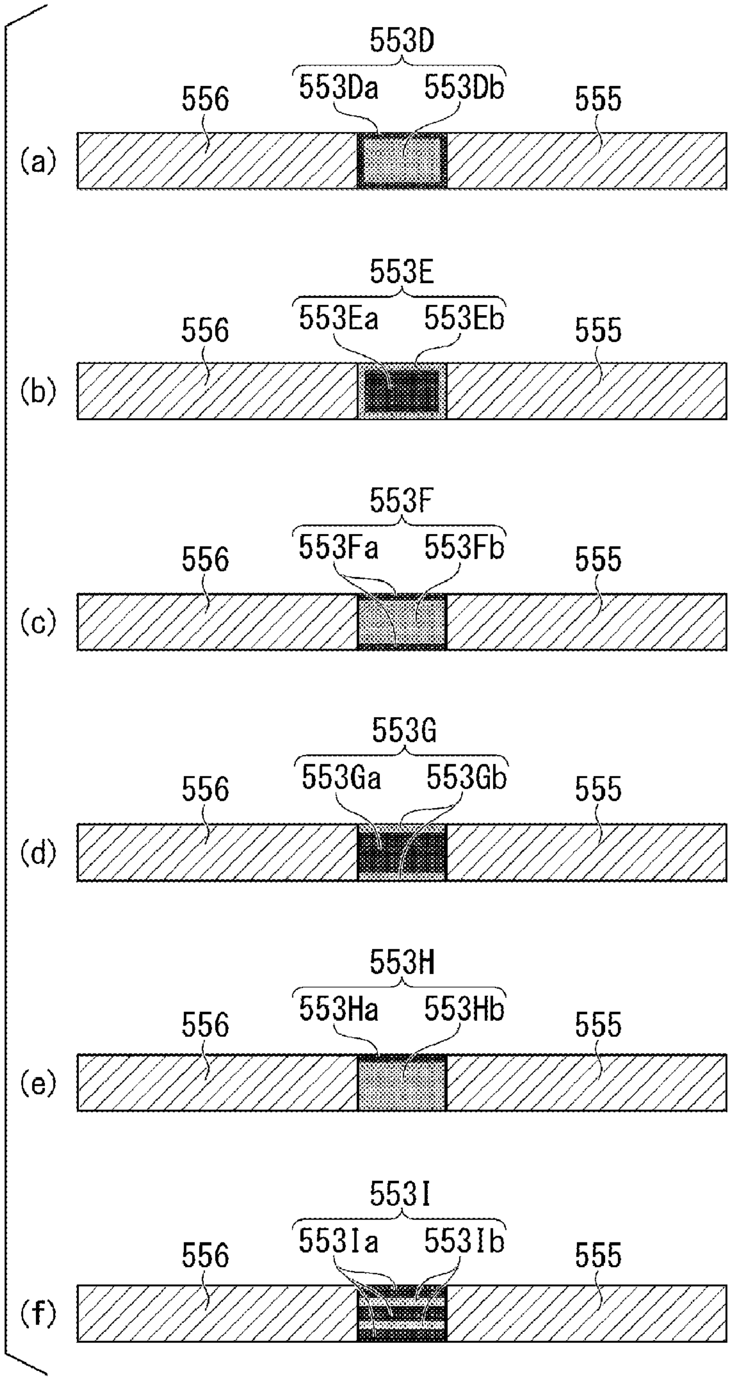
FIG. 21 (a) is a cross-sectional view of the fuse element in a fourth modified example of the third embodiment, (b) is a cross-sectional view of the fuse element in a fifth modified example, (c) is a cross-sectional view of the fuse element in a sixth modified example, (d) is a cross-sectional view of the fuse element in a seventh modified example, (e) is a cross-sectional view of the fuse element in an eighth modified example, and (f) is a cross-sectional view of the fuse element in a ninth modified example.

For example, as illustrated in FIG. 21(*a*), a high melting point metal layer 553Da may cover the entire surface of a low melting point metal layer 553Db in a fusible conductor 553D. In the examples in the drawings, the high melting point metal layer 553Da having a rectangular frame shape in a cross-sectional view is arranged so as to cover the entire outer surface of the low melting point metal layer 553Db having a rectangular shape in a cross-sectional view, but the high melting point metal layer is not limited to this arrangement.

For example, as illustrated in FIG. 21(*b*), a low melting point metal layer 553Eb may cover the entire surface of a high melting point metal layer 553Ea in a fusible conductor 553E. In the examples in the drawings, the low melting point metal layer 553Eb having a rectangular frame shape in a cross-sectional view is arranged so as to cover the entire outer surface of the high melting point metal layer 553Ea having a rectangular shape in a cross-sectional view, but the low melting point metal layer is not limited to this arrangement.

For example, as illustrated in FIG. 21(*c*), a high melting point metal layer 553Fa may cover only the upper surface and the lower surface of the low melting point metal layer 553Fb in the Z direction in a fusible conductor 553F. In the examples in the drawings, the high melting point metal layer 553Fa is arranged so as to follow only the upper surface and the lower surface of the low melting point metal layer 553Fb having a rectangular shape in a cross-sectional view, but the high melting point metal layer is not limited to this arrangement.

For example, as illustrated in FIG. 21(*d*), a low melting point metal layer 553Gb may cover only the upper surface and the lower surface of the high melting point metal layer 553Ga in the Z direction in a fusible conductor 553G. In the examples in the drawings, the low melting point metal layer 553Gb is arranged so as to follow only the upper surface and the lower surface of the high melting point metal layer 553Ga having a rectangular shape in a cross-sectional view, but the low melting point metal layer is not limited to this disposition.

For example, as illustrated in FIG. 21(*e*), a high melting point metal layer 553Ha may cover only one side surface of the low melting point metal layer 553Hb in the Z direction in a fusible conductor 553H. In the examples in the drawings, the high melting point metal layer 553Ha is arranged so as to follow only the upper surface of the low melting point metal layer 553Hb having a rectangular shape in a cross-sectional view, but the high melting point metal layer is not limited to this arrangement.

For example, as illustrated in FIG. 21(*f*), each of a high melting point metal layer 553Ia and a low melting point metal layer 553Ib may be multi-layered in a fusible conductor 553I. In the examples in the drawings, the fusible conductor 553I is a five-layer multi-layered stack wherein three high melting point metal layers 553Ia and two low melting point metal layers 553Ib are alternately stacked, but the number of layers or the arrangement thereof is not limited to these.

Figure 22:
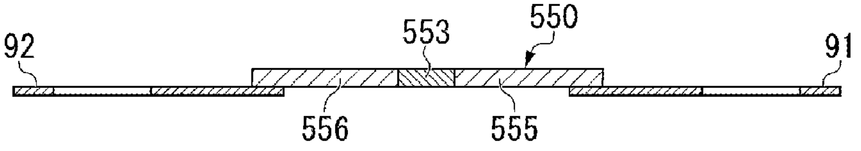
FIG. 22 is a cross-sectional view of an example wherein the fuse element of the third embodiment is a single layer.

For example, as illustrated in FIG. 22, the fuse element 550 may be configured in a single layer wherein metal foils 555 and 556 are connected to both ends of the fusible conductor 553.

Figure 23:
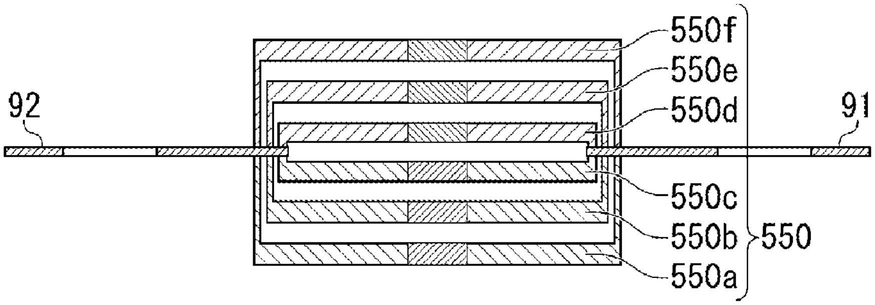
FIG. 23 is a cross-sectional view of an example wherein the fuse element of the third embodiment is a stacked body.

For example, as illustrated in FIG. 23, the fuse element 550 may be configured in a stacked body wherein a plurality of fuse elements 550*a* to 550*f* are stacked. In the examples in the drawings, six fuse elements 550*a* to 550*f* are stacked, but the number or arrangement thereof are not limited to these.

The fuse element 550 of the present embodiment has a low melting point metal layer or a stacked body containing a low melting point metal layer and a high melting point metal layer in the cutoff portion 553, and has the high melting point metal layer on both the first end portion 551 and the second end portion 552, wherein the low melting point metal layer contains tin, and the high melting point metal layer contains silver or copper. As a result, the energization of the fuse element 550 can be cut off without damage to the insulating member and the insulating case from the energization of 1.35 to 2 times the rated current to an explosive cutoff at 10 times or more. Moreover, when the cutoff portion 553 has a stacked body containing a low melting point metal layer and a high melting point metal layer, the resistance can be reduced even when the cutoff portion 553 is thin. Therefore, it is possible to achieve both cutting using a pressing means such as a spring or rubber (cutting using a cutoff signal) and an increase in rated current. Therefore, it is possible to realize a protective element having both overcurrent cutoff and a cutoff function using a cutoff signal.

Fuse Element (Fourth Embodiment)

Figure 24:
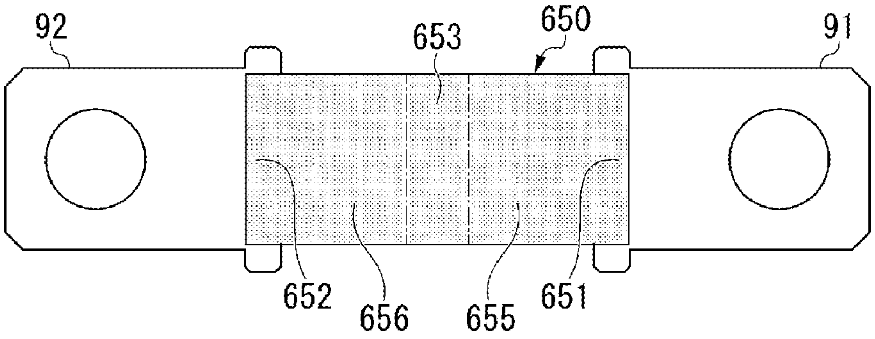
FIG. 24 is a schematic diagram of the fuse element according to the fourth embodiment, and is a plan view corresponding to FIG. 4(*a*).
Figure 25:
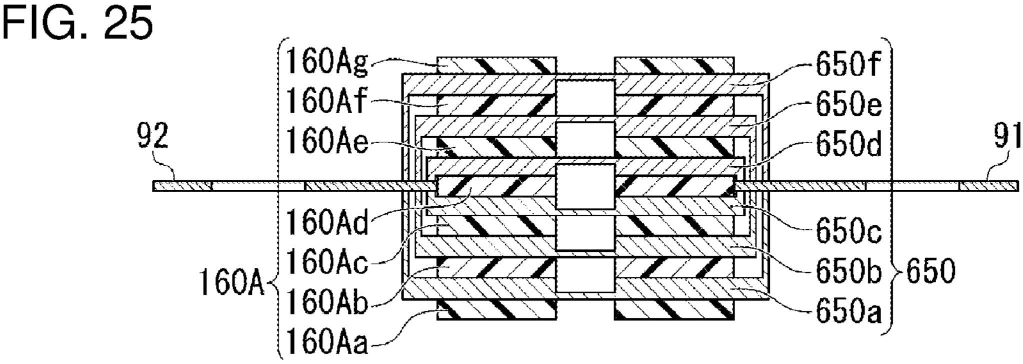
FIG. 25 is a schematic diagram of the fuse element according to the fourth embodiment, and is a cross-sectional view corresponding to FIG. 4(*c*).
Figure 26:
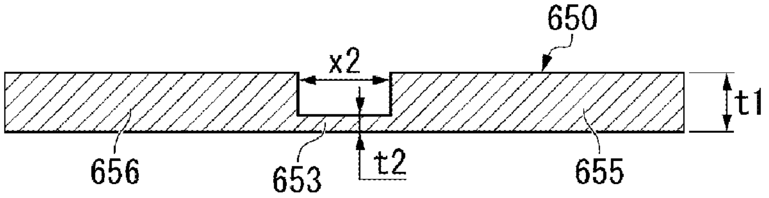
FIG. 26 is a cross-sectional view of the fuse element according to the fourth embodiment.

FIG. 24 is a schematic diagram of a fuse element according to the fourth embodiment, and is a plan view corresponding to FIG. 4(*a*). FIG. 25 is a schematic diagram of the fuse element according to the fourth embodiment and is a cross-sectional view corresponding to FIG. 4(*c*). FIG. 26 is a cross-sectional view of the fuse element according to the fourth embodiment. In the drawings below, components that are the same as or similar to those in the configurations described above will be given the same reference numerals and descriptions thereof will be omitted.

As illustrated in FIG. 24 to FIG. 26, each of the plurality of fuse elements 650 differs from that illustrated in FIG. 4 in that the thickness of the cutoff portion 653 in the fuse element 650 is thinner than the thickness of the portions 655 and 656 other than the cutoff portion, and the like. However, the arrangement of the plurality of fuse elements 650 and the like has the same configuration as that illustrated in FIG. 4, and a description of the characteristics described above will therefore be omitted. Furthermore, the plurality of first insulating members 160A (160Aa to 160Ag) are all members having the same configuration, have the same configuration as that illustrated in FIG. 15, and a description of the characteristics described above will therefore be omitted.

The thickness of the fuse element 650 is made to be a thickness that is fused by an overcurrent. The specific thickness depends on the material and the number (number of sheets) of the fuse element 650 and the pressing force (stress) of the pressing means 30. For example, when each of the fuse elements 650 is formed of a copper foil, the conditions of the dimensions and shape of the cutoff portion 653 and the portions 655 and 656 other than the cutoff portion or the like can be in the following ranges. For example, a thickness ratio t1/t2 between a thickness t1 of the portions 655 and 656 other than the cutoff portion and a thickness t2 of the cutoff portion 653 can be 2 or greater, is more preferably in the range of 3 to 30, and is even more preferably in the range of 4 to 30. For example, the thickness t2 of the cutoff portion 653 can be 0.05 mm or less, is more preferably 0.04 mm or less, or even more preferably 0.03 mm or less. For example, a length x2 of the cutoff portion 653 can be in the range of 1 mm to 5 mm, is more preferably 4 mm or less, and is even more preferably 3 mm or less.

Disposing in parallel is also possible to reduce resistance (increase rated current), and the present invention has no limitations on arrangement. The examples illustrated in the drawings are examples wherein there are six fuse elements 650, but there is no limit to the number in the present invention.

Figure 27:
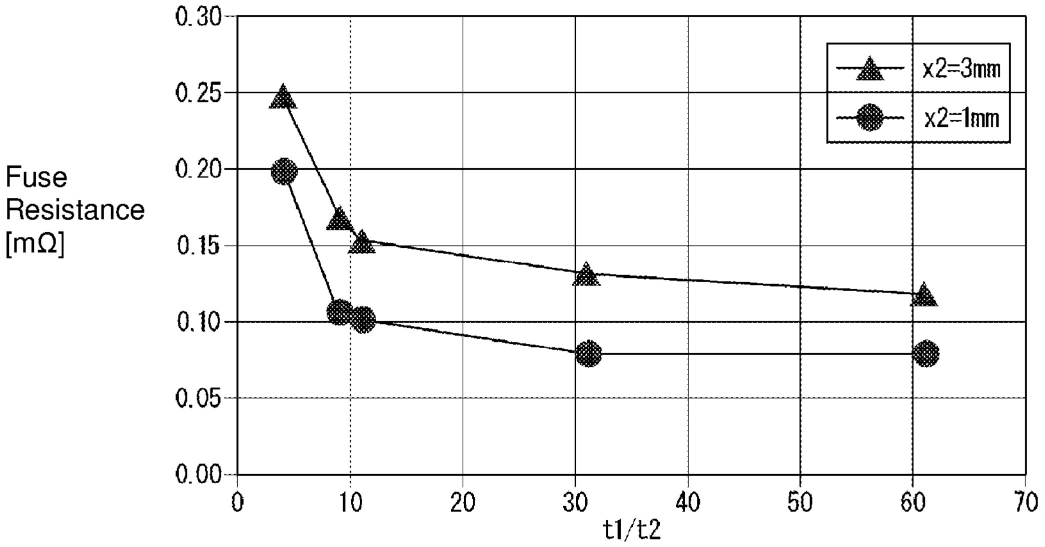
FIG. 27 is a diagram illustrating the relationship between fuse resistance and a thickness ratio between a thickness of portions other than the cutoff portion of the fuse element and a thickness of the cutoff portion according to the fourth embodiment.
Figure 28:
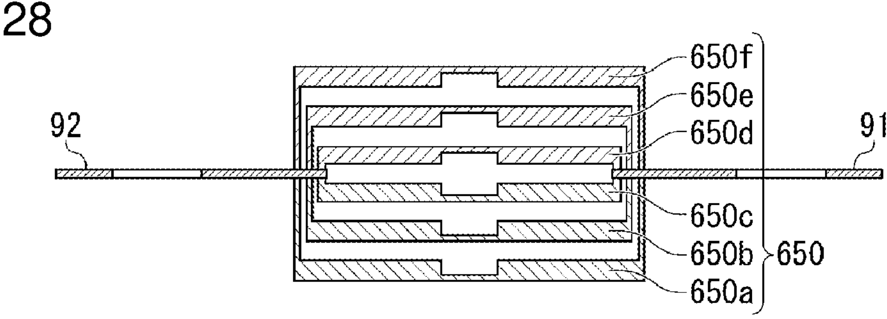
FIG. 28 is a cross-sectional view of an example wherein the fuse element of the fourth embodiment is a stacked body.

For example, when the fuse element 650 is formed of a copper foil, the thickness t2 of the cutoff portion 653 can be 0.01 mm. FIG. 27 illustrates a relationship between the thickness ratio t1/t2 of the thickness t1 of the portion other than the cutoff portion and the thickness t2 of the cutoff portion and the fuse resistance (six layers). FIG. 27 illustrates when the lengths x2 of the cutoff portion 653 are 1 mm and 3 mm, respectively. As illustrated in FIG. 27, the resistance tends to decrease as the thickness t1 of the portion other than the cutoff portion increases. When the thickness ratio t1/t2 is 30 or greater, the fuse resistance hardly changes. When the thickness ratio t1/t2 is smaller than 2, the difference in resistance between the portion other than the cutoff portion and the cutoff portion is small, and heat spots do not easily form. Note that each of the values above is a mere example and the present invention is not limited thereto.

For example, in a protective element that uses a metal foil such as copper, silver, tin, or the like for the fuse element, it is preferable for the difference in thickness between the cutoff portion and the portion other than the cutoff portion be at least two times, and that the length of the cutoff portion be 5 mm or less. Thus, the fuse element can be fused by forming a heat spot on the thin cutoff portion during overcurrent.

For example, when the fuse element has a hole in the cutoff portion (as illustrated in FIG. 4, when it has a uniform thickness in the X direction), the cutting strength of the cutoff portion is high, and it is therefore difficult to cut by the force of the shielding member driven by an elastic force such as a spring or rubber. Although thinning is necessary to facilitate cutting the cutoff portion, when thinning a cutoff portion having a hole, this results in high resistance, and there is a possibility that the rated current cannot be increased. In contrast to this, in the present embodiment, because only the thickness of the cutoff portion 653 is thin, it is possible to reduce the resistance of the fuse element 650, and because the thin portion has high resistance, a heat spot is formed during overcurrent, and the specific portion (cutoff portion 653) can be fused without generating a large-scale arc discharge. Furthermore, because the fusion volume when cutting off is small, it is more difficult to form a conduction path and insulation resistance increases. Additionally, when cutting off using a cutoff signal, when the thickness of the cutoff portion 653 is 0.05 mm or less, cutting can be performed by the elastic force of a spring, rubber, or the like. Thus, it is possible to realize a protective element having both overcurrent cutoff and a cutoff function using a cutoff signal.

Various structures can be adopted for the structure of the fuse element.

Figure 29:
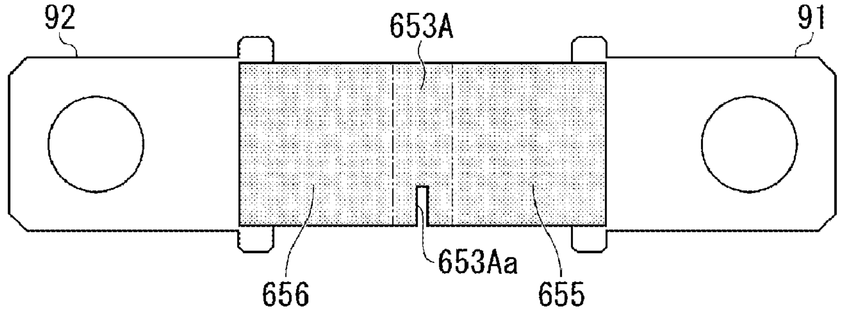
FIG. 29 is a plan view of the fuse element in a first modified example of the fourth embodiment.

For example, as illustrated in FIG. 29, the fusion portion 653A (cutoff portion) in the fuse element may have a notch 653Aa. Thus, the notch 653Aa becomes a trigger for cutting, and it is therefore easier to cut using the shielding member. In the examples in the drawings, one notch 653Aa is formed in the fusion portion 653A so as to be recessed inward from one side in the Y direction, but the arrangement and number thereof are not limited thereto.

Figure 30:
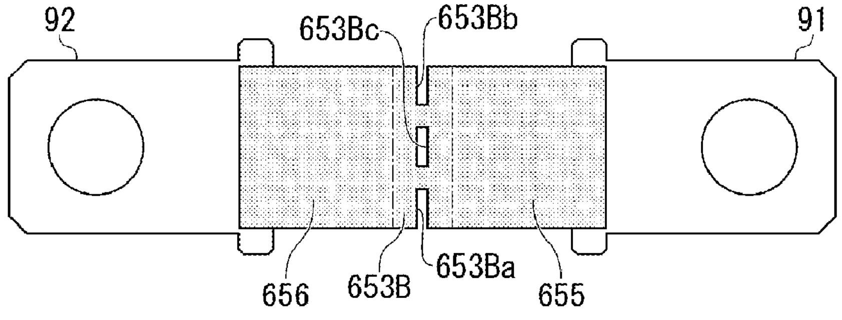
FIG. 30 is a plan view of the fuse element in a second modified example of the fourth embodiment.

For example, as illustrated in FIG. 30, the fusion portion 653B may have a plurality of notches 653Ba to 653Bc. In the examples in the drawings, two notches 653Ba and 653Bb formed so as to be recessed inward from two sides in the Y direction in the fusion portion 653B and one notch 653Bc (through hole) opened in the center in the Y direction in the fusion portion 653B are included, but the arrangement and number thereof are not limited thereto.

Figure 31:
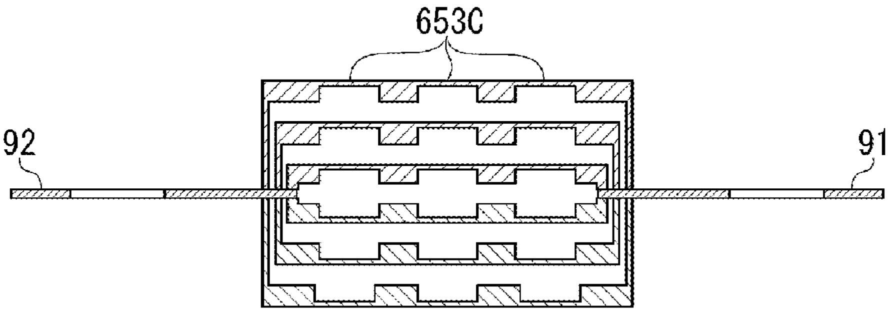
FIG. 31 is a cross-sectional view of the fuse element in a third modified example of the fourth embodiment.

For example, as illustrated in FIG. 31, there may be a plurality of portions 653C where the thickness is thin in the fuse element. Consequently, arc discharge during overcurrent cutoff can be reduced. In the examples in the drawings, three thin portions 653C (portions having a thin thickness) are formed having gaps therebetween in the X direction of the fuse elements, but the arrangement and number thereof are not limited thereto. For example, in each layer of the fuse element, two thin portions may be arranged, or four or more may be arranged.

(Method for Manufacturing Fuse Element)

The fuse element of the present embodiment can be manufactured in the following manner.

Figure 32:
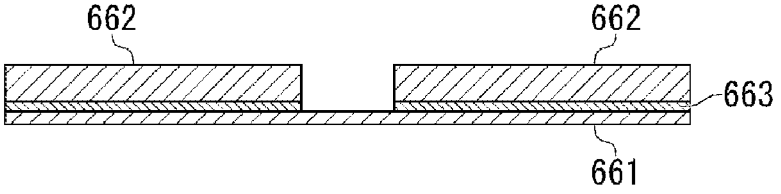
FIG. 32 is a schematic diagram illustrating an example of a method for manufacturing the fuse element of the fourth embodiment.

For example, as illustrated in FIG. 32, first, a plurality of metal foils 661 and 662 are prepared. For example, a first metal foil 661 and a second metal foil 662 thicker than the first metal foil 661 are prepared as a plurality of metal foils 661 and 662. Two second metal foils 662 are connected to both ends of the first metal foil 661. For example, one second metal foil 662 is connected to one end of the first metal foil 661 by soldering, and the other second metal foil 662 is connected to the other end of the first metal foil 661 by soldering. In other words, the two second metal foils 662 are connected by soldering to one surface of the first metal foil 661 perpendicular to the Z direction, and the portions other than the fusion portion are stacked. Known solder materials can be used as solder materials 663 for soldering, and in terms of having low resistivity, melting point, and being lead-free for the environment, it is preferable to use solder materials having Sn as the principal component thereof. The connection between the first metal foil 661 and the second metal foil 662 is not limited to soldering, and a known joining method such as joining by welding may be used.

Figure 33:
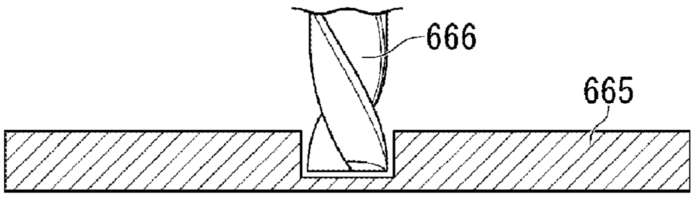
FIG. 33 is a schematic diagram illustrating an example of a method for manufacturing the fuse element of the fourth embodiment.

For example, as illustrated in FIG. 33, the fuse element may be manufactured by cutting the fusion portion. First, one metal foil 665 is prepared. For example, a metal foil 665 having a uniform thickness at portions other than the fusion portion is prepared. Then, only the portion of the metal foil 665 that is to be the fusion portion is cut by a cutting member 666.

Figure 34:
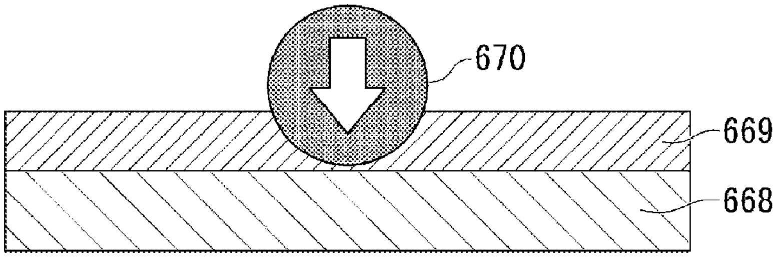
FIG. 34 is a schematic diagram illustrating an example of a method for manufacturing the fuse element of the fourth embodiment.

For example, as illustrated in FIG. 34, the fuse element may be manufactured by crushing the fusion portion by pressing. First, a metal foil 669 is installed on a base 668. For example, a metal foil 669 having a uniform thickness at portions other than the fusion portion is prepared. A pressing member 670 is pressed against a portion of the metal foil 669 that is to be a fusion portion, and the fusion portion is crushed by pressing.

In the examples in the drawings, the example of the pressing member 670 has a circular cross-sectional shape, but the pressing member 670 may have a rectangular cross-sectional shape, and the shape of the pressing member 670 is not limited to above.

Figure 35:
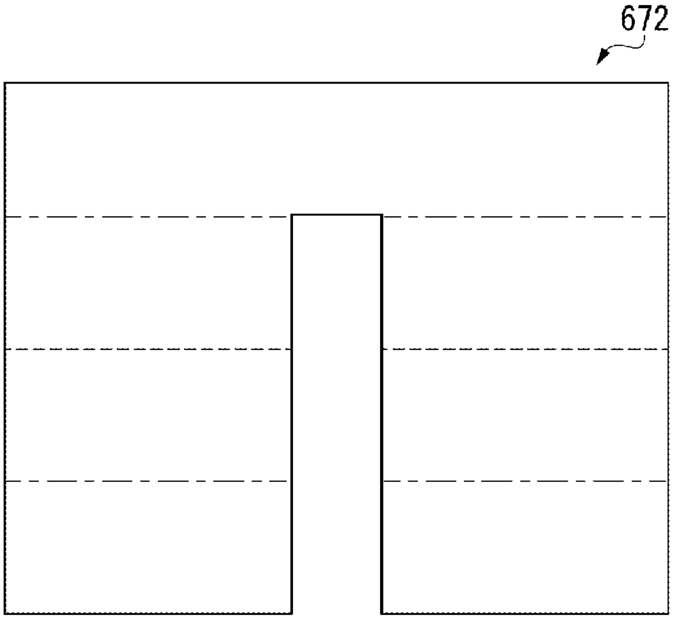
FIG. 35 is a schematic diagram illustrating an example of a method for manufacturing the fuse element of the fourth embodiment.
Figure 36:
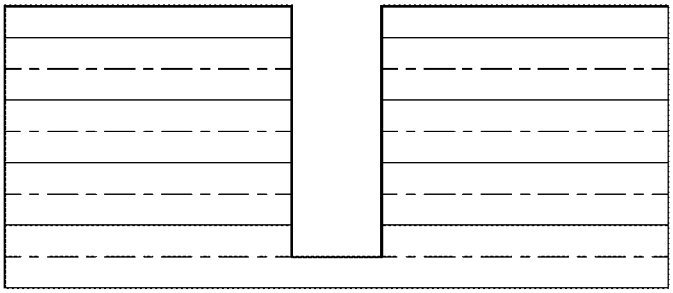
FIG. 36 is a schematic diagram illustrating an example of a method for manufacturing the fuse element, following FIG. 35.

For example, as illustrated in FIG. 35 and FIG. 36, the fuse element may be manufactured by folding the portions other than the fusion portion and stacking. First, a metal foil 672 having a predetermined shape is prepared. For example, as illustrated in FIG. 35, a U-shaped metal foil is prepared in a plan view as the metal foil 672. In the drawings, dash and dot lines represent valley folding, and dashed lines represent peak folding. The metal foil 672 is folded along the fold line and stacked to manufacture a fuse element such as that illustrated in FIG. 36.

Figure 37:
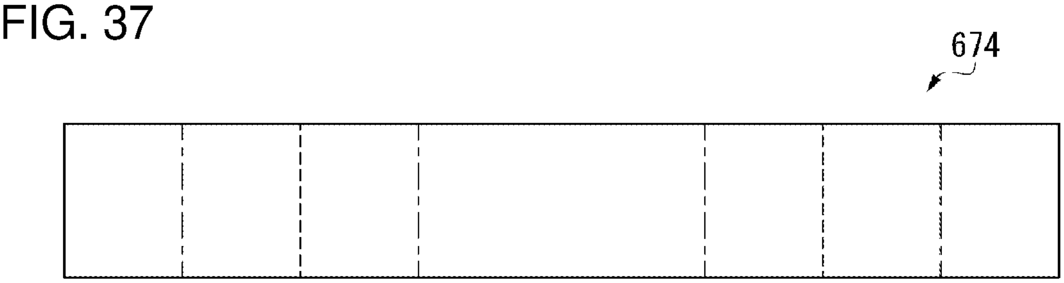
FIG. 37 is a schematic diagram illustrating an example of a method for manufacturing the fuse element different from FIG. 35.

The shape of the metal foil is not limited to the above. For example, as illustrated in FIG. 37, a rectangular foil in a plan view may be prepared as the metal foil 674. In the drawings, dash and dot lines represent valley folding, and dashed lines represent peak folding. Even here, the metal foil 674 can be folded along the fold line and stacked to manufacture a fuse element such as that illustrated in FIG. 36.

Figure 38:
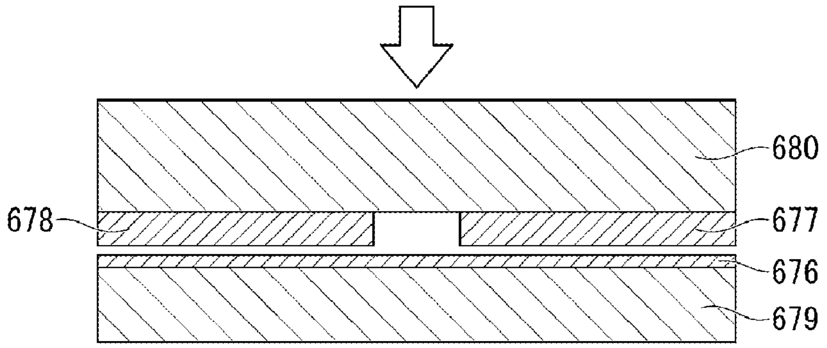
FIG. 38 is a schematic diagram illustrating an example of a method for manufacturing the fuse element of the fourth embodiment.

For example, as illustrated in FIG. 38, the fuse element may be manufactured by pressure bonding portions other than the fusion portion using a press. First, a plurality of metal foils 676, 677, and 678 are prepared, and a lower die 679 and an upper die 680 are attached to a press machine. For example, a first metal foil 676 and second metal foils 677 and 678 thicker than the first metal foil 676 are prepared as a plurality of metal foils 676, 677, and 678. The first metal foil 676 is disposed on the lower die 679, one second metal foil 677 is disposed on the upper die 680 on a portion facing one end side of the first metal foil 676, and the other second metal foil 678 is disposed on a portion facing the other end side of the first metal foil 676. Next, the first metal foil 676 is pressed against the second metal foils 677 and 678 by moving the lower die 679 and the upper die 680 relative to each other in the vertical direction. In other words, the two second metal foils 677 and 678 are pressure bonded to one surface of the first metal foil 676 in the Z direction, except for the fusion portion.

For example, the method for manufacturing the fuse element is not limited to the above, and various methods can be adopted. For example, a fuse element (a fuse element where the thickness of the cutoff portion is thinner than the thickness of portions other than the cutoff portion) may be manufactured using a method such as etching, ultrasonic welding, welding, or spot welding.

In the fuse element of the present embodiment, the thickness t2 of the cutoff portion 653 is thinner than the thickness t1 of the portions 655 and 656 other than the cutoff portion. Thus, because only the thickness t2 of the cutoff portion 653 is thin, it is possible to reduce the resistance of the fuse element, and because the thin portion has high resistance, a heat spot is formed during overcurrent, and the specific portion (cutoff portion 653) can be fused without generating a large-scale arc discharge. Furthermore, because the fusion volume when cutting off is small, it is more difficult to form a conduction path and insulation resistance increases. Additionally, when cutting off using a cutoff signal, when the thickness t2 of the cutoff portion 653 is 0.05 mm or less, cutting can be performed by the elastic force of a spring, rubber, or the like. Therefore, it is possible to realize a protective element having both overcurrent cutoff and a cutoff function using a cutoff signal.

Protective Element (Fifth Embodiment)

Figure 39:
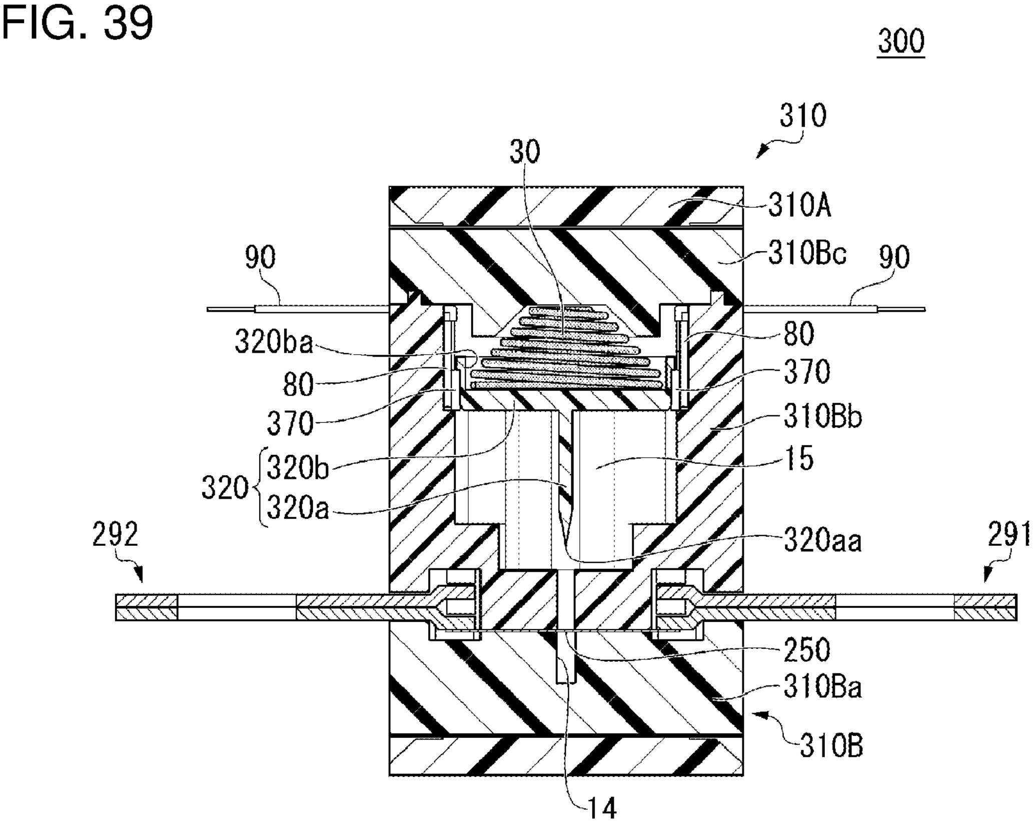
FIG. 39 is a cross-sectional view of the protective element according to the fifth embodiment, corresponding to FIG. 5(*a*).

FIG. 39 is a cross-sectional view of the protective element according to the fifth embodiment, corresponding to FIG. 5(*a*). In relation to the protective element according to the fifth embodiment, the main difference from the protective element according to the first embodiment is that the fuse element is interposed between two case components. In FIG. 39, components that have the same or similar configurations to those in the protective element according to the first embodiment and the modified examples above will be given the same reference numerals and descriptions thereof will be omitted.

The protective element 300 illustrated in FIG. 39 has an insulating case 310, a fuse element 250, a shielding member 320, a pressing means 30, a locking member 370, a heat-generating body 80, a power supply member 90, a first terminal 291, and a second terminal 292. Note that in the protective element 300 of the present embodiment, the current carrying direction means the direction in which electricity flows during use (X direction), and the cross-sectional area of the current carrying direction means the area of the surface (Y-Z surface) in the direction orthogonal to the current carrying direction.

(Insulating Case)

The insulating case 310 is made up of a cover 310A and a holding member 310B. Materials similar to those of the cover 10A and the holding member 10B can be used as materials for the cover 310A and the holding member 310B. An internal pressure buffer space 15 is formed inside the holding member 310B. The internal pressure buffer space 15 acts to suppress rapid rises in internal pressure in the protective element 300 by gas generated by arc discharge caused when the fuse element 250 is fused.

The holding member 310B is made up of a first holding member 310Ba arranged on the lower side in the Z direction and a second holding member 310Bb arranged on the upper side in the Z direction. The second holding member 310Bb is one example of two case components, and the first holding member 310Ba is another example of two case components.

In the examples in the drawings, the insulating case 310 is made up of at least two case components (the first holding member 310Ba arranged on the lower side in the Z direction and the second holding member 310Bb arranged on the upper side in the Z direction), and the second holding member 310Bb, which is one case component, is integrated with the first insulating member, but the present invention is not limited thereto. For example, when the protective element has a first insulating member and a second insulating member, one case component may be integrated with the first insulating member and the other case component may be integrated with the second insulating member, and one case component may be integrated with the first insulating member or the other case component may be integrated with the second insulating member.

(Fuse Element)

In the examples in the drawings, the fuse element 250 is a single layer. The fuse element 250 has the same configuration as that illustrated in FIG. 18, and a description of the characteristics described above will therefore be omitted.

In the examples in the drawings, the fuse element 250 is interposed between the first holding member 310Ba and the second holding member 310Bb, but the present invention is not limited thereto. For example, the fuse element 250 may be arranged between the first holding member 310Ba and the second holding member 310Bb via the first insulating member or the second insulating member. For example, the fuse element 250 may be arranged between the two case components in a state of being close to or in contact with the two case components.

In the examples in the drawings, the second holding member 310Bb is integrated with the first insulating member, and the fuse element 250 is arranged along the lower surface of the second holding member 310Bb, but the present invention is not limited thereto. For example, when the first holding member 310Ba is integrated with the first insulating member, the fuse element may be arranged along the upper surface of the first holding member 310Ba. The arrangement of the fuse element 250 with respect to the first holding member 310Ba or the second holding member 310Bb is not limited to the above.

(Shielding Member)

The shielding member 320 includes a protruding portion 320*a*, which faces the fuse element stacked body 250 side, and a pressing means support portion 320*b*, which includes a recessed portion 320*ba* that houses and supports a lower portion of the pressing means 30. The protruding portion 320*a* protrudes toward the fuse element 250 side.

Downward movement of the shielding member 320 is suppressed by the locking member 370 in a state wherein the pressing force of the pressing means 30 is applied downward. Therefore, when the locking member 370 is heated by heat generated by the heat-generating body 80 and softened at a temperature at or above a softening temperature thereof, the shielding member 320 becomes able to move downward. At this time, the softened locking member 370 is physically crushed by the pressing force of the pressing means 30, or is thermally fused, or receives an action combining a physical force from the pressing means 30 and thermal fusion depending on the type of material, heating conditions, and the like.

When the downward movement suppression by the locking member 370 is released, the shielding member 320 moves downward and physically cuts the fuse element 250.

The shielding member 320 has a leading edge 320*aa* of the protruding portion 320*a* that is pointed, formed to readily cut through the fuse element 250.

For example, when the shielding member 320 moves downward and the fuse element 250 is cut by the protruding portion 320*a* of the shielding member 320, the cut surfaces are shielded from each other and insulated by the protruding portion 320*a*, and the current carrying path through the fuse element 250 is physically cut off in a reliable manner. Thus, arc discharge is rapidly eliminated (extinguished).

(Pressing Means)

The pressing means 30 is housed in the recessed portion 320*ba* of the shielding member 320 while the shielding member 320 is pressed downward in the Z direction. The pressing means 30 is held in a compressed state in the recessed portion 320*ba* of the shielding member 320. The pressing means 30 has a different arrangement than that illustrated in FIG. 5, but has the same configuration, and a description of the characteristics described above will therefore be omitted.

In the examples in the drawings, a conical spring is used as the pressing means 30, a side having a larger outer diameter is arranged facing the fuse element 250 side, and a third holding member 310Bc is arranged above in the Z direction so as to press and contract the conical spring. Thus, positioning stability increases when the spring is inserted from above the second holding member 3101Bb, and this is preferable to realize automation of the manufacturing process.

(Locking Member)

The locking member 370 suppresses the movement of the shielding member 320. The locking member 370 is provided on the upper portion of the shielding member 320. The locking member 370 is supported by the upper portion of the second holding member 310Bb and the upper portion of the shielding member 320. A recessed portion corresponding to the shape and position of the locking member 370 is on the upper portion of the second holding member 310Bb and the upper portion of the shielding member 320, and the recessed portion stably holds the locking member 370 so as to interpose the locking member.

(Heat-Generating Body)

The heat-generating body 80 is mounted so as to contact the outer surface of the locking member 370 in the X direction. The heat-generating body 80 heats and softens the locking member 370 or a fixing member for fixing the locking member 370 (for example, solder joining between two locking members 370 or solder joining between the heat-generating body 80 and the locking member 370). In the examples in the drawings, the power supply member 90 is connected to each of the two heat-generating bodies 80, but the present invention is not limited thereto.

When a current is supplied to the heat-generating body 80, the heat-generating body 80 generates heat, transmits heat to the locking member 370, and the locking member 370 is heated and softened at a temperature at or above the softening temperature. Here, the softening temperature means a temperature or temperature range where a solid phase and a liquid phase mix or coexist. When the temperature of the locking member 370 is at or above the softening temperature, the locking member softens enough to deform due to external forces.

The softened locking member 370 is easily physically pressed and cut by the pressing force of the pressing means 30. When the locking member 370 is pressed and cut or thermally fused, the protruding portion 320*a* of the shielding member 320 is inserted into the gap of the second holding member 310Bb downward in the Z direction. Thus, the protruding portion 320*a* presses forward and reaches the lowest position while cutting the fuse element 250. Thus, the protruding portion 320*a* shields the fuse element 250 on the first terminal 291 side and the second terminal 292 side by the fusion portions thereof. Consequently, arc discharge generated when the fuse element 250 is cut can be quickly and reliably eliminated.

Furthermore, heat is generated by passing a current to the heat-generating body 80, and the locking member 370 is heated by the heat, softened, and melted. The shielding member 320 to which a pressing force is applied in the Z direction downward by a pressing means 30 by melting the locking member 370 moves downward, cuts the fuse element 250, and the fuse element 250 is shielded to the first terminal 291 side and the second terminal 292 side.

Additionally, when using a composite locking structure that joins the two locking members 370 using a fixing member, or when using a structure that joins the locking members 370 and the heat-generating body 80 using a fixing member, the heat-generating body 80 generates heat by passing a current therethrough, and the fixing member softens and melts due to the heat thereof. The shielding member 320, to which a pressing force is applied in the Z direction downward by the pressing means 30 due to the softening and melting of the fixing member, moves downward, cuts the fuse element 250, and the fuse element 250 is shielded to the first terminal 291 side and the second terminal 292 side.

Note that when the fixing member softens, the fixing member is separated. In other words, the locking member 370 cannot be cut and is released (disengaged).

In the protective element 300 of the present embodiment, the insulating case 310 is made up of at least two case components (the first holding member 310Ba arranged on the lower side in the Z direction and the second holding member 310Bb arranged on the upper side in the Z direction), and the second holding member 310Bb, which is one case component, is integrated with the first insulating member. Therefore, there is no need to provide a separate first insulating member, and the number of components can be reduced, contributing to cost reduction.

In the protective element 300 of the present embodiment, the fuse element 250 is interposed between the first holding member 310Ba and the second holding member 310Bb. Thus, the fuse element 250 is insulated by being proximal to or being brought into contact (adhered) with the first holding member 310Ba and the second holding member 310Bb. Therefore, the space surrounding the fuse element 250 becomes extremely narrow, and the scale of arc discharge generated due to fusing is likely to be small. Therefore, according to the protective element 300 of the present embodiment, the size of the insulating case 310 can be made smaller and lighter.

Protective Element (Sixth Embodiment)

Figure 40:
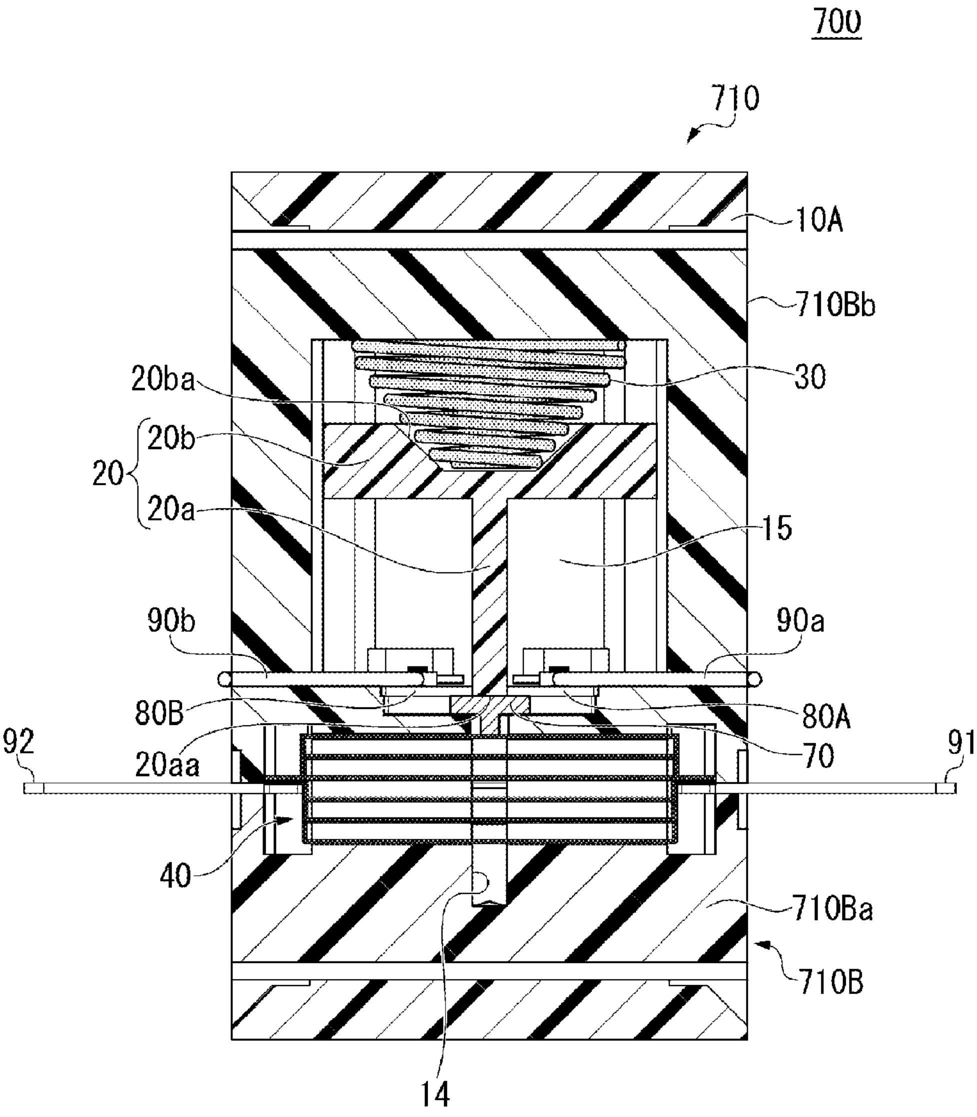
FIG. 40 is a cross-sectional view of the protective element according to the sixth embodiment, corresponding to FIG. 5(*a*).

FIG. 40 is a cross-sectional view of the protective element according to the sixth embodiment, corresponding to FIG. 5(*a*). In relation to the protective element according to the sixth embodiment, the main difference from the protective element according to the first embodiment is that the fuse element stacked body is interposed between two case components. In FIG. 40, components that have the same or similar configurations to those in the protective element according to the first embodiment and the modified examples above will be given the same reference numerals and descriptions thereof will be omitted.

The protective element 700 illustrated in FIG. 40 has an insulating case 710, a fuse element stacked body 40, a shielding member 20, a pressing means 30, a locking member 70, heat-generating bodies 80A and 80B, power supply members 90*a* and 90*b*, a first terminal 91, and a second terminal 92. Note that in the protective element 700 of the present embodiment, the current carrying direction means the direction in which electricity flows during use (X direction), and the cross-sectional area of the current carrying direction means the area of the surface (Y-Z surface) in the direction orthogonal to the current carrying direction.

(Insulating Case)

The insulating case 710 is made up of a cover 10A and a holding member 710B. Materials similar to those of the cover 10A and the holding member 10B can be used as materials for the cover 10A and the holding member 710B. An internal pressure buffer space 15 is formed inside the holding member 710B. The internal pressure buffer space 15 acts to suppress rapid rises in internal pressure in the protective element 700 by gas generated by arc discharge caused when the fuse element stacked body 40 is fused.

The holding member 710B is made up of a first holding member 710Ba arranged on the lower side in the Z direction and a second holding member 710Bb arranged on the upper side in the Z direction. The first holding member 710Ba is one example of two case components, and the second holding member 710Bb is another example of two case components.

In the examples in the drawings, the insulating case 710 is made up of at least two case components (the first holding member 710Ba arranged on the lower side in the Z direction and the second holding member 710Bb arranged on the upper side in the Z direction), the first holding member 710Ba, which is one case component, is integrated with the first insulating member, and the second holding member 710Bb, which is another case component, is integrated with the second insulating member, but the present invention is not limited thereto. For example, when the protective element has a first insulating member and a second insulating member, one case component may be integrated with the first insulating member or the other case component may be integrated with the second insulating member. In the examples in the drawings, there are a plurality of the fuse elements and first insulating members, and the plurality of fuse elements are arranged in proximity to or in contact between the first insulating members, but the present invention is not limited to this. For example, when the other case component is separate from the second insulating member, the fuse element may be arranged in proximity to or in contact between the first insulating member and the second insulating member. In the examples in the drawings, one of the plurality of first insulating members is integrated with the first holding member 710Ba, but the present invention is not limited thereto. For example, each of the plurality of first insulating members may be integrated with the first holding member 710Ba. For example, at least one of the plurality of first insulating members may be integrated with the first holding member 710Ba.

In the protective element 700 of the present embodiment, the insulating case 710 is made up of at least two case components (the first holding member 710Ba arranged on the lower side in the Z direction and the second holding member 710Bb arranged on the upper side in the Z direction), the first holding member 710Ba, which is one case component, is integrated with the first insulating member, and the second holding member 710Bb, which is another case component, is integrated with the second insulating member. Therefore, there is no need to separately provide the first insulating member and the second insulating member, and the number of components can be reduced, contributing to cost reduction.

In the protective element 700 of the present embodiment, the fuse element stacked body 40 is interposed between the first holding member 710Ba and the second holding member 710Bb. Thus, the fuse element stacked body 40 is insulated by being proximal to or being brought into contact (adhered) with the first holding member 710Ba and the second holding member 710Bb. Therefore, the space surrounding the fuse element stacked body 40 becomes extremely narrow, and the scale of arc discharge generated due to fusing is likely to be small. Therefore, according to the protective element 700 of the present embodiment, the size of the insulating case 710 can be made smaller and lighter.

The protective element of the present invention is not limited to the embodiments described above.

DESCRIPTION OF REFERENCE NUMERALS

10, 11, 310, 710 Insulating case
10A, 110A, 310A Cover
10B, 10BB, 110B, 310B, 710B Holding member
10Ba, 10BBa, 110Ba, 310Ba, 710Ba First holding member
10Bb, 10BBb, 110Bb, 310Bb, 710Bb Second holding member
310Bc Third holding member
20, 120, 320 Shielding member
30 Pressing means
40, 140 Fuse element stacked body
50*a*, 50*b*, 50*c*, 50*d*, 50*e*, 50*f* fusible conductor sheet
51, 251, 551, 651 First end portion
52, 252, 552, 652 Second end portion
53 Fusion portion
54 Through hole
60A, 60Aa, 60Ab, 60Ac, 60Ad, 60Ae, 60Af, 160A, 160Aa, 160Ab, 160Ac, 160Ad, 160Ae, 160Af, 160Ag, 260A, 260Aa, 260Ab, 260Ac First insulating member
60B Second insulating member
64, 65 Gap
64A First opening
65A Second opening
67, 67A Ventilation hole
70, 170, 370 Locking member
80 Heat-generating body
90 Power supply member
91, 291 First terminal
92, 292 Second terminal
100, 200, 300 Protective element
250, 550, 650 Fuse element
553, 653 Cutoff portion

The invention claimed is:

1. A protective element comprising:

a plurality of fuse elements each comprising: a first end portion; and a second end portion at an opposite end of the first end portion;

an insulating case that houses the plurality of fuse elements;

a first terminal comprising: a first end connected to the first end portion of the plurality of fuse elements; and a second end exposed on an outside of the insulating case;

a second terminal comprising: a first end connected to the second end portion of the plurality of fuse elements; and a second end exposed on the outside of the insulating case;

a plurality of first insulating members each having a first opening or a first separation part, and a second insulating member having a second opening or a second separation part, the plurality of fuse elements each being disposed in proximity to or in contact between the plurality of first insulating members or between one of the plurality of first insulating members and the second insulating member;

a shielding member movable in a moving direction that allows the shielding member to insert into the first opening or the first separation part of the plurality of first insulating members and the second opening or the second separation part of the second insulating member, so as to divide the plurality of fuse elements;

a pressing member that presses the shielding member in the moving direction;

a locking member that suppresses movement of the shielding member;

a fixing member, as an optional component, that fixes the locking member to the insulating case;

a heat-generating body configured to heat and soften the locking member or the fixing member; and a power supply member that carries current to the heat-generating body, wherein the insulating case further houses the plurality of first insulating members, the second insulating member, the shielding member, the pressing member, the locking member, the heat-generating body, and a part of the power supply member, and each of the plurality of fuse elements further comprises a cutoff portion for cutting off a current path between the first end portion and the second end portion.

2. The protective element according to claim 1, wherein when the heat-generating body generates heat so as to soften the locking member or the fixing member, stress of the pressing member causes the shielding member to cut the locking member or separate the fixing member, and the shielding member moves through the second opening or the second separation part of the second insulating member and the first opening or the first separation part of each of the plurality of first insulating members to disconnect the cutoff portion of each of the plurality of fuse elements, which cuts off energization of the plurality of fuse elements.

3. The protective element according to claim 1, wherein when the shielding member cuts the cutoff portion of each of the plurality of fuse elements, the shielding member shields the plurality of fuse elements in a current carrying direction of the plurality of fuse elements.

4. The protective element according to claim 1, wherein the pressing member is a spring.

5. The protective element according to claim 1, wherein at least one of the plurality of first insulating members, the second insulating member, the shielding member, and the insulating case comprises a material having a tracking resistance index CTI of 500 V or more.

6. The protective element according to claim 1, wherein at least one of the plurality of first insulating members, the second insulating member, the shielding member, and the insulating case comprises at least one resinous material selected from the group consisting of a polyamide-based resin and a fluorine-based resin.

7. The protective element according to claim 1, wherein at least one of the plurality of fuse elements has a stacked body comprising a low melting point metal layer and a high melting point metal layer at least on a part thereof, the low melting point metal layer comprises tin, and the high melting point metal layer comprises silver or copper.

8. The protective element according to claim 7, wherein the high melting point metal layer comprises two or more high melting point metal layers, and the low melting point metal layer comprises one or more low melting point metal layers, and the stacked body has a structure in which the one or more low melting point metal layers are each disposed between the two or more high melting point metal layers in at least a portion thereof.

9. The protective element according to claim 1, wherein at least one of the plurality of fuse elements is formed of a single layer comprising silver or copper in at least a portion thereof.

10. The protective element according to claim 1, wherein the a cross-sectional area of the cutoff portion in a current carrying direction from the first end portion to the second end portion of at least one of the plurality of fuse elements is less than the cross-sectional area of each of the first end portion and the second end portion in the current carrying direction.

11. The protective element according to claim 1, wherein a part of the locking member is in proximity to or in contact with the plurality of fuse elements.

12. The protective element according to claim 1, wherein at least one of the plurality of fuse element comprises a low melting point metal layer or a stacked body comprising the low melting point metal layer and a high melting point metal layer on the cutoff portion, and comprises the high melting point metal layer on both the first end portion and the second end portion, the low melting point metal layer comprises tin, and the high melting point metal layer comprises silver or copper.

13. The protective element according to claim 1, wherein a thickness of the cutoff portion in at least one of the plurality of fuse elements is thinner than a thickness of a portion other than the cutoff portion.

14. The protective element according to claim 1, wherein the insulating case comprises a first holding member and a second holding member, and one of the plurality of first insulating members is integrated with the first holding member.

15. A protective element comprising:

a plurality of fuse elements each comprising: a first end portion; and a second end portion at an opposite end of the first end portion;

an insulating case that houses the plurality of fuse elements;

a first terminal comprising: a first end connected to the first end portion of the plurality of fuse elements; and a second end exposed on an outside of the insulating case;

a second terminal comprising: a first end connected to the second end portion of the plurality of fuse elements; and a second end exposed on the outside of the insulating case;

a plurality of first insulating members each having a first opening or a first separation part, the plurality of fuse elements each being disposed in proximity to or in contact between the plurality of first insulating members;

a shielding member movable in a moving direction that allows the shielding member to insert into the first opening or the first separation part of the plurality of first insulating members, so as to divide the plurality of fuse elements;

a pressing member that presses the shielding member in the moving direction;

a locking member that suppresses movement of the shielding member; and a fixing member, as an optional component, that fixes the locking member to the insulating case, wherein the insulating case further houses the plurality of first insulating members, the shielding member, the pressing member, and the locking member, and each of the plurality of fuse elements further comprises a cutoff portion for cutting off a current path between the first end portion and the second end portion.

16. The protective element according to claim 15, wherein the shielding member cuts the cutoff portion of each of the plurality of fuse elements or separates the fixing member, and shields the plurality of fuse elements in a current carrying direction of the plurality of fuse elements.

17. The protective element according to claim 15, wherein the pressing member is a spring.

18. The protective element according to claim 15, wherein at least one of the plurality of first insulating members, the shielding member, and the insulating case comprises a material having a tracking resistance index CTI of 500 V or more.

19. The protective element according to claim 15, wherein at least one of the plurality of first insulating members, the shielding member, and the insulating case comprises at least one resinous material selected from the group consisting of a polyamide-based rein and a fluorine-based resin.

20. The protective element according to claim 15, wherein at least one of the plurality of fuse elements has a stacked body comprising a low melting point metal layer and a high melting point metal layer at least on a part thereof, the low melting point metal layer comprises tin, and the high melting point metal layer comprises silver or copper.

21. The protective element according to claim 20, wherein the high melting point metal layer comprises two or more high melting point metal layers, and the low melting metal layer comprises one or more low melting point metal layers, and the stacked body has a structure in which the one or more low melting point metal layers are each disposed between the two or more high melting point metal layers in at least a portion thereof.

22. The protective element according to claim 15, wherein at least one of the plurality of fuse elements is formed of a single layer comprising silver or copper in at least a portion thereof.

23. The protective element according to claim 15, wherein a cross-sectional area of the cutoff portion in a current carrying direction from the first end portion to the second end portion of at least one of the plurality of fuse elements is less than the cross-sectional area of each of the first end portion and the second end portion in the current carrying direction.

24. The protective element according to claim 15, wherein a part of the locking member is in proximity to or in contact with the plurality of fuse elements.

25. The protective element according to claim 15, wherein at least one of the plurality of fuse elements comprises a low melting point metal layer or a stacked body comprising the low melting point metal layer and a high melting point metal layer on the cutoff portion, and comprises the high melting point metal layer on both the first end portion and the second end portion, the low melting point metal layer comprises tin, and the high melting point metal layer comprises silver or copper.

26. The protective element according to claim 15, wherein a thickness of the cutoff portion in at least one of the plurality of fuse elements is thinner than a thickness of a portion other than the cutoff portion.

27. The protective element according to claim 15, further comprising a heat-generating body configured to heat and soften the locking member or the fixing member, and a power supply member that carries current to the heat-generating body, wherein the heat-generating body generates heat so as to soften the locking member or the fixing member, stress of the pressing member causes the shielding member to cut the locking member or separate the fixing member, and the shielding member moves through the first opening or the first separation part of the plurality of first insulating members to cut the cutoff portion of each of the plurality of fuse elements, which cuts off energization of the plurality of fuse elements.

28. The protective element according to claim 15, wherein the insulating case comprises a first holding member and a second holding member, and one of the plurality of first insulating members is integrated with the first holding member.

* * * * *